(12) United States Patent
Saaski

(10) Patent No.: US 7,496,245 B2
(45) Date of Patent: Feb. 24, 2009

(54) MISALIGNMENT COMPENSATING OPTICAL SENSOR AND METHOD

(75) Inventor: Elric W. Saaski, Bothell, WA (US)

(73) Assignee: Research International, Inc., Monroe, WA (US)

( * ) Notice: Subject to any disclaimer, the term of this patent is extended or adjusted under 35 U.S.C. 154(b) by 951 days.

(21) Appl. No.: 10/923,530

(22) Filed: Aug. 20, 2004

(65) Prior Publication Data

US 2006/0039643 A1    Feb. 23, 2006

(51) Int. Cl.
G02B 6/00 (2006.01)
G01J 1/04 (2006.01)
G01N 21/00 (2006.01)

(52) U.S. Cl. .............. 385/12; 385/30; 250/227.11; 250/227.14; 436/164

(58) Field of Classification Search .......... 385/12, 385/13, 30, 33, 34, 39, 43, 52, 88, 89, 92, 385/93, 129, 130, 131, 38; 436/164, 171, 436/172, 805; 250/227.11, 227.14, 227.17, 250/227.18, 227.19

See application file for complete search history.

(56) References Cited

U.S. PATENT DOCUMENTS

| | | | |
|---|---|---|---|
| 3,604,927 A | 9/1971 | Hirschfeld | 356/38 |
| 4,050,895 A | 9/1977 | Hardy et al. | 23/230 R |
| 4,133,639 A | 1/1979 | Harte | 23/230 B |
| 4,257,671 A | 3/1981 | Barbaudy et al. | 385/140 X |
| 4,321,057 A | 3/1982 | Buckles | 23/230 B |
| 4,399,099 A | 8/1983 | Buckles | 422/58 |
| 4,447,546 A | 5/1984 | Hirschfeld | 436/527 |
| 4,477,578 A | 10/1984 | Miles et al. | 436/518 |
| 4,558,014 A | 12/1985 | Hirschfeld et al. | 436/527 |
| 4,582,809 A | 4/1986 | Block et al. | 436/527 |
| 4,595,833 A | 6/1986 | Sting | 250/353 |

(Continued)

FOREIGN PATENT DOCUMENTS

EP    0 128 723 A2    12/1984    ............... 385/12 X (Continued)

OTHER PUBLICATIONS

Li Li, C. et al., "Application of Electromodulated Fluorescence To The . . . ", Langmuir 2000, vol. 16, No. 10, pp. 4672-4677, American Chemical Society, U.S., 2000.

(Continued)

*Primary Examiner*—Brian M Healy
(74) *Attorney, Agent, or Firm*—Gregory W. Moravan

(57) ABSTRACT

A misalignment compensating optical sensor (222), that is operable to receive excitation light (30) having a range of input propagation angles ω. The sensor (222) has a variable reflected propagation angle $\theta_{0i}$ reflective surface (227) and a sensing waveguide (228). The shape of the reflective surface (227) is selected to maximize the amount of the excitation light (30) it reflects into the sensing waveguide (227) despite misalignment errors between the sensor (222) and the source (58) of excitation light (30). The sensor may also have a lens portion (160) for focusing the excitation light (30) onto the reflective surface (227), and/or a lens portion (174) for collimating the output of signal recovery light (32) from the waveguide (228). An iterative method may be used for designing any particular lens portion (160, 174).

25 Claims, 21 Drawing Sheets

U.S. PATENT DOCUMENTS

| | | | |
|---|---|---|---|
| 4,654,532 A | 3/1987 | Hirschfeld | 250/458.1 |
| 4,671,938 A | 6/1987 | Cook | 422/57 |
| 4,716,121 A | 12/1987 | Block et al. | 436/514 |
| 4,844,869 A | 7/1989 | Glass | 422/68 |
| 4,852,967 A | 8/1989 | Cook et al. | 250/227.11 X |
| 4,909,990 A | 3/1990 | Block et al. | 250/458.1 |
| 5,055,408 A | 10/1991 | Higo et al. | 436/48 |
| 5,061,857 A | 10/1991 | Thompson et al. | 250/458.1 |
| 5,093,569 A | 3/1992 | Krumboltz et al. | 250/227.16 |
| 5,111,221 A | 5/1992 | Fare et al. | 357/25 |
| 5,152,962 A | 10/1992 | Lackie | 422/681 |
| 5,156,976 A | 10/1992 | Slovacek et al. | 436/164 |
| 5,225,374 A | 7/1993 | Fare et al. | 437/225 |
| 5,242,797 A | 9/1993 | Hirschfeld | 435/6 |
| 5,268,486 A | 12/1993 | Waggoner et al. | 548/427 |
| 5,290,398 A | 3/1994 | Feldman et al. | 156/651 |
| 5,340,715 A | 8/1994 | Slovacek et al. | 435/6 |
| 5,359,681 A | 10/1994 | Jorgenson et al. | 536/26.24 |
| 5,399,866 A | 3/1995 | Feldman et al. | 250/458.1 |
| 5,430,813 A | 7/1995 | Anderson et al. | 385/12 |
| 5,442,448 A | 8/1995 | Knoll | 356/445 |
| 5,468,606 A | 11/1995 | Bogart et al. | 435/5 |
| 5,492,674 A | 2/1996 | Meserol | 422/82.08 |
| 5,494,793 A | 2/1996 | Schindele et al. | 435/6 |
| 5,512,492 A | 4/1996 | Herron et al. | 436/518 |
| 5,525,466 A | 6/1996 | Solvacek et al. | 435/6 |
| 5,545,517 A | 8/1996 | Thompson et al. | 435/4 |
| 5,569,766 A | 10/1996 | Waggoner et al. | 548/150 |
| 5,577,137 A * | 11/1996 | Groger et al. | 385/12 |
| 5,582,796 A | 12/1996 | Carey et al. | 422/65 |
| 5,719,063 A | 2/1998 | Block | 436/501 |
| 5,737,457 A * | 4/1998 | Saini et al. | 385/12 |
| 5,858,800 A | 1/1999 | Shigemori et al. | 436/518 |
| 5,885,529 A | 3/1999 | Babson et al. | 422/65 |
| 6,007,996 A | 12/1999 | McNamara et al. | 435/6 |
| 6,008,057 A | 12/1999 | Glass et al. | 436/517 |
| 6,136,611 A | 10/2000 | Saaski et al. | 436/527 |
| 6,137,117 A * | 10/2000 | Feldstein et al. | 250/573 |
| 6,192,168 B1 | 2/2001 | Feldstein et al. | 385/12 |
| 2006/0039643 A1 * | 2/2006 | Saaski | 385/12 |

FOREIGN PATENT DOCUMENTS

| | | | | |
|---|---|---|---|---|
| EP | 0 535 690 A1 | 4/1993 | | 385/12 X |
| JP | S63-273042 | 11/1988 | | 385/12 X |
| JP | H02-191674 | 7/1990 | | 385/12 X |
| JP | H03-272466 | 12/1991 | | 385/12 X |
| JP | H04-225144 | 8/1992 | | 385/12 X |
| JP | H05-118991 | 5/1993 | | 385/12 X |
| JP | H05-203574 | 8/1993 | | 385/12 X |
| JP | H06-308031 | 11/1994 | | 385/12 X |
| JP | H07-063756 | 3/1995 | | 385/12 X |
| JP | H07-103901 | 4/1995 | | 385/12 X |
| JP | H07-174692 | 7/1995 | | 385/12 X |
| JP | H07-181132 | 7/1995 | | 385/12 X |
| JP | H07-318481 | 12/1995 | | 385/12 X |
| JP | H09-257806 | 10/1997 | | 385/12 X |
| JP | 2000-171391 | 6/2000 | | 385/12 X |
| JP | 2000-325295 | 11/2000 | | 385/12 X |
| JP | 2000-356585 | 12/2000 | | 385/12 X |
| JP | 3429282 | 7/2003 | | 385/12 X |
| WO | WO 84/00817 | 3/1984 | | 385/12 X |
| WO | WO 90 09574 | 8/1990 | | 385/12 X |
| WO | WO 92/08966 | 5/1992 | | 385/12 X |
| WO | WO9531711 | 11/1995 | | 385/12 X |
| WO | WO 02/063349 A2 | 8/2002 | | 385/12 X |

OTHER PUBLICATIONS

Anderson, George P. et al., "A Fiber Optic Biosensor: Combination Tapered Fibers Designed For Improved Signal . . . ", Bio-Sensors & Bioelectronics 8:249-256, 1993.

Anis, N.A., et al., "A Fiber-Optic Immunosensor For Detecting Parathion", Analytical Letters 25(4):627-635, 1992.

Gao, Harry H. et al., "Tapered Fiber Tips For Fiber Optic Biosensors", Optical Engineering 34(12):3465-3470, 1995.

Glass, Thomas R., et al, "Effect Of Numerical Aperture On Signal Level In Cylindrical Waveguide Evanescent Fluorosensors", Applied Optics 26(11):2181-2187, 1987.

Golden, Joel P. et al., "Fluorometer And Tapered Fiber optic Probes For Sensing In The Evanscent Wave", Optical Engineering 31(7):1458-1462, 1992.

Golden, Joel P. et al., "Portable Multichannel Fiber Optic Biosensor For Field Detection", 1997 Optical Engineering 36(4), 1008-1013, Apr. 1997.

Golden, Joel P. et al., "Ray Tracing Determination Of Evanescent Wave Penetration Depth . . .", Chemical, Biochemical, and Environmental Fiber Sensors IV 1796:9-13, 1992.

Hale, Z.M., et al., "Fluorescent Sensors Based On Tapered Single-Mode Optical Fibers", Sensors And Actuators B. 17:233-240, 1994.

Hobbs, J.R., "Fluorescence Reveals Toxins On Antibody-Coated Fiberoptic Probe", Laser Focus World 28(5):83-86, 1992.

Huber, W., et al., "Direct Optical Immunosensing (Sensitivity And Selectivity)", Sensors And Actuators B. 6:122-126, 1992.

Jorgenson, R.C., et al., "A Fiber-Optic Chemical Sensor Based On Surface Plasmon Resonance", Sensors And Actuators B. 12, (3):213-220, 1993.

Jung, C.C., et al., "Chemical Electrode Surface Plasmon Resonance Sensor", Sensors And Actuators B. 32(2):143-147, 1996.

Ligler, F.S., et al., "Evanescent Wave Fiber Optic Biosensor", Proc. Biosensors, A.P.F. Turner, ed., pp. 308-315, 1992.

Rogers, Kim R., et al., "Acetylcholine Receptor Fiber-Optic Evanescent Fluorosensor", Analytical Biochemistry 182:353-359, 1989.

Wong, R.B., et al., "Reusable Fiber-Optic-Based Immunosensor For Rapid Detection Of Imazethapyr Herbicide", Analytica Chimica Acta, 279:141-147, 1993.

Jung, Chuck C., et al., "Raptor: A Fluoroimmunoassay-Based Fiber Optic Sensor For Detection Of Biological Threats", IEEE Sensors Journal, vol. 3, No. 4, Aug. 2003, pp. 352-360, USA.

Saaski, Elric W., "Research International, A Universe Of Solutions"; shown, but not published, on Aug. 27, 2002, 62 pages, Tokyo, Japan.

* cited by examiner

MISALIGNMENT COMPENSATING OPTICAL SENSOR AND METHOD

FIELD OF THE INVENTION

This invention relates generally to optical methods and apparatus for chemical and biochemical assays, and more particularly to fiber optics-based methods and apparatus for such assays.

BACKGROUND OF THE INVENTION

There exists a need for a highly sensitive and specific technology directed to the detection of human pathogens and toxins in food, water, and the environment. It is very difficult to effectively detect organisms in natural fluids such as milk, blood, sewage, and meat products at low concentration and to discriminate between pathogenic and harmless species. Conventional bioassay methods are commonly designed for samples on the order of a few cubic centimeters, and the extraction or concentration of pathogenic material from larger volumes to met sensitivity requirements creates additional challenges.

One of the most promising strategies for performing pathogen assays on raw, unpurified samples is based on sensors that harness biological ligand-receptor interactions to identify specific compounds. Examples of approaches that implement such a strategy include fiber optic evanescent wave sensors and surface plasmon resonance sensors.

An electromagnetic wave, traveling through one material, that is reflected at a dielectric interface produces an exponentially decaying electric field within the second material on the opposite side of the interface. At optical frequencies this is termed the evanescent wave effect, and at radio frequencies this phenomenon is often called a "skin effect." The penetration depth within the second material, the evanescent wave region, is a small fraction of a wavelength, yet greater in size than most optical labels such as light- or fluorescence-producing reporter molecules, light-absorbing or scattering molecules, and colloidal particles and microspheres. These labels can be used to monitor or produce optical changes in the evanescent region, or modify the propagation of light in the adjacent dielectric, providing a fundamental means of detecting target materials that are close to the surface while discriminating against those far away. In particular, by coating the interface with a capture agent that is specific for a microscopic or molecular target of interest, exquisitely sensitive optical-based sensors can be created.

In one competitive assay technique, fluorophore-labeled antigen 104, together with the sample to be tested, is exposed to the coating of capture antibody 100 on the fiber, and the labeled antigen competes for antibody binding sites with non-tagged analyte 106 in the test sample. The evanescent field produced by light 108 passing through the fiber 102 then excites the fluorophores into light emission 110, and the fiber itself conveniently acts as a return waveguide for the fluorescent signal. In this example, the strength of the fluorescent signal is inversely related to the analyte concentration in the test sample. Alternatively, a non-competitive technique, such as a sandwich-format assay, can be used, in which case the fluorescent signal is directly related to the analyte concentration in the test sample. High sensitivity and specificity can be achieved for a wide range of metals, toxins, proteins, viruses, living and dead bacteria, and spores, through the use of bound target-specific agents 100 such as chelating agents, antibodies, crown ethers and the like, combined with appropriate optical labels that luminesce, fluoresce or alter light transport by the waveguide. In applications where pathogens will be infrequently found, cost per assay may be low since the sensor remains active until the capture agents have been substantially neutralized by the binding of the target material.

For surface plasmon resonance sensing, FIG. 1B shows a thin layer of metal 110, such as gold, applied to a core portion 112 of an optical fiber 114 from which the cladding 116 of the fiber has been partly removed. The evanescent electric field produced by light 118 passing through the fiber 114 excites surface plasmon waves 120 on the outer surface of the metal 110. When white light is passed through the fiber 114, the excitation of a surface plasmon wave causes a dip in the spectrum of the light passing through the fiber, with the dip occurring at a resonance wavelength which is a function of the complex indices of refraction of the fiber core, the metal layer, and the fluid surrounding the fiber, as well as the incidence angle of the light. Light passing through the fiber 114 can be returned by a mirror 122, or can be passed through the distal end of the fiber (in the absence of a mirror) for optical processing and analysis, as is well known to those skilled in the art. Any change in the index of refraction of the fluid is detectable, and molecules binding to the surface of the metal 110 can then be detected if they have an index of refraction that is different from the bulk fluid. Coating the metal layer 110 with target-specific capture molecules (not shown), which react with target analytes within a sample fluid, then allows detection of reactions (such as antigen-antibody reactions and reduction-oxidation reactions) on the surface of the metal.

Fiber optic evanescent wave sensors are the subject of a number of U.S. patents, including the following, the disclosures of each being incorporated herein by reference: U.S. Pat. No. 4,447,546, to Hirschfeld et al., entitled "Fluorescent Immunoassay Employing Optical Fiber in Capillary Tube"; U.S. Pat. No. 4,558,014, to Hirschfeld et al., entitled "Assay Apparatus and Method"; U.S. Pat. No. 4,582,809, to Block et al., entitled "Apparatus Including Optical Fiber for Fluorescence Immunoassay"; U.S. Pat. No. 4,654,532, to Hirschfeld, entitled "Apparatus for Improving the Numerical Aperture at the Input of a Fiber Optic Devices"; U.S. Pat. No. 4,716,121, to Block et al., entitled "Fluorescent Assays, Including Immunoassays, with Feature of Flowing Sample"; U.S. Pat. No. 4,909,990, to Block et al., entitled "Immunoassay Apparatus"; U.S. Pat. No. 5,242,797, to Hirschfeld, entitled "Nucleic Acid Assay Method"; U.S. Pat. No. 5,061,857, to Thompson et al., entitled "Waveguide-Binding Sensor for Use With Assays"; U.S. Pat. No. 5,430,813, Anderson et al., entitled "Mode-Matched, Combination Taper Fiber Optic Probe"; U.S. Pat. No. 5,152,962, to Lackie, entitled "Immunoassay Apparatus"; U.S. Pat. No. 5,290,398, to Feldman et al., entitled "Synthesis of Tapers for Fiber Optic Sensors"; and U.S. Pat. No. 5,399,866, to Feldman et al., entitled "Optical System for Detection of Signal in Fluorescent Immunoassay." Fiber optic surface plasmon resonance sensors are the subject of U.S. Pat. No. 5,359,681 to Jorgenson et al., entitled "Fiber Optic Sensor and Methods and Apparatus Relating Thereto," the disclosure of which is incorporated herein by reference.

For evanescent wave sensors, it is desirable to optimize the magnitude of the evanescent electric field as well as to optimize the optical properties of the return path for the detected fluorescence. The above-identified patents describe numerous optimization approaches, including attempts to match the numerical aperture of various system components and to improve system numerical aperture. Numerical aperture is a measure of the largest angle, relative to the optical axis of a system, that a ray of light can have and still pass through the system. Each component in an optical system will have its own unique limiting numerical aperture, and the maximum system numerical aperture will be determined by the system component having the lowest numerical aperture. The system numerical aperture is a key parameter in optical sensing since transferred power is typically proportional to its square. Good design practice and cost efficiencies require system components to have matching numerical apertures.

One well-known approach of matching numerical apertures employs tapered or cone-shaped waveguides. In addition to providing numerical aperture matching, tapering the active, analyte-sensitive portion of the optical fiber maintains a substantial fraction of the input light near the critical angle, thereby maintaining a high magnitude evanescent field. However, there is also a constant loss of light along the sensor fiber as the taper acts upon rays that are already only weakly guided and causes them to exceed the critical angle.

In order for white light to propagate in an optical fiber used in connection with a surface plasmon resonance sensor, the fiber must have a large enough diameter to support the longest wavelength of light. Also, a large diameter fiber propagates higher numerical aperture light, which makes it easier to excite surface plasmon waves in metal films of a thickness readily fabricated by conventional processes. As a consequence, multi-mode fibers are used which propagate light over a range of angles. However, this range of angles results in a less distinct resonance effect, because each angle of propagation results in a different resonance wavelength.

FIG. 2A shows the theoretical resonance curves for various propagation angles relative to the optical axis of the fiber core, assuming a 55 nm thick layer of gold on a silica optical fiber core immersed in water. The overall resonance detected is a superposition of the resonance effects for each of the various angles of propagation. FIG. 2B shows the integration of individual theoretical resonance curves for propagation angles from 0 to 23.6 degrees, assuming a sine-squared distribution of optical power at the various propagation angles. The significant signal degradation associated with current approaches to surface plasmon resonance sensing is seen by comparing the resonance curve of FIG. 2B with the individual resonance curve of, for example, 23.6 degrees in FIG. 2A.

The first evanescent waveguide sensors, described in the early 1980's, were for substantially cylindrical waveguides, that is, waveguides with circular cross-sections in which light uniformly filled the entire cross-sectional area. Recent development has strongly emphasized slab waveguides excited by collimated light beams. A slab or planar waveguide may comprise a pair of parallel, internally reflecting surfaces sharing a common optical plane of symmetry.

In these devices, light is only contained in one dimension and lateral spreading is totally defined by excitation optics. This substantial shift has occurred primarily due to an interest in creating multianalyte assay arrays by printing a linear or two-dimensional pattern of capture agent spots on one surface of the slab waveguide within the illumination path of the light beam, and then monitoring for an optical signal from individual analyte-specific spots with a CCD detector array or photomultiplier on the other side of the slab waveguide.

However, the slab approach has some other weaknesses in addition to its limited light guiding ability. Due to the typically small size of individual assay spots it is a challenge to effectively contact each dot with the entire fluid sample. This is of particular significance when foodstuffs are tested for pathogens. Regulations may require, because of high health risks at extremely low pathogen levels, that assay samples of 300 cubic centimeters or more be utilized. By way of example, the acceptance limit set by the US Department of Agriculture for *Escherichia coli* O157:H7 is one organism per 25 gm of sample. It is very difficult to effectively detect organisms at such a low concentration with methods based on bioassay dots of typically 1 mm$^2$ or less area. In addition, sample heterogeneity becomes an issue when raw food samples are examined. Fat globules and other non-toxic components may adhere non-specifically to the sensor or physically block contact with the target, reducing the effective sensitivity. Samples may also be viscous which increases the mass transfer boundary layer thickness and decreases the diffusive mass transport rates. These factors may yield low signal levels and create poor assay statistics where the target is a low, yet lethal concentration of a human or animal pathogen.

Analyte mass-diffusion boundary layers are also typically thicker for slab structures than for solids of revolution, such as cylinders. For related reasons a slab geometry may be more difficult to clean if the assay involves a multi-step protocol such as a sandwich immunoassay, or if it is desired to reuse the sensor. Finally, for applications such as food safety the number of target pathogens may be only one to six, calling into question the value of low sensitivity array techniques that require sophisticated and possibly costly CCD or photomultiplier signal recovery techniques.

Although evanescent wave and surface plasmon resonance sensors show great promise for use in medical and food safety applications, those skilled in the art understand that the current technology is less than optimal in a number of respects, including those disadvantages identified above.

There also exists a need for an improved optical sensor that helps to compensate for lateral, axial and/or angular misalignment errors of the sensor and its source of input excitation light with respect to each other. This is because such misalignment errors will normally cause undesirable degradations in the amount and/or the propagation angle(s) of the rays of the excitation light that are transported by an ordinary optical sensor's sensing waveguide. This, in turn, normally causes corresponding undesirable degradations in the amount of the signal recovery light that is returned by the sensing waveguide. In other words, such misalignment errors normally degrade the overall performance of an ordinary optical sensor. This need exists for both cylindrical and slab waveguide sensor designs.

Needs also exist for an improved optical sensor that includes lens(es) that help to enhance the amount of the excitation light that is delivered to the sensing waveguide, and/or that help to enhance the degree to which the signal recovery light from the sensing waveguide is collimated; and for methods for designing lenses that will satisfy one, or both, of these needs, to thereby enhance the overall performance of an ordinary optical sensor.

BRIEF SUMMARY OF THE INVENTION

In accordance with one aspect of the present invention, an optical sensor may be provided that is operable to receive excitation light from a light source. The sensor may comprise a sensing waveguide and a variable reflected propagation angle $\theta_{0i}$ reflective surface that is selected to maximize the amount of the excitation light that it reflects into the sensing waveguide, despite lateral, axial, and/or angular misalignment errors between the sensor and the source of excitation light.

In other aspects of the present invention, the optical sensor may comprise an excitation light lens for enhancing the amount of the excitation light that is delivered to the sensing waveguide, and/or a signal recovery light lens for enhancing the degree to which the signal recovery light from the sensing waveguide is collimated. A radially segmented, bifocal lens may be provided which comprises a central excitation light lens and a coaxial, concentric, annular, aspherical signal recovery light lens that surrounds the excitation light lens.

Other aspects of the present invention may comprise methods for designing such excitation light and signal recovery light lenses.

It should be understood that the forgoing brief summary of the invention does not set forth all of its features, advantages, characteristics, structures, methods and processes; since these and further features, advantages, characteristics, structures, methods and processes of the present invention will be directly or inherently disclosed to those skilled in the art to which it pertains by all of the disclosures herein.

BRIEF DESCRIPTION OF THE SEVERAL VIEWS OF THE DRAWING

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE INVENTION

An optical assay apparatus and method is described, with certain specific details set forth in order to provide a thorough understanding of various embodiments of the present invention. However, one skilled in the art will understand that the present invention may be practiced without these details. In other instances, well-known structures and operations are not shown or discussed in detail in order to avoid obscuring the description of the embodiments of the invention.

Figure 3:
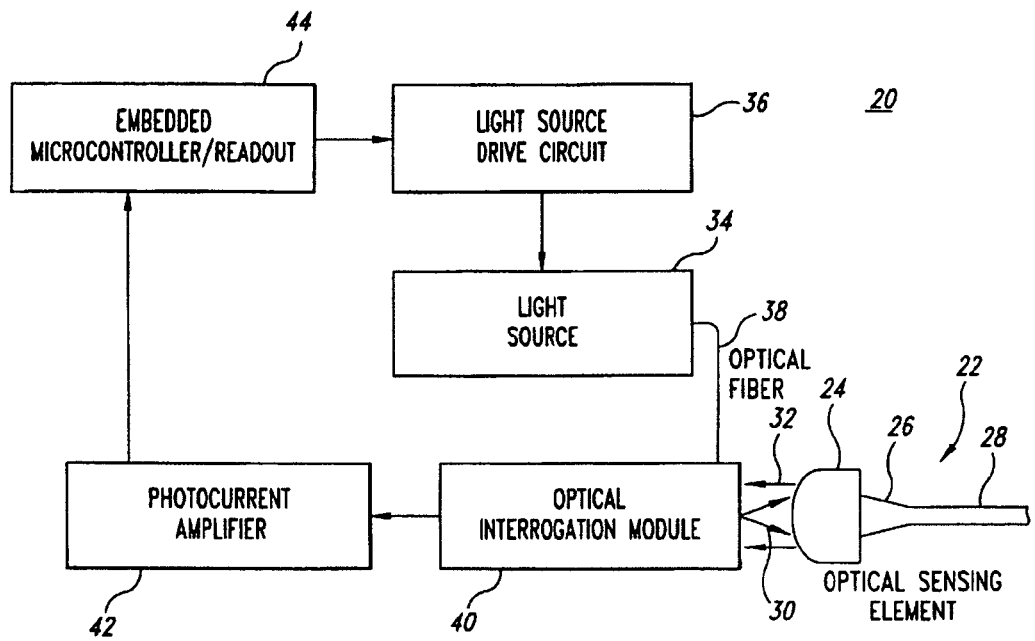
FIG. 3 is a functional block diagram which depicts an assay system in accordance with an embodiment of the present invention.

FIG. 3 is a functional block diagram which depicts an assay system 20. An optical sensor 22 includes a lens portion 24, a reflector portion 26, and a sensing waveguide or fiber portion 28, as will be described in further detail below. The sensor 22 receives excitation light 30 and returns signal recovery light 32. The excitation light 30 is produced by a light source module 34, under control of a drive circuit 36. The light source module 34 provides the excitation light via a waveguide or optical fiber, such as source fiber 38. An interrogation module 40 receives the signal recovery light 32, and can also advantageously optically couple the sensor 22 with the excitation light 30 transmitted via the source fiber 38. The optical interrogation module 40 includes optical devices, such as lenses, and transducers, such as photodetectors, to produce an electrical signal functionally related to the signal recovery light 32. The electrical signal is amplified by photocurrent amplifier 42 which provides the amplified signal to a microcontroller 44. The microcontroller 44 then interprets the amplified signal, and provides the sensing operation results in the form of a readout or printout, or stores the results for later analysis. The microcontroller 44 also can control operation of the light source drive circuit 36.

Those skilled in the art will appreciate that the assay system depicted in FIG. 3 is a simplified block diagram showing components whose configuration and function is well-known. Details concerning portions of the light source module 34, the optical interrogation module 40, and the sensor 22 will be described below in connection with the various embodiments of the present invention. Further details regarding the other functional blocks shown in FIG. 3 need not be described herein for those skilled in the art to practice the present invention.

Figure 4:
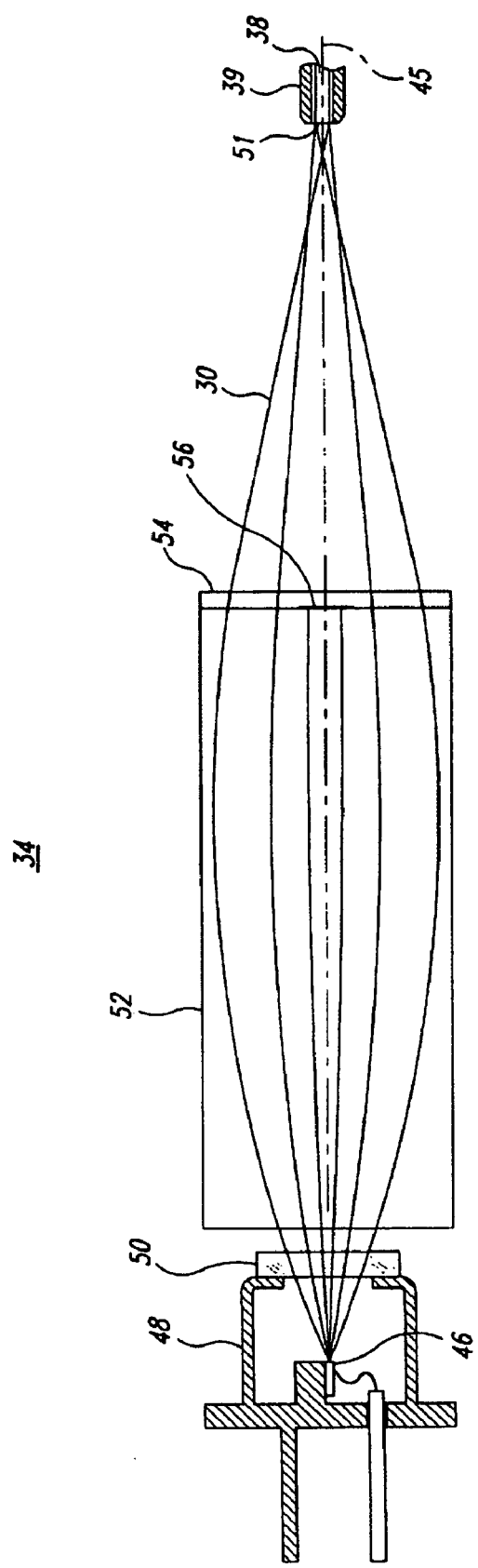
FIG. 4 depicts a portion of a light source module included in the assay system of FIG. 3.

FIG. 4 depicts a portion of the light source module 34 of FIG. 3. The figure depicts a cross-section taken along an optical axis 45. A light source, such as a laser diode 46, is included within a source housing 48 having a window 50. The laser diode 46 produces the excitation light 30 which is focused onto an end 51 of the source fiber 38 by a numerical aperture-adjusting lens 52. The source fiber 38 is held by an optical fiber ferrule 39 used for positioning the end 51 of the fiber at the focal point of the numerical aperture-adjusting lens 52. The source fiber 38 then transfers the excitation light to the sensor 22, for example, as shown in FIG. 3.

In one embodiment, the laser diode 46 is a commercially available visible laser diode in a standard 9 mm package, operating in the 600 nm to 700 nm waveband and producing an average power of about 1 mW or more. The numerical aperture-adjusting lens 52 is a 3 mm diameter, 0.25 pitch graded refractive index (GRIN) lens. The source fiber 38 is a 200 micron core-diameter optical fiber, which is preferably made of a transmission material such as glass or quartz, since such material generates minimal self-fluorescence and has low scattering losses. However, plastic fibers or other waveguides may be suitable, especially if the distance from the light source module 34 to the sensor 22 (see FIG. 3) is less than a few meters. In this embodiment, the GRIN lens transforms the approximately 0.4 to 0.6 numerical aperture of the laser diode 46 to approximately 0.22, in keeping with the comparatively low maximum numerical aperture of quartz fibers. A thin (approximately 0.15 mm) transparent glass disk 54 is bonded to the GRIN lens 52 by a transparent adhesive, and includes a circular obscuration 56 of approximately 0.75 mm diameter positioned symmetrically about the optical axis 45. The effect of the obscuration 56 is to eliminate low propagation angle rays from being input to the source fiber 38. If the source fiber 38 is not bent so severely as to promote internal mode conversion, and does not contain large numbers of scattering centers, then light exiting the fiber will have the same angular characteristics as light entering the fiber.

Figure 5:
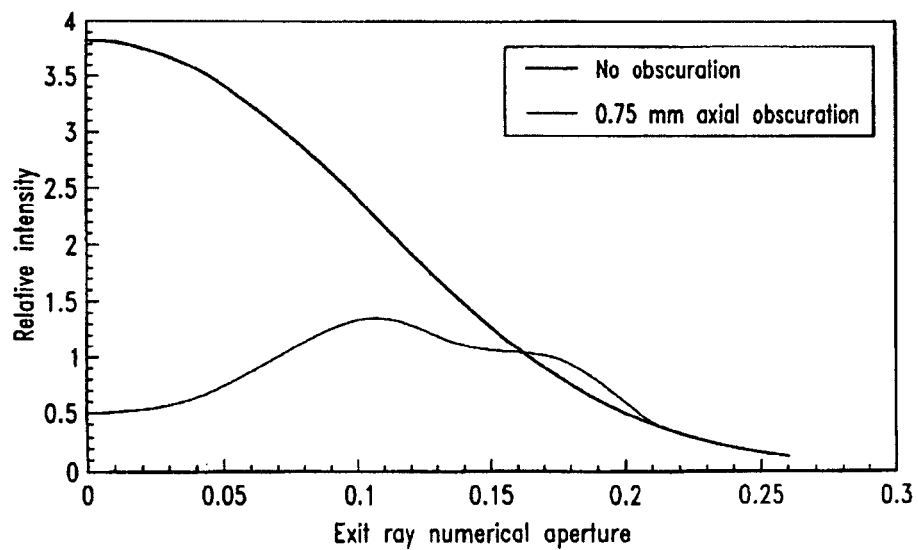
FIG. 5 is a graph which depicts the improved light distribution provided by the light source module of FIG. 4.

FIG. 5 is a graph which shows measurements of the angular distribution of the light exiting from the source fiber 38, with and without the obscuration 56. These measurements correspond to the light source module 34 and source fiber 38 of the particular construction described above. Clearly, the obscuration 56 provides an angular distribution of light with the lower propagation angle rays largely removed, the advantage of which will become apparent in the discussion below. For purposes of convenient presentation, propagation angles relative to the optical axis 45 (see FIG. 4) are represented as numerical aperture values in the graph of FIG. 5.

Figure 6A:
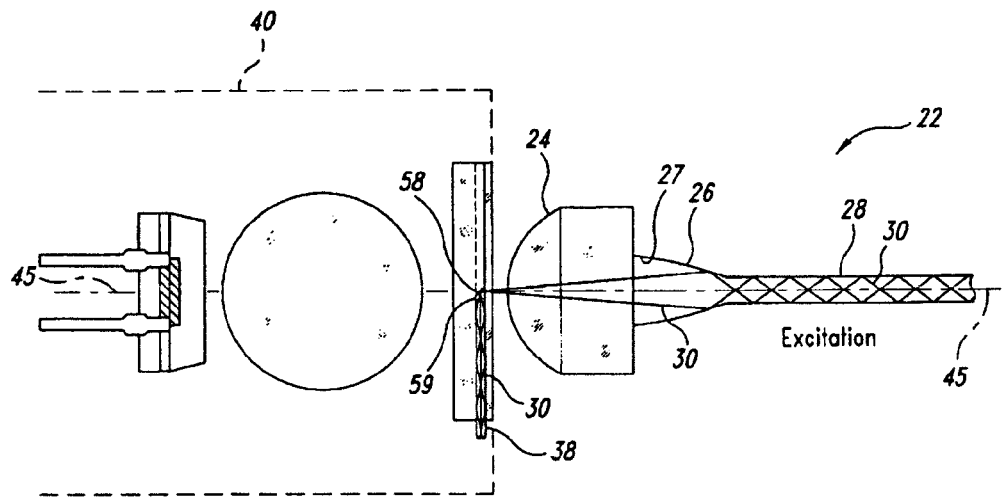
FIG. 6A depicts a portion of an optical interrogation module and of an optical sensor included in the system of FIG. 3, and shows an excitation light path.

FIG. 6A shows the excitation light 30 passing through the source fiber 38 to a right-angle reflector 58 constructed on a distal end 59 of the fiber. The excitation light 30 then passes into the lens portion 24 of the sensor 22, reflects off a reflective surface 27 of the reflector portion 26, and passes into the sensing fiber portion 28. The sensing fiber portion 28 may be a core portion of an optical fiber from which the cladding has been removed. Alternatively, the sensing fiber 28 may be a plastic fiber, or any of a variety of suitably adapted waveguide configurations.

Figure 6B:
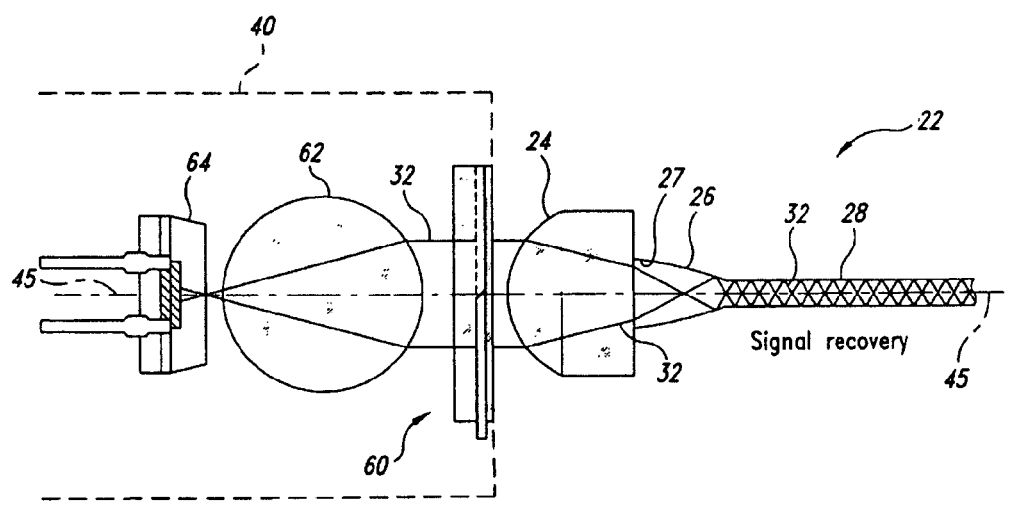
FIG. 6B depicts the portions of the interrogation module and of the optical sensor of FIG. 6A, and shows a signal recovery light path.

FIG. 6B depicts the return of signal recovery light 32, such as from evanescent field-induced fluorescence, through the sensing fiber 28, reflecting off the reflector 26, refracting through the lens 24, and passing into the interrogation module 40 (also see FIG. 3) through an interrogation window 60. Once inside the interrogation module 40, the signal recovery light 32 is focused by a lens, such as a sapphire ball lens 62, onto a transducer, such as a photodetector 64.

Figure 7A:
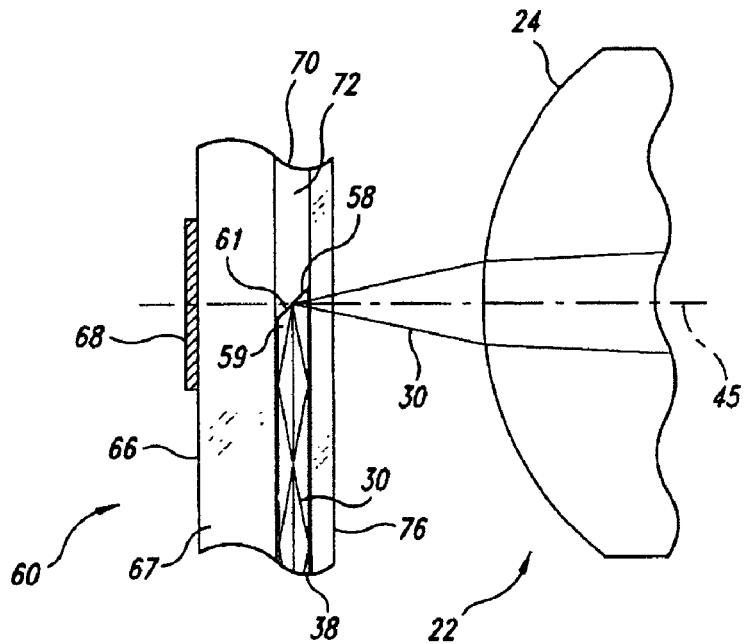
FIG. 7A is a side view which depicts an embodiment of an interrogation module window included in the optical interrogation module of FIG. 6A.

FIG. 7A shows greater details of one embodiment of the interrogation module window 60. The distal end 59 of the source fiber 38 is polished to a 45 degree mirror finish, and coated with a reflective film 61, to form the right-angle reflector 58. This portion of the source fiber 38 is integrated within the interrogation module window 60, as described in detail herein. The right-angle reflector 58 is oriented so that light within the source fiber 38 emerges from the window 60 generally perpendicular to the window surface, with a numerical aperture of, for example, 0.22.

The interrogation module window 60 includes a laser-line rejection filter film 66 deposited onto one face of a glass plate 67. The primary function of the filter film 66 is to exclude any flare light associated with the excitation light 30 from reaching the optical components included within the interrogation module 40, while providing an unimpeded path for the longer wavelength fluorescent signal recovery light 32 (see FIGS. 6A and 6B). The selection of an excitation source and blocking filter are intimately related to signal recovery and are discussed in that context at a later point. A circular obscuration feature 68 of, for example, approximately 1.5 mm diameter is painted or coated onto the exterior surface of the filter film 66. The obscuration 68 augments the filter film 66 by blocking any back-reflected excitation light 30 which might be reflected off the lens portion 24 of the sensor 22.

Figure 7B:
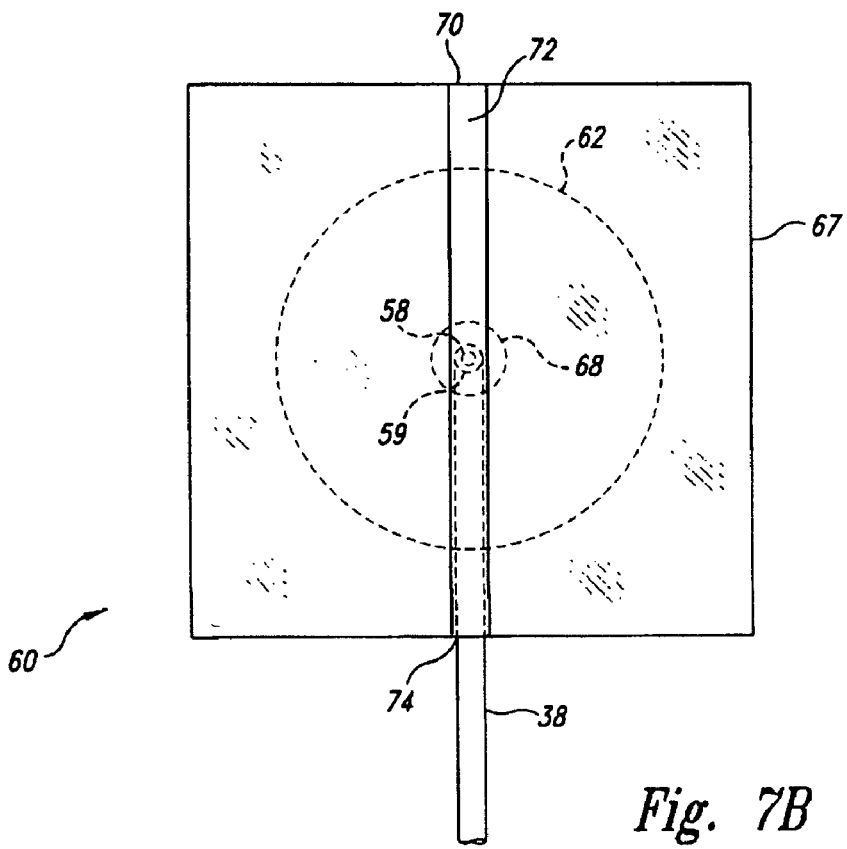
FIG. 7B is a front view of the interrogation module window of FIG. 7A.

Referring to both FIGS. 7A and 7B, a groove 70 is cut into the glass plate 67 on the side opposite the filter film 66. This groove may be cut with a high-speed, water-cooled diamond saw. The slot 70 is then filled with a highly opaque material 72, such as 320 epoxy from Epoxy Technologies of Billerica, Mass. A second, narrower slot 74, equal to the width of the source fiber 38, is then made in the opaque material 72, taking care to position the slot 74 so that it does not break through the opaque material 72 at any point along the length of the slot 74. The source fiber 38 is then positioned in the slot 74 so that it is emitting light at the correct position and in the correct direction, and a thin glass cover plate 76 is pressed against the groove window face to preserve the fiber's position. A transparent material, such as UV adhesive P92 from Summers Optical of Fort Washington, Pa., is then wicked into the void area surrounding the entrapped source fiber 38 to remove any air, and the adhesive is cured.

Both the adhesive and cover plate 76 should be selected to have refractive indices that are approximately the same as the cladding of the source fiber 38 to minimize aberration in the projected beam. Since the excitation light 30 must, upon reflection from the right-angle reflector 58, pass through the cylindrical wall of the source fiber 38, the fiber's wall would otherwise act as a cylindrical lens and distort the shape of the emitted excitation light beam. The opaque material 72, together with the obscuration 68, absorbs any excitation light spilled from defects in the mirror coating at the right-angle reflector 58 or reflected at the interface where the excitation light 30 first enters the lens portion 24 of the sensor 22.

The sensor 22, discussed above in connection with FIGS. 3, 6A and 6B, can be advantageously formed as a single piece, such as by injection molding of polystyrene. As shown in FIG. 6A, the excitation light 30 entering the sensor 22 first encounters the surface of the lens portion 24, which may be any of a number of suitable configurations such as a spherical or paraboloidal lens. The primary function of the lens portion 24 is to collimate signal recovery light 32, as shown in FIG. 6B. However, the lens portion 24 also plays a secondary role as regards the excitation light 30, essentially displacing the effective origin of the excitation light along the optical axis 45.

As described above in connection with the current state of the art, light provided by an excitation source is composed of an equilibrium distribution of ray propagation angles and tapered fiber sections are oftentimes used to match numerical apertures to a level compatible with a sensing fiber when immersed in a fluid sample. However, this approach wastes significant input energy because the angular characteristics of most of the light rays are such that they contribute only weakly to the evanescent electric field strength. Other attempts use a taper along the full length of the sensing fiber, thereby transforming low propagation angle rays at some point along the fiber to higher propagation angle rays that can contribute to the evanescent electric field. However, for these rays at lower angles to be productive, rays initially having larger propagation angles must necessarily have been lost. The continual upgrading of lower propagation angle rays by the fiber taper is obtained at the penalty of excitation light leakage along the fiber's length. This means that assay sensitivity is variable along the fiber, which can cause calibration problems. Also, light leaking from the fiber into the exterior sample could lead to fluorescence excitation of the sample itself, instead of solely from bound fluorophore molecules.

Ideally, all incoming excitation rays should be very nearly at the critical angle of a sensing fiber to maximize the evanescent electric field strength, thereby maximizing the fluorescence output by any fluorophore molecules bound to the fiber. Also, the sensing fiber should be of essentially constant diameter so that the sensitivity per unit length is constant, and with light leakage to the external environment minimized. As a practical matter, a slightly tapered sensing fiber may be required as a consequence of manufacturing processes, such as fabrication by injection molding. Typically, a taper of approximately 0.02 degrees is sufficient to assure defect-free removal of a fiber from an injection mold, and such a taper has essentially negligible optical effects. Embodiments of the present invention can provide a near-ideal situation, primarily due to characteristics of the reflector portion 26 of the sensor 22.

Referring to FIG. 6A, the reflective surface 27 of the reflector portion 26 is constructed with an axial profile such that all rays emitted from the end of the source fiber 38 are reflected at the same angle with respect to the optical axis 45 of the sensor 22. In other words, all rays in the sensing fiber 28 have the same propagation angle which is a highly desirable feature for an evanescent-wave-based sensor. Assuming the light source (i.e., the right-angle reflector 58 at the end of the source fiber 38) is approximately a point source, and that the angular distribution of the light emitted from that source falls within certain limits (discussed below), the shape of the requisite reflecting surface 27 can be readily mathematically derived. In practice, the point source requirement is not a difficult condition to meet, since optical fibers are available with core diameters of as small as 3 microns, and it is also possible to simply increase the relative size of the sensor 22. As a practical matter, it has been found through experimentation that if the diameter of the sensing fiber 28 is about four times larger than that of the source fiber 38, then the point source condition is approximately obtained.

Figure 8:
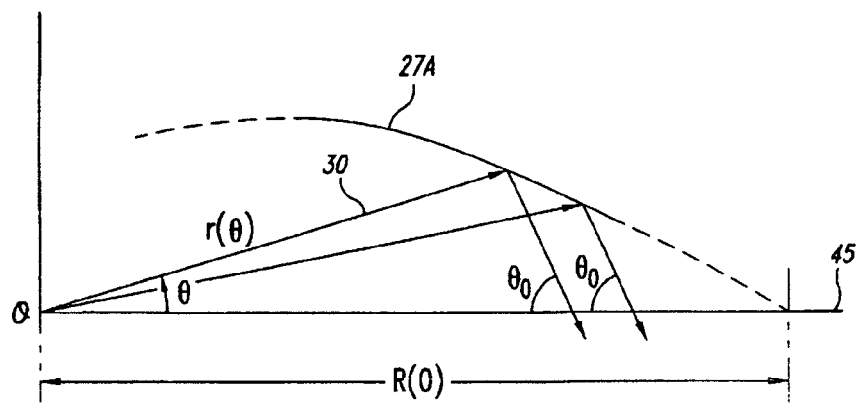
FIG. 8 depicts the geometry of a reflector portion included in the optical sensor of FIGS. 6A and 6B.

The shape of the desired reflective surface 27 is defined by a rotation about the optical axis 45 of a curve 27A shown in FIG. 8. With a point source of light assumed at an origin O, the curve 27A can be described in accordance with the depicted polar coordinates as $$r(\theta) = R(0) \cdot \frac{(1 - \cos(\theta_0))}{(1 - \cos((90° - \theta) + \theta_0))}$$

where r(θ) is the distance from the origin O to the curve 27A, and θ is the angle between the excitation ray line 30 and the optical axis 45. The angle $\theta_0$ is the desired constant exit angle relative to the optical axis, and R(0) is the distance from the origin to the curve 27A at θ=0 degrees.

Figure 9:
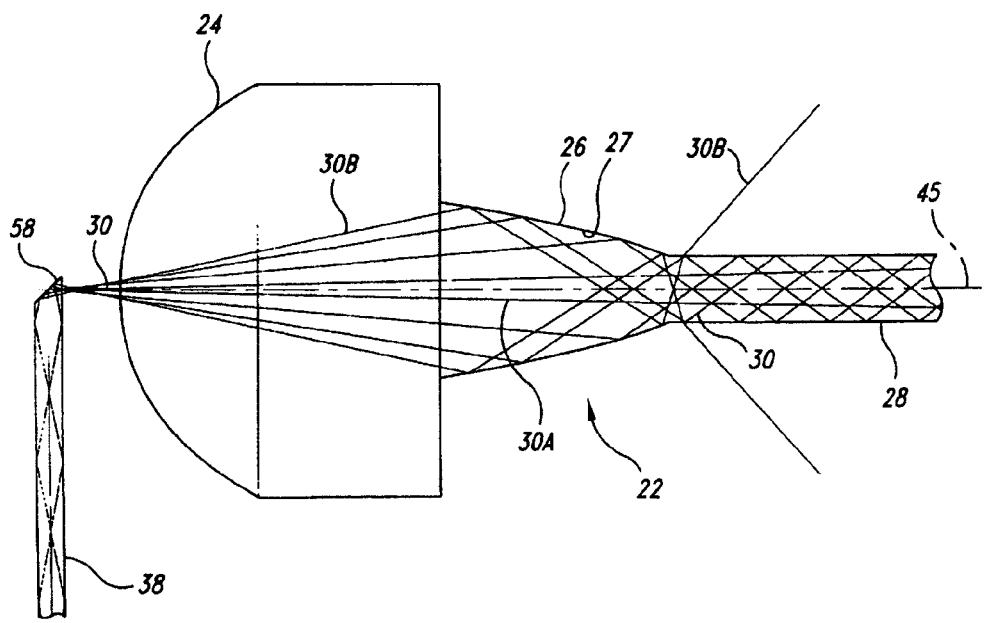
FIG. 9 is an optical ray tracing which depicts the effect of the reflector portion of FIG. 8 on excitation light rays directed at various angles.

Referring to FIG. 9, it is apparent that the reflective surface 27 performs as desired only on rays within a certain range of propagation angles. As shown, those excitation rays 30A propagating at a small angle relative to the optical axis 45 pass directly into the sensing fiber portion 28. Those rays 30B propagating at relatively large angles to the optical axis reflect off the reflective surface 27 a second time and are refracted out of the sensor 22. However, even within these propagation angle constraints, it is not difficult to collect and direct 80-90% of the rays into the sensing fiber portion 28 at the desired angle $\theta_0$.

The numerical aperture for a polystyrene waveguide immersed in water is about 0.856. Light rays directed at larger propagation angles will leak into the surrounding water. The greatest evanescent electric field strengths will then be produced when the excitation light propagation angle is very near the critical angle. The refractive index of polystyrene in the 600-700 nm waveband is about 1.584 leading to a critical angle of about 32.7 degrees relative to the optical axis. As a matter of practical design, however, it may well be better to use a lower propagation angle to compensate for effects of possible misalignment associated with manufacturing tolerances, etc. A design propagation angle of approximately 2 degrees less than the critical angle is readily achieved and yields satisfactory results.

Figure 10:
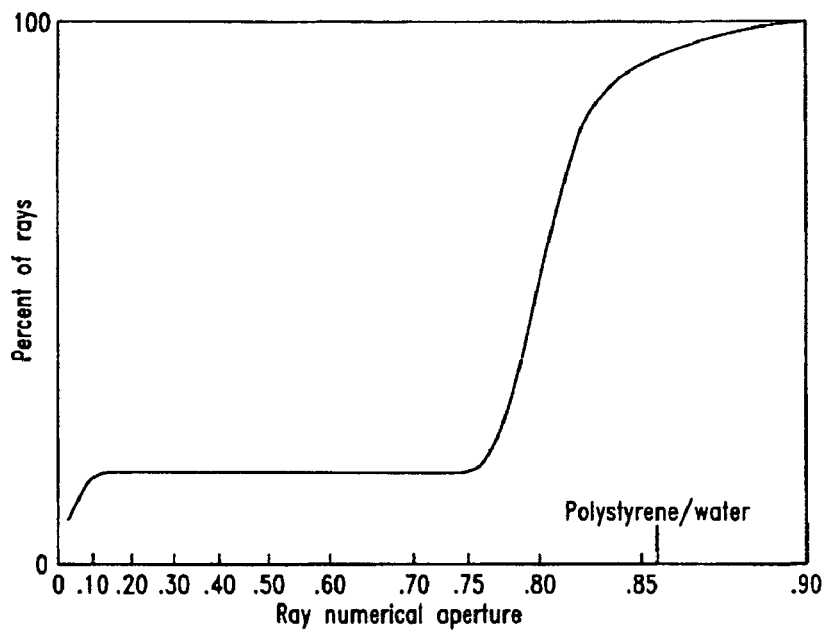
FIG. 10 is a graph which depicts the angular distribution of light rays acted on by the reflector portion of FIG. 8.

FIG. 10 depicts the cumulative angular distribution of rays entering into the sensing fiber portion 28 of the sensor 22, as modeled with a commercial ray-tracing program, Opticad™. The particular sensor modeled is constructed with the dimensions shown in FIG. 11, and with a 200 micron diameter source fiber 38 placed 0.5 mm distant from the facing surface of the lens portion 24 of the sensor. For purposes of modeling simplicity, it is assumed that the source fiber 38 transports rays with a uniform distribution of ray angles up to a limiting numerical aperture of 0.22.

Figure 11:
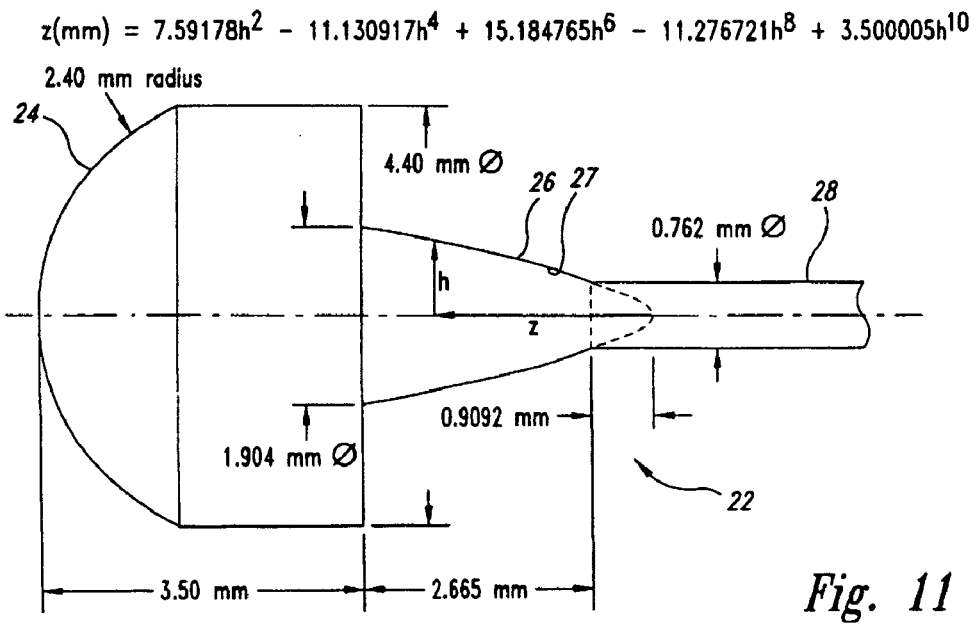
FIG. 11 identifies specific geometries of lens and reflector portions of an optical sensor in accordance with a presently preferred embodiment of the invention.

FIG. 11 depicts the specific geometries of the integrated lens portion 24 and the reflector portion 26, which may be described with reference to a lensmakers equation, $$z(mm) = 7.59178\, h^2 - 1.130917\, h^4 + 15.184765\, h^6 - 1.276721\, h^8 + 3.500005\, h^{10}$$

which will be understood by those skilled in the art.

As shown in FIG. 10, the fraction of rays at small propagation angles is quite modest. Most rays are tightly clustered around the design propagation angle (expressed as a numerical aperture value of 0.81), and over 84% of the rays launched into the fiber portion 28 of the sensor 22 have propagation angles expressed as numerical aperture values in excess of 0.75. Approximately 16% of the rays have propagation angles expressed as numerical aperture values less than 0.15, representing those rays that passed through the aspherical reflector section 26 at a low propagation angle, and hence were not acted upon by the reflector 26.

A further improvement is provided by the central obscuration 56 used in the light source module 34 shown in FIG. 4. Notably, FIG. 10 does not include the effect of this obscuration 56, which would substantially block all of the lower propagation angle rays. Because the low propagation angle light does not materially contribute to the evanescent electric field strength, it is of little value for sensing signal generation. It can, however, be a significant source of non-signal background light that must be rejected by the interrogation module 40 (see FIG. 6B). Such background flare light can come from several sources, such as fluorescence caused by a radiation of the bulk sensor material or trace impurities within it, or, alternatively, by excitation light leaking into the interrogation module 40 itself, or, alternatively, by excitation light that has been back-reflected from particles in the waveguide or from waveguide surface imperfections. Excitation rejection filters, such as the filter film 66 (see FIG. 7A), cannot be made 100% efficient. By removing low propagation angle excitation light from the system, the amount of non-signal background light in the interrogation module 40 is correspondingly reduced with little effect on the evanescent electric field excitation of surface-bound fluorophores.

Referring to FIG. 6B, it is desirable that signal recovery light 32 be collimated before it enters the interrogation module 40. The performance of the filter film 66 (see FIG. 7A) typically deteriorates if rays impinge at angles more than about plus or minus 10 degrees from the design incidence angle. Since the fluorescence process generates an isotropic distribution of ray angles from any fluorophore site, it is also desirable to collimate the wide angular distribution of rays so that they can be directed to a small, low-noise photodetector.

The fraction of signal recovery light 32 that has comparatively low propagation angles exits the sensing fiber portion 28 and passes directly through the lens 24 of the sensor 22. The surface of the lens portion 24 and its axial placement are such that these rays emerge from the sensing fiber 28 approximately at the focal point of the lens, thereby exiting from the lens in a collimated condition. However, a second and typically larger fraction of the signal recovery light 32 exits the sensing fiber portion 28 at large propagation angles. Many of these rays then advantageously strike the reflecting surface 27 of the reflector 26, which reflects this higher propagation angle light into the lens 24, and thereafter into the optical systems included within the interrogation module 40, thereby collecting a substantial portion of recovered signal light that would have otherwise been lost. Ray modeling studies indicate that over 90% of the signal recovery light emitted from the sensing fiber 28 reaches the photodetector 64.

Any of numerous types of long-pass or band-pass filter designs may be employed for filter film 66, such as thin-film interference filters and optical crystals which can be made to transmit wavelengths above a critical wavelength and block wavelengths below that critical wavelength, or transmit within a waveband and reject over a second waveband. The simplest and most cost-effective filter film 66 may be a long-pass dichroic filter with specified filter characteristics that can be purchased from Optical Coating Laboratories of Santa Barbara, Calif. However, additional excitation blocking can be obtained in the exemplary waveband by using a spectrally-absorbing colored filter in combination with filter film 66, e.g., making plate 67 from a long-pass bulk filter material such as RG-645 or RG-665 sharp cut glass, manufactured by Schott Glass Technologies of Duryea, Pa.; or R-62, R-64, R-66, or R-68 sharp-cut filter material from Hoya Corporation; or from an organic-dyed polymer filter material exhibiting strong absorbance at the laser wavelength and low absorbance over at least a part of the fluorescence emission waveband. As previously discussed, thin-film filters as a class are not effective at attenuating rays making steep angles to the optical axis 45, whereas colored filters are, thereby providing complementary function.

With solid-state laser diode excitation sources 46 commercially available in the 600 to 700 nm waveband (e.g., 638, 645, 658 nm), excitation flare may be reduced by a factor of about 1,000 to 10,000 times using a long-pass filter combination that exhibits 50% transmission at a wavelength about 25 nm and longer beyond the laser's emission wavelength. When excitation blocking levels of this magnitude have been reached, residual flare light levels are strongly influenced by optical defects and material inhomogeneities and may have strong fluorescence and Raman components from the laser diode and other excitation optics components subjected to high light intensities. The signal-to-noise ratio may, at this point, be most effectively influenced by placement of a laser bandpass filter in light source 34 to prevent fluorescence emission, by changing the waveguide material and its purity, by improving the optical surface quality of sensor 22, and by moving to excitation wavelengths that do not generate strong non-signal light levels in the optical interrogation module 40. For most dielectric materials, fluorescence and internal back-scattering decrease rapidly as the operating waveband is moved to longer wavelengths. To detect small fluorescence signals above these background effects, it may then be preferable to operate at the longest wavelength for which stable, high efficiency fluorophores are available that emit within the waveband of about 600 nm to about 800 nm.

Figure 12:
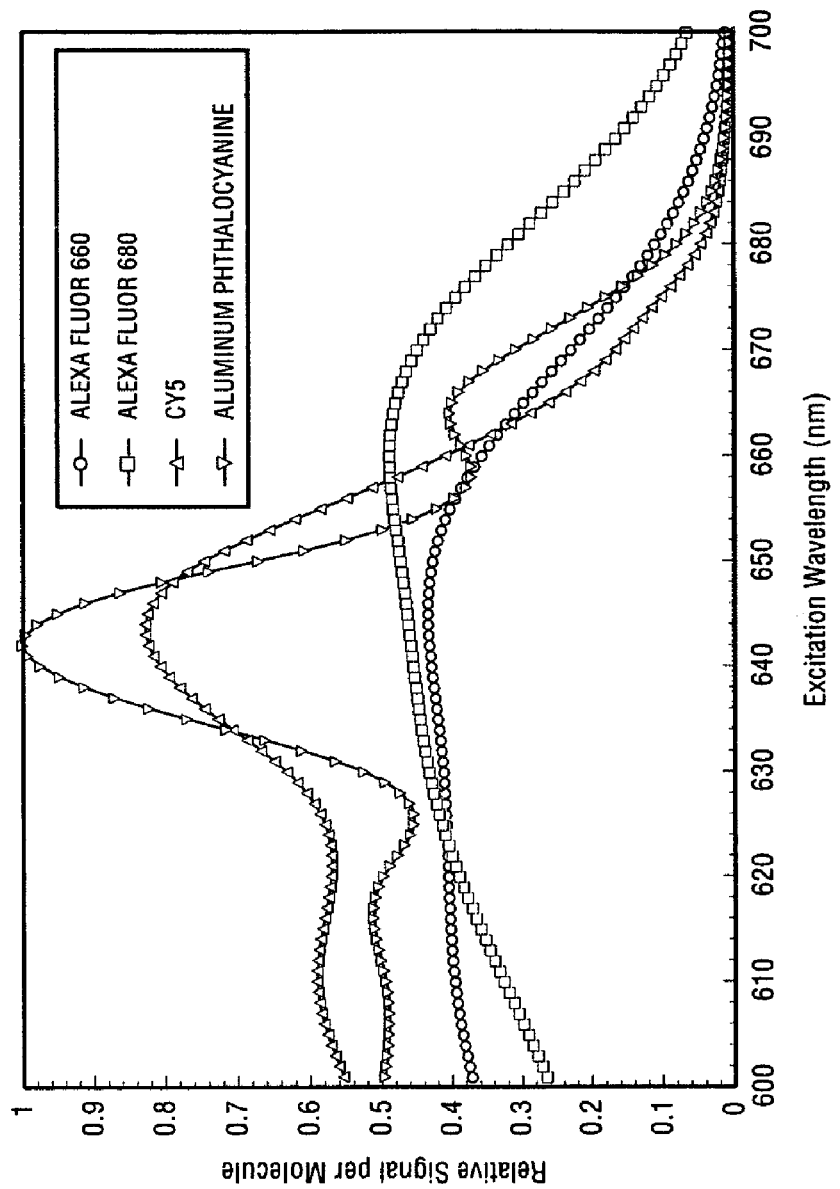
FIG. 12 is a graph which demonstrates the signal strengths associated with using different combinations of fluorophore and laser excitation wavelength.

One family of suitable molecules are the aluminum phthalocyanine compounds, disclosed in U.S. Pat. No. 5,494,793 to Schindele, et al., entitled "Monomeric Phthalocycanine Reagents." A second family of suitable molecules are the Alexa Fluor dyes available from Molecular Probes, Eugene, Oreg. (e.g., Alexa Fluor 660 and 680). A third family of suitable molecules are the CyDye cyanine dyes available from Amersham Pharmacia Biotech, Inc., Piscataway, N.J. (e.g., CY5). FIG. 12 shows the relative fluorescent signal strength per molecule as laser excitation wavelength is varied over the 600 nm to 700 nm waveband for four of these red fluorescent labels developed for bioassays. For this comparison, a 30 nm spectral gap between the laser and blocking filter was used. Laser diodes are commercially available at the following wavelengths from various manufacturers; 633 nm, 635 nm, 638 nm, 640 nm, 645 nm, 650 nm, 655 nm, 658 nm, 670 nm, 675 nm, 680 nm, 685 nm, and 690 nm. Other wavelengths may of course become available in the future and manufacturers can custom-select from production to provide wavelengths that are not at the published output wavelength. In addition, a light emitting diode excitation source may be used with suitable filtering such as a thin-film filter, to more tightly define and restrict the maximum emission wavelength.

With this understood, to obtain the best signal-to-noise ratio in a fluorescence-based evanescent-wave sensing system using inexpensive off-the-shelf excitation sources, it can be concluded from FIG. 12 that excitation wavelengths beyond 660 nm are of less interest because of their poor signal strengths and that an excitation wavelength of about 640 nm to 650 nm provides a very good match to several available fluorophores, and there are fortunately many sources available in this range.

The light that passes through the interrogation module window 60 and which has been filtered of excitation light is focused by a short focal length lens onto a suitable low-noise photodetector 64. Any lens of high light-gathering power may be used, with a particularly effective and compact design being created by a sapphire or high-index glass sphere of 1 to 10 mm diameter. Sapphire spheres of optical quality may be purchased from Edmund Scientific of Barrington, N.J. A solid-state photodiode is a suitable photodetector 64, since it is small, consumes no power, and has low noise. Light falling on the photodetector 64 is then converted to a photocurrent, which in turn is converted to a voltage using standard small-signal electronic amplification methods, such as synchronous detection. Using a 6 mm sapphire ball lens; a low-noise photodiode, type S4707-01 from Hammatsu, Inc. of Bridgewater, N.J.; and a synchronous detection amplification technique operating at an optimum chopping frequency of 135 Hz; an extremely favorable photocurrent sensitivity of 0.025 pA was realized.

Although much of the discussion above focuses on applications to evanescent-wave-based sensors, those skilled in the art will appreciate that the sensor 22 may be suitably adapted for use in a surface plasmon resonance sensor. The ability to convert various propagation angles of light into an approximately constant propagation angle for transmission into a optical fiber is particularly advantageous for surface plasmon resonance techniques. As described above, in connection with the current state of the art, the detected resonance spectrum for currently available surface plasmon resonance sensors is the superposition of resonance spectra associated with light at various propagation angles transmitted down the sensing fiber. If, instead, light of essentially a single propagation angle is used, the resonance effect in the transmitted spectrum is much better defined, is more easily detected, and affords better quantitative analysis.

Figure 1A:
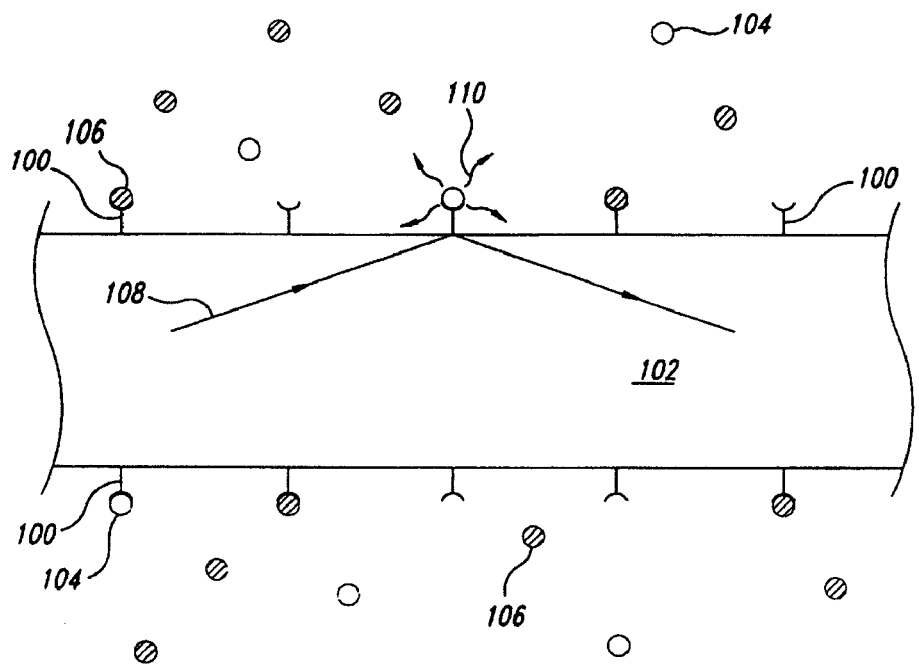
FIG. 1A depicts an optical fiber adapted for use in evanescent wave sensing operations in accordance with the prior art.
Figure 1B:
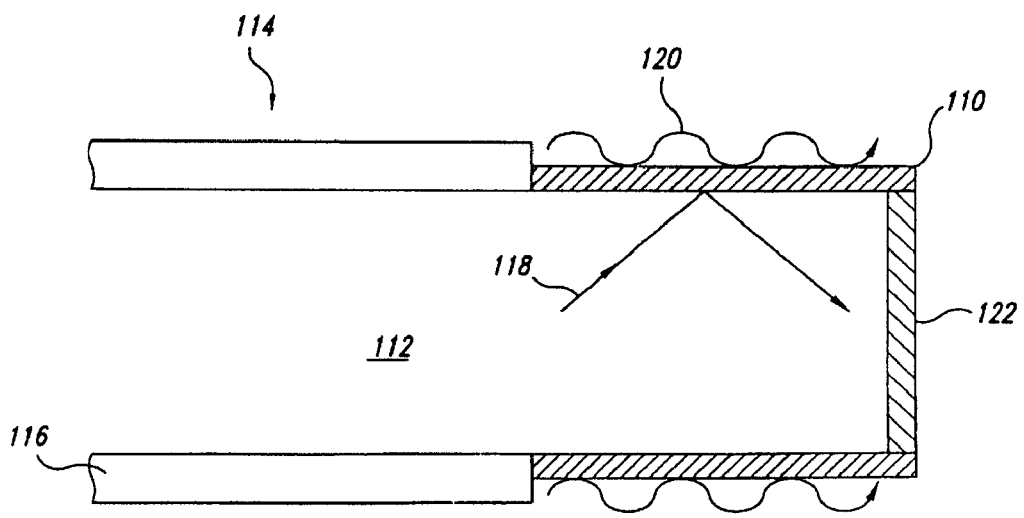
FIG. 1B depicts an optical fiber adapted for use in surface plasmon resonance sensing operations in accordance with the prior art.

The assay system described above is readily adapted for use with surface plasmon resonance sensing operations. A light source module producing white light can be coupled to the sensor 22 by a source fiber, an interrogation module, and an interrogation window, of substantially similar configuration to the above-described source fiber 38, interrogation module 40, and interrogation module window 60. If the surface plasmon resonance sensor fiber 114 includes a mirror 122 for returning signal light (see FIG. 1B), then an optical system much like that of the interrogation module 40 can be employed. Of course, a spectral grating and array detector (or other suitable spectrophometric devices) would be substituted for the photodetector 64 (see FIG. 6B), and the filter 66 (see FIG. 7A) would be omitted from the design.

Removal of low propagation angle light, as in the use of the obscuration 56 of FIG. 4, provides a number of advantages to surface plasmon resonance sensing operations. Low propagation angle light does not stimulate surface plasmon waves, except in metal films too thin to readily fabricate by currently available methods. In the case of back-reflected signal light from the mirror 122 of FIG. 1B, low propagation angle light is essentially signal noise which partly obscures the resonance effect to be measured. The reflector portion 26 of the sensor 22 also advantageously adjusts lower propagation angle light to higher propagation angles.

Figure 2A:
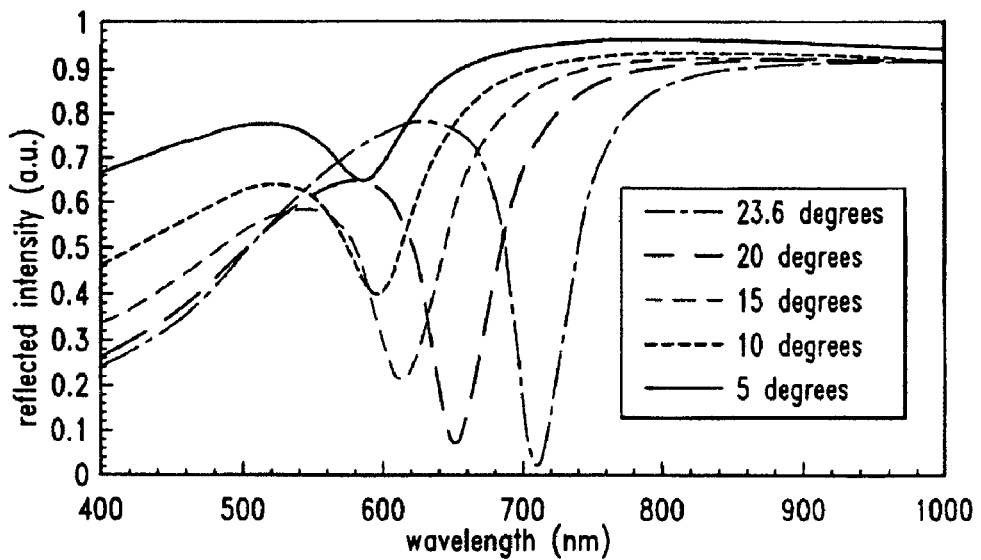
FIGS. 2A and 2B are graphs which depict theoretical resonance curves associated with use of the optical fiber of FIG. 1B in surface plasmon resonance sensing operations in accordance with the prior art.
Figure 2B:
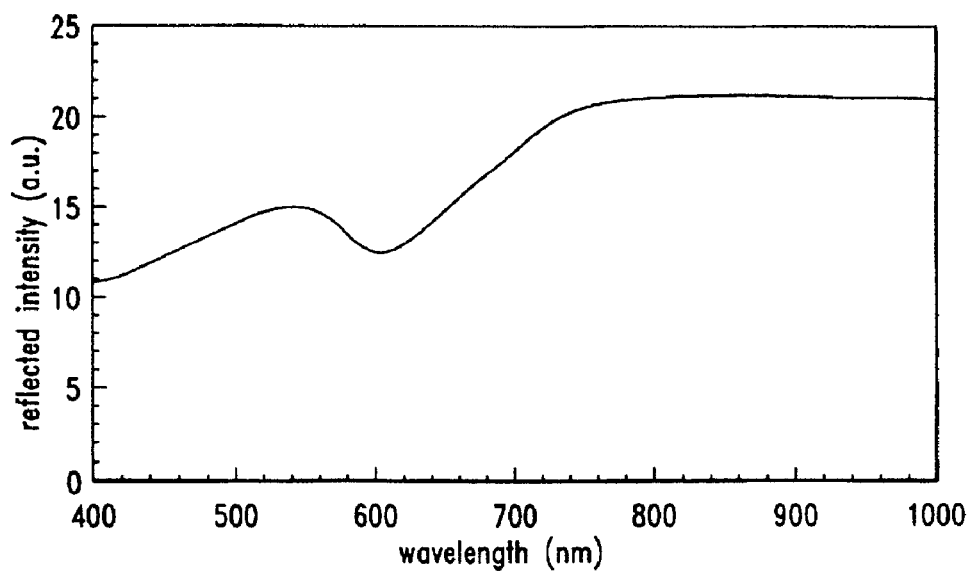
Figure 13:
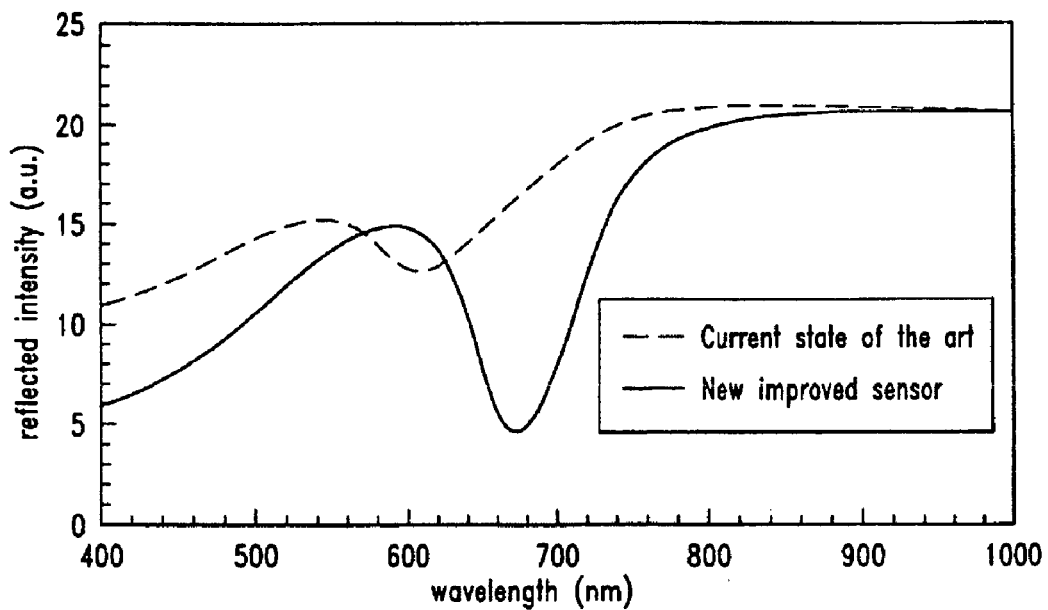
FIG. 13 is a graph which demonstrates the improved characteristics of a surface plasmon resonance sensor employing the optical sensor of FIGS. 6A and 6B.

In accordance with ready adaptations of the embodiments described above, high numerical aperture light of approximately a constant propagation angle can be provided to a surface plasmon wave sensor. FIG. 13 shows the results of modeling a surface plasmon resonance sensor employing the optical features of the sensor 22, as compared to the current state of the art (shown both in FIGS. 2B and 13). Assumed values include a silica optical fiber core of 400 microns having a 55 nm thick layer of gold, and a propagation angle of light of 21.60 degrees, relative to the optical axis of the fiber core, having a uniform dispersion of ±0.2 degrees. The difference between the two curves illustrates the significant improvement afforded to surface plasmon resonance techniques by adaptation of the assay system described above.

Figure 14:
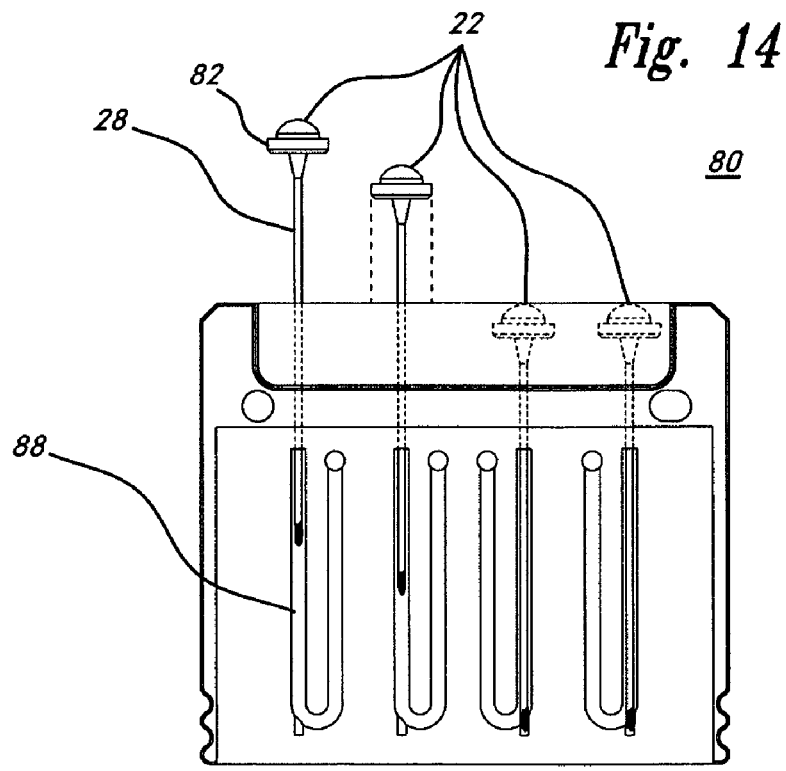
FIG. 14 depicts an assay coupon including the optical sensor of FIGS. 6A and 6B.

FIG. 14 depicts a disposable injection molded assay card 80 which may incorporate four sensors 22. The four axially-interrogated sensors 22 may include a tab 82, which is preferably of integral, one-piece construction with the lens 24, reflector 26, and sensing fiber 28. The tab 82 assists in manipulation and placement of the sensor 22 into a molded-in flow channel 88 in the coupon 80. In this embodiment, excitation and signal recovery are provided by four optical interrogation modules 40. The coupon 80 includes a cover for sealing the molded-in flow channel 88 and a multi-needle septum for introducing sample and reagent fluids into the card. The fluids may be distributed separately to each channel 88 and its axially-located sensor 22, or the channels 88 may be joined together head-to-tail to form a single serpentine flow channel. It may be preferable to isolate the individual waveguides, at least insofar as the reagents are concerned so as to prevent cross-reactions between reagents and to allow reagent concentrations and reaction rates to be maximized. Alternatively, the card may have only one fluid chamber in which a plurality of parallel-mounted waveguides 28 are mounted.

Figure 15:
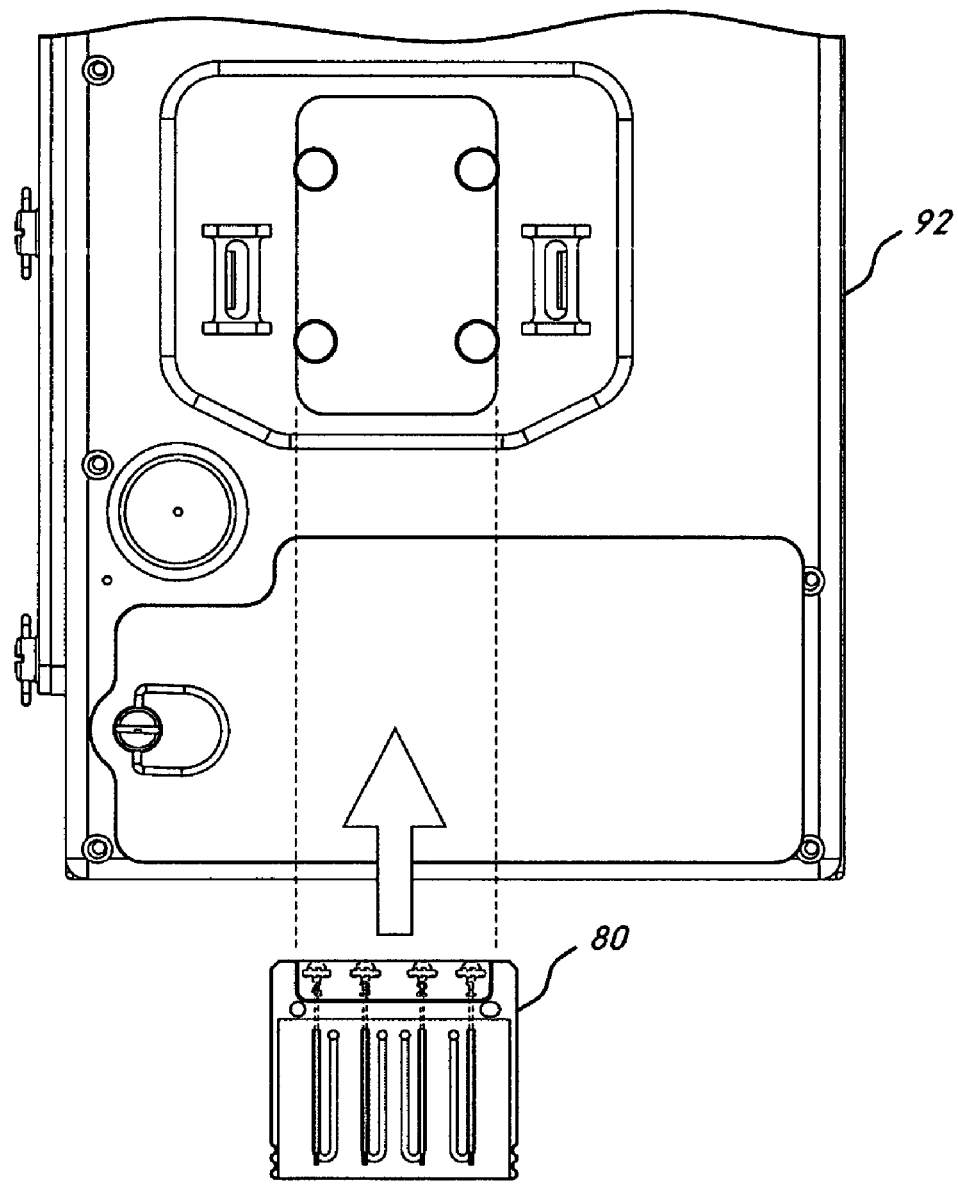
FIG. 15 depicts an assay unit in which the assay coupon of FIG. 14 may be inserted.

At the time of use, the card 80 is inserted into an assay unit 92 (FIG. 15) in which other ancillary components of the selected assay system are included, such as multichannel peristaltic pumps for fluid control and on-board reservoirs for buffer, reagent, and waste fluids, as will be understood by those skilled in the art.

The reflective surface 27 of the optical sensor 22 may be termed a "constant reflected propagation angle $\theta_0$" reflective surface 27. This is because the reflective surface 27 (which is described by the curve 27A of FIG. 8), is very good at reflecting the excitation light 30 in a way that maximizes the number of rays of the excitation light 30 that enter the sensing fiber 28 with a particular (i.e., constant) desired reflected propagation angle $\theta_0$ with respect to its optical axis 45 (see FIGS. 8-9). But at least two things are required in order for this to occur.

First, the interrogation module 40's light source for the excitation light 30 must be a point light source, or at least effectively or approximately a point light source for purposes of the particular sensor 22 under consideration, such as the right angle reflector 58 on the end of the light source fiber 38. However, any other conventional point light source, or any other conventional light source that is at least effectively or approximately a point light source for purposes of the particular sensor 22, may be used in lieu of the right angle reflector 58.

Second, the optical sensor 22 and the right angle reflector 58 must be placed at an optimum position with respect to each other on the common optical axis 45 of the sensor 22, the right angle reflector 58 and the interrogation module 40. As explained above, if the desired reflected propagation angle $\theta_O$ is selected to be at, or near, the sensing waveguide 28's critical angle, then the total evanescent electric field strength around the sensing waveguide 28 and the amount of the signal recovery light 32 that is returned from the sensing waveguide 28 will both be maximized.

However, there will be leakages of the excitation light 30 from the sensor 22 and a widened distribution of the reflected propagation angles $\theta_O$ for the excitation light 30 if the sensor 22 and the right angle reflector 58 are displaced from this optimum position, such as through lateral, axial and/or angular misalignment errors of the sensor 22 and the right angle reflector 58 with respect to each other. Such excitation light 30 leakages and a widened distribution of the reflected propagation angles $\theta_O$ for the excitation light 30 are highly undesirable because they will cause corresponding reductions in the total evanescent electric field strength around the sensing waveguide 28; which, in turn, will cause corresponding reductions in the amount of the signal recovery light 32 that is returned from the sensing waveguide 28.

For example, using the sensor 22 as a reference, a lateral misalignment error would be where the right angle reflector 58 is displaced at a right angle with respect to the sensor 22's optical axis 45; an axial misalignment error would be where the gap between the reflector 58 and the sensor 22, as measured along the sensor 22's optical axis 45, is larger or smaller than the desired gap; and an angular misalignment error would be where the optical axis of the interrogation module 40 and its reflector 58 is rotated at some angle with respect to the sensor 22's optical axis 45. Any particular misalignment error may comprise one or more lateral, axial, and angular misalignment errors. Similar comments apply if the interrogation module 40 and its reflector 58 were used as a reference and there were lateral, axial and/or angular misalignment errors of the sensor 22.

For example, if the right angle reflector 58 is displaced laterally or angularly with respect to the optical sensor 22's optical axis 45, a fraction of the fan of rays of the excitation light 30 that it provides will then be reflected off a section of the reflective surface 27 that would normally not be used. The result, in general, will be that a portion of such rays will be reflected at too steep an angle from the reflective surface 27 and will leak, i.e., will be lost by refraction, through the sidewall of the sensing waveguide 28, while another portion of such rays may simultaneously or alternatively produce rays of the excitation light 30 having abnormally low reflected propagation angles with respect to the reflective surface 27. A similar result will occur if the gap between the right angle reflector 58 and the sensor 22 is greater than the optimum gap. This is because, here again, a fraction of the fan of rays of the excitation light 30 that is provided by the right angle reflector 58 will be reflected from a section of the reflective surface 27 that is normally inactive as regards the excitation light 30, and a portion of such rays will be reflected less than optimally, or lost by leakage through the sidewall of the sensing waveguide 28.

From a practical manufacturing standpoint it is not reasonable to expect that it will be possible to mount the sensor 22 and the interrogation module 40 so that the sensor 22 and the right angle reflector 58 will be located at the optimal position with respect to each other on their common optical axis 45, other than in an average sense.

Figure 17:
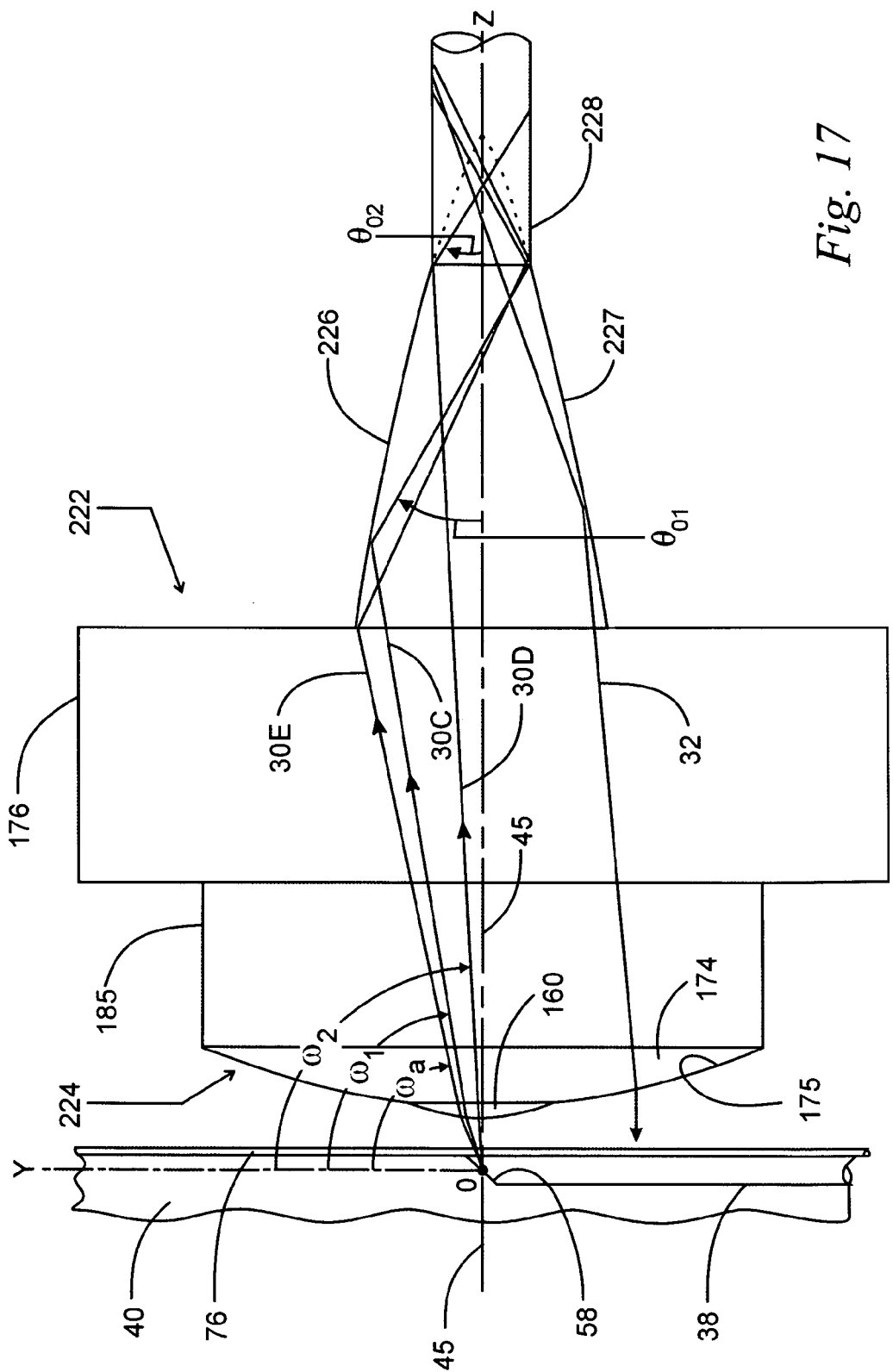
FIG. 17 depicts a portion of an optical interrogation module and an alternative embodiment of the optical sensor, and shows excitation light and signal recovery light paths.

Referring now to FIG. 17, the optical sensor 222 illustrated therein is an alternative embodiment of the optical sensor 22 that is described herein. The sensor 222 is the same as, or at least similar to, the sensor 22 in all respects, such as with respect to its size, shape, design, materials, construction, manufacture, physical properties, dimensions, angular specifications, variations and use, except for those differences which will be made apparent by all of the disclosures herein.

Accordingly, for clarity and simplicity, certain parts of the sensor 222 have been given the same reference numerals, with a "2" prefix, as the reference numerals used for the corresponding respective parts of the sensor 22.

Figure 18:
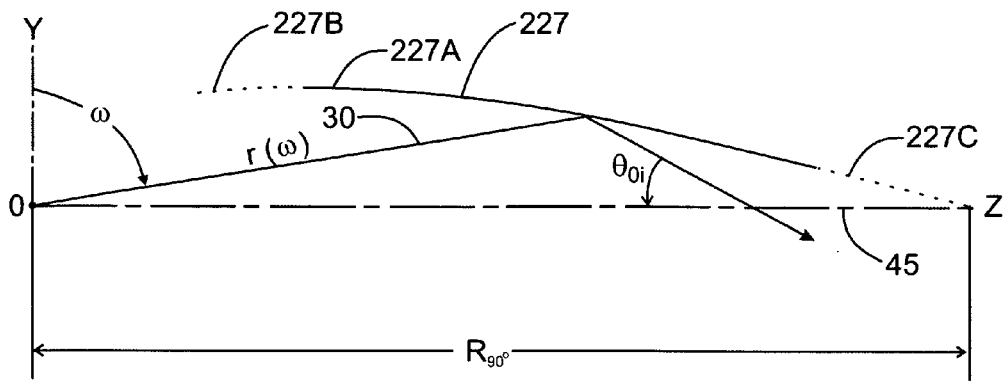
FIG. 18 depicts the geometry of a reflective surface included in the optical sensor of FIG. 17.

It has been discovered that the unique shape of the "variable reflected propagation angle $\theta_{Oi}$" reflective surface 227 of the sensor 222 that is illustrated in FIGS. 17 and 18 will accommodate to a large degree, over certain tolerance ranges, lateral, axial and/or angular misalignment errors of the sensor 222 and the right angle reflector 58 with respect to each other, thereby minimizing off-optimum interactions of the excitation light 30 with the sensor 222 that would otherwise result from such misalignment errors. As a result, the undesirable corresponding reductions in the total evanescent electric field strength around the sensing waveguide 228, and the corresponding reductions in the amount of the signal recovery light 32 that is returned from the sensing waveguide 228 that would otherwise result from such misalignment errors will also be minimized.

The reflective surface 227 is an internally reflecting shape since, as seen in FIG. 18, the input excitation light 30 and the signal recovery light 32 are reflected from its internal surface.

The internally reflecting shape (the reflective surface 227) and the sensing waveguide 228 may have a single shared optical axis 45, if the waveguide 228 is straight. If the waveguide 228 is not straight (i.e., it is curved or bent with respect to the shared optical axis 45), then the shared optical axis 45 of the internally reflecting shape will extend to at least the input end of the waveguide 228, even though the longitudinal axis of the waveguide 228 may deviate thereafter from the shared optical axis 45.

The sensing waveguide 228 may have an at least substantially cylindrical shape, a longitudinal axis extending down its center, and an at least substantially circular cross-section. As used herein, the term "cylindrical shape" encompasses not only a cylindrical shape that is straight, but also encompasses a cylindrical shape that is bent or curved. The term "cylindrical shape" further encompasses a cylindrical shape having a circular cross-section, having any non-circular cross-section, such as an elliptical cross-section, or having a cross-section that comprises any geometrical figure, such as a square or rectangle. The longitudinal axis of the sensing waveguide 228 may coincide with the single shared optical axis 45.

The "variable reflected propagation angle $\theta_{Oi}$" reflective surface 227 is appropriately named because the reflected propagation angle $\theta_{Oi}$ of the input excitation light 30 changes over the extent of the reflective surface 227 as a function of the input propagation angle ω; where the reflected propagation angle $\theta_{Oi}$ is the angle that a reflected ray of excitation light 30 from the reflective surface 227 makes with the optical axis 45 (the horizontal axis Z), and where the input propagation angle ω is the angle that an input ray of excitation light 30 makes with respect to the vertical axis Y, as shown in FIG. 18.

As previously discussed, light sources (such as laser diode 46 or right angle reflector 58), generally emit excitation light 30 over a range of input propagation angles ω, often up to a limiting numerical aperture; while the reflective surface 227 generally reflects the input excitation light 30 over a corresponding range of reflected propagation angles $\theta_{Oi}$ that are uniquely determined by the surface profile of the reflective surface 227 and by the range of input propagation angles ω.

It has been further discovered that even though the reflected propagation angle $\theta_{Oi}$ changes over the extent of the reflective surface 227, the range of reflected propagation angles $\theta_{Oi}$ of the input excitation light 30, after reflection from the reflective surface 227, may still be relatively tightly grouped around a particular desired reflected propagation angle $\theta_{Oi}$, and that the number of rays of excitation light 30 entering the sensing waveguide 228 within that range of reflected propagation angles $\theta_{Oi}$ is maximized. This, in turn, desirably maximizes the total evanescent electric field strength around the sensing waveguide 228 and the amount of signal recovery light 32 that is returned from sensing waveguide 228, despite any lateral, axial and/or angular misalignment errors of the sensor 222 and the right angle reflector 58 with respect to each other, over certain tolerance ranges.

In other words, it has been discovered that the novel reflective surface 227 will provide the desired maximum total evanescent electric field strength around the sensing waveguide 228 and the desired maximum amount of the signal recovery light 32 from the sensing waveguide 228 (i.e., will provide a high performance sensor 222), while still allowing a certain misalignment error tolerance range between the right angle reflector 58 and the sensor 222.

The design of the reflective surface 227 will now be addressed. For a rotationally symmetric sensor 222, the shape of the reflective surface 227 is defined at each axial position on its shared optical axis 45 by a partial or full rotation of a line of constant radius about the optical axis 45 of the curve 227A shown in FIG. 18.

With a point light source assumed at the origin O, the curve 227A (as well as its dotted extensions 227B and 227C), can be described in accordance with the depicted polar coordinates as:

$$r(\omega) = R_{90°}\left[\frac{1 - \cos(\theta_{90°})}{1 - \sin(\omega - \theta_{0i})}\right]^P$$

In the above equation, $r(\omega)$ is the distance from the origin O to the curve 227A, 227B, 227C; the input propagation angle ω is the angle that a ray of the input excitation light 30 makes with respect to the vertical axis Y; the reflected propagation angle $\theta_{Oi}$ is the angle that a reflected ray of excitation light 30 from the reflective surface 227 makes with the optical axis 45 (the horizontal axis Z); $R_{90°}$ is the distance from the origin O to the curve 227C when the input propagation angle ω is equal to 90°; $\theta_{90°}$ is the reflected propagation angle $\theta_{Oi}$ when the input propagation angle ω is equal to 90°; and $$P = \frac{1}{1 - B}$$

where B is the rate of change in the reflected propagation angle $\theta_{Oi}$ as a function of the input propagation angle ω.

The aforementioned equation for $r(\omega)$ assumes the reflected propagation angle $\theta_{Oi}$ changes in a linear fashion as a function of the input propagation angle ω over the extent of the reflective surface 227, so that the reflected propagation angle $\theta_{Oi}$ for any point on the reflective surface 227 is given by $\theta_{Oi} = A + B\omega$ where A is the reflected propagation angle $\theta_{Oi}$ when the input propagation angle ω is zero.

It is believed that varying the reflected propagation angle $\theta_{Oi}$ in a linear fashion as described above is the most complicated relation that still gives a closed-form equation. However, although no closed-form solutions for other dependencies of the reflected propagation angle $\theta_{Oi}$ as a function of the input propagation angle ω are known, $r(\omega)$ can be derived for other monotonic relationships between the reflected propagation angle $\theta_{Oi}$ and the input propagation angle ω, such as a power-law dependency, if computer numerical methods are used.

Figure 16:
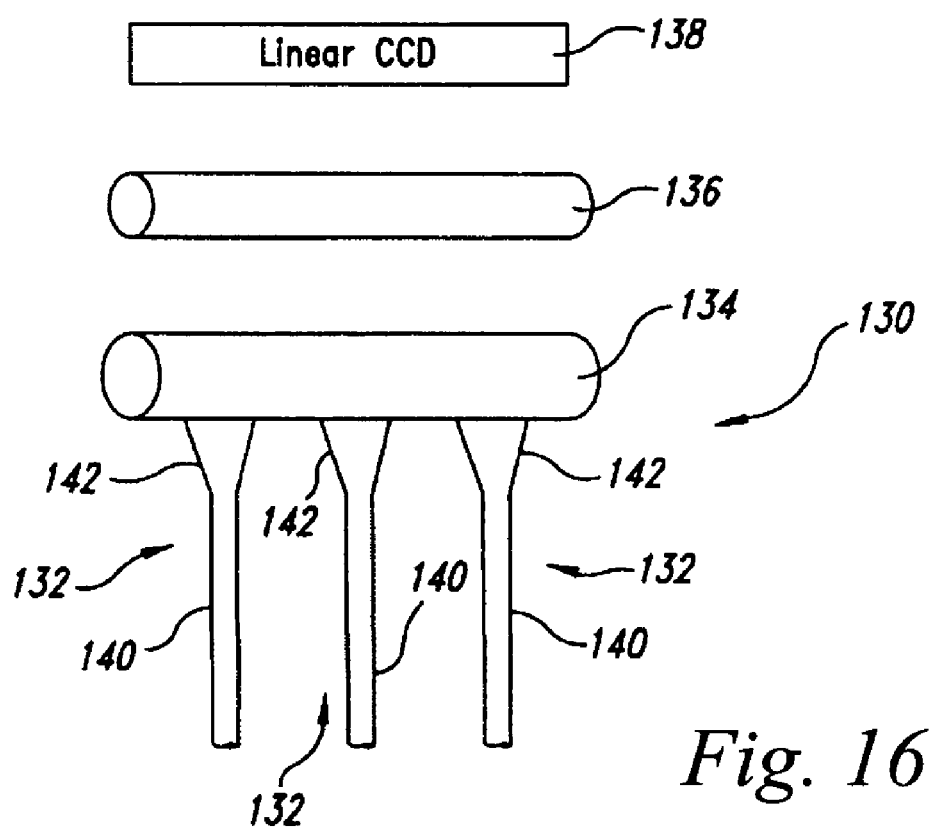
FIG. 16 depicts a multi-element sensor in accordance with an embodiment of the present invention.
Figure 26:
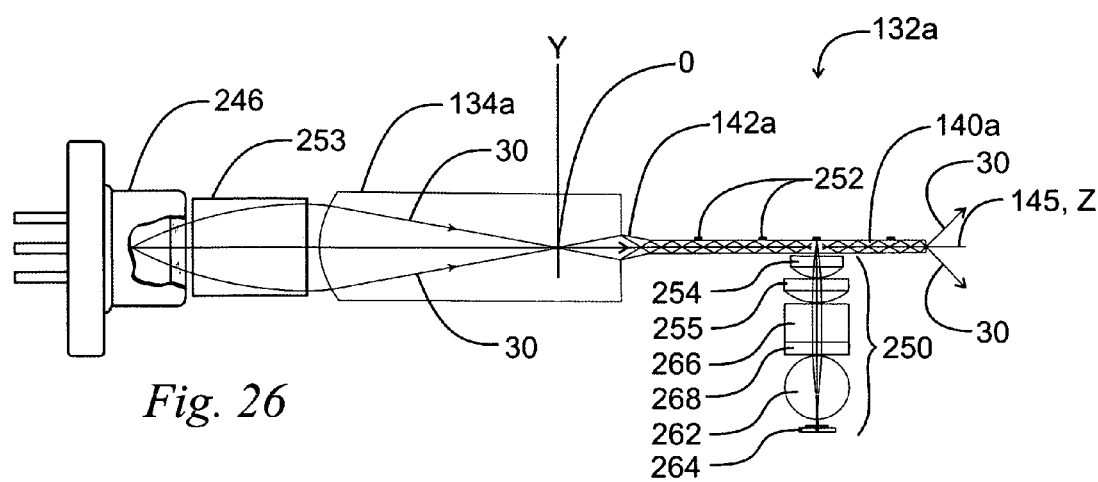
FIG. 26 is a side elevational view that depicts alternative embodiments of the optical sensor and certain components of an interrogation module used with it.
Figure 26A:
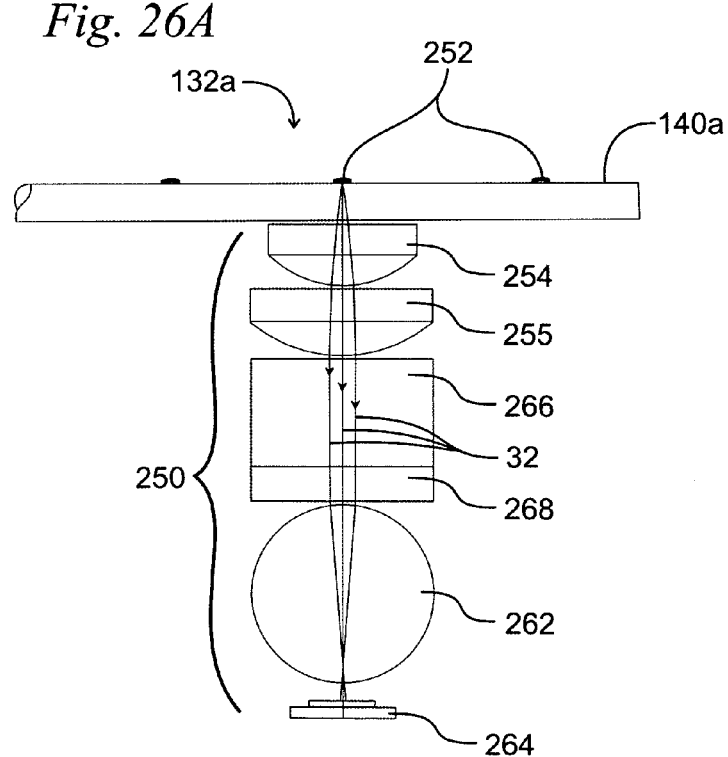
FIG. 26A depicts an enlarged fragmentary view of the right side of FIG. 26.

The above equation for $r(\omega)$ is also valid for the slab optical sensors 132, 132a of FIGS. 16, 26 and 26A that comprise, respectively, a lens portion 134, 134a, a solid slab sensing waveguide 140, 140a, and a solid slab reflector portion 142, 142a that comprises a pair of opposed reflective surfaces that diverge outwardly with respect to each other from the input end of the slab sensing waveguide 140, 140a. The slab sensing waveguide 140, 140a has a pair of parallel waveguide surfaces that are oriented perpendicular to the Y-axis in FIG. 18.

Although the parallel waveguide surfaces of the slab sensing waveguide 140, 140a may be flat, as an alternative they may not be flat. For example, they may be curved or otherwise bowed or bent, as long as they remain at least substantially or essentially parallel to each other. In such a case, the lens portion 134, 134a and the reflector portion 142, 142a may also be curved, bowed or bent to correspond to the shape of the input end of the slab sensing waveguide 140, 140a.

The slab optical sensor 132 of FIG. 16 and the slab optical sensor 132a of FIGS. 26, 26A are alternative embodiments of the slab optical sensor of the present invention. The slab optical sensors 132 and 132a are the same as, or at least similar to, each other in all respects, such as with respect to their size, shape, design, materials, construction, manufacture, physical properties, dimensions, angular specifications, variations and use, except for those differences which will be made apparent to one of ordinary skill in the art by all of the disclosures herein.

Accordingly, for clarity and simplicity, certain parts of the slab optical sensor 132a have been given the same reference numerals, with an "a" suffix, as the reference numerals used for the corresponding respective parts of the slab optical sensor 132.

For simplicity, and by way of non-limiting example, the slab optical sensor 132a of FIGS. 26, 26A will be primarily discussed below, it being understood that all of the disclosures regarding it will apply equally well to the slab optical sensor 132, aside from any differences that would be apparent to a person of ordinary skill in the art in view of all of the disclosures herein. Similarly, any comments made herein regarding the slab optical sensor 132 would apply equally well to the slab optical sensor 132a, aside from any differences that would be apparent to a person of ordinary skill in the art in view of all of the disclosures herein The common optical axis 45 of the rotationally symmetric sensing element 222 is replaced by a common optical plane of symmetry 145 for the slab sensing waveguide 140a, which may be taken as the surface Y=0 in FIG. 18. The net propagation direction for excitation light 30 will be assumed to be along the positive Z-axis in Cartesian coordinates. The X-axis (not illustrated), is perpendicular to the Y-axis and the Z-axis. This Z-axis by definition will coincide with the intersection of the (Y,Z) plane and the orthogonal (X,Z) plane in FIG. 18. Each reflective surface of the reflector portion 142a of the slab sensor 132a is then represented by a one-dimensional Cartesian reflecting surface profile in the (Y,Z) plane of FIG. 18 given by $r(\omega)$.

A distinguishing difference between the cylindrical sensor 228 and the slab sensor 132a is that the slab sensor 132a has no inherent rotational symmetry. This means that, for the slab sensor 132a, each ray of excitation light 30 may be separated into orthogonal vector components, such that each ray may be conveniently characterized by the ray path's projection onto either the orthogonal (Y,Z) or (X,Z) planes.

Thus, as was the case with the cylindrical sensing element 228, excitation light 30 from a point source (such as the right angle reflector 58), may be characterized for the slab sensor 132a by a range of input propagation angles ω in the (Y,Z) plane, and by a corresponding range of reflected propagation angles $\theta_{Oi}$ in the (Y,Z) plane, after reflection from the Cartesian reflecting surface profiles of the reflector portion 142a. However, the orthogonal component of each ray of excitation light 30 (that is, the vector portion obtained by projection of the ray path onto the (X,Z) plane) is not ordinarily affected by the Cartesian reflecting surface profile, and that path must be discussed as a separate issue.

Since a point source of excitation light 30, such as right-angle reflector 58, emits excitation light 30 in a circular or oval cross-sectional beam, the excitation light 30 exhibits a third range of propagation angles in the orthogonal (X,Z) plane. To prevent the excitation light 30 from spreading towards the slab sensing waveguide 140a's two non-waveguide sides as it travels down the slab sensing waveguide 140a, it is necessary to collimate the excitation light rays 30 in this (X,Z) plane.

By partially collimating the beam of excitation light 30 in this way, the beam does not diverge laterally as it moves down the slab sensing waveguide 140a, and a plurality of signal recovery light detectors 250 and corresponding isolated patches of target analyte sensitive coating 252 on the outer surface of the slab sensing waveguide 140a may now be located adjacent to one another in linear array fashion, as seen in FIGS. 26 and 26A. Alternatively, the target analyte sensitive coating 252 may form a continuous coating on part, or all, of the outer surface of the slab sensing waveguide 140a, rather than comprising only one or more isolated patches, and there may be one or more signal recovery light detectors 250 located along the length of such a slab sensing waveguide 140a.

Although only one signal recovery light detector 250 is illustrated, it is understood that one detector 250 may be provided for each of the patches of target analyte sensitive coating 252. Alternatively, there may be only one signal recovery light detector 250 and one patch of target analyte sensitive coating 252. Although only one slab optical sensor 132a is illustrated in FIG. 26, there may be more than one slab optical sensor 132a, such as illustrated in FIG. 16 for the slab optical sensors 132. In such an event there may be more than one light source 246, or one light source 246 may provide excitation light 30 for more than one slab optical sensor 132a. All portions of the slab optical sensor 132a may be manufactured as a single one-piece continuous structure amenable to plastic injection molding.

While not shown in FIG. 16, in FIG. 26 it is seen that lateral collimation of excitation light 30 may be provided by a collimating lens 253 positioned between the cylindrical lens portion 134a and the light source 246. The collimating lens 253 may be positioned so that the light source 246, which may be a point source of the excitation light 30, is at the collimating lens 253's focal point. The collimating lens 253 may be cylindrical and may be positioned so that it refracts and collimates the rays of excitation light 30 in the (X,Z) plane of FIG. 18 to provide the partial (lateral) collimation required to create a fixed width beam of excitation light 30, while leaving ray path components of the excitation light 30 that are parallel to the (Y,Z) plane substantially unaffected.

However, if the collimating lens 253 is a rotationally symmetric lens of, for example, spherical, aspherical, or graduated refractive index lens design, the rays of excitation light 30 exiting the lens 253 are fully collimated. That is, the vector portions obtained by projection of the paths of the rays of excitation light 30 onto the (Y,Z) plane are also parallel to the Z-axis. This special case of a collimating lens 253 emitting a fully collimated beam of excitation light 30 may be usefully dealt with as follows.

As seen in FIG. 26, rays of the excitation light 30 exiting a rotationally symmetric collimating lens 253 encounter the cylindrical lens portion 134a, which is designed so that it focuses the parallel rays of excitation light 30 to a line on the common optical plane of symmetry 145 of the collimating lens 253, the cylindrical lens portion 134a, the reflector portion 142a, and the input end of the slab sensing waveguide 140a. This common optical plane of symmetry 145 corresponds to the (X, Z) plane of FIG. 18. This virtual line source of the excitation light 30 then provides a range of input propagation angles ω of excitation light 30 that fill and reflect from the slab optical sensor 132a's reflector portion 142a, said reflected rays being contained within a corresponding range of reflected propagation angles $\theta_{Oi}$, prior to entering the slab sensing waveguide 140a.

Thus, as seen in FIG. 26, the origin O and the vertical Y-axis of FIG. 18 may be located on said virtual line source of the excitation light 30 for the slab sensor 132a. Accordingly, the input propagation angle ω is the angle that a ray of the input excitation light 30 from the virtual line source of excitation light 30 makes with respect to such a Y-axis; and the reflected propagation angle $\theta_{Oi}$ is the angle that a reflected ray of excitation light 30 from the reflector portion 142a makes with respect to the common optical plane of symmetry 145.

This is analogous to the manner in which excitation light 30 is transferred from the right angle reflector 58 (which may be a point source of the excitation light 30), to the reflector 227 of the sensor 222, wherein the reflector 227 may be of a rotationally symmetric design. The cylindrical lens portion 134a provides focusing of the fully collimated rays of the excitation light 30 in the (Y, Z) plane of FIG. 18, with no substantive effect on ray trajectories of the excitation light 30 in the (X, Z) plane, thereby preserving the excitation light 30 beam's constant width property.

The lens portion 134a may be a discrete element molded into the interrogation module 40's interrogation window 60; a discrete element between the interrogation module 40 and the slab sensor 132a's reflector portion 142a; or a part of the slab sensor 132a as seen in FIG. 26. The last option just mentioned above provides some advantage since lateral and axial misalignment errors of the slab sensor 132a and the collimating lens 253 with respect to each other will not affect transfer of the excitation light 30 into the sensing waveguide 140a, over a certain range of such misalignment errors. This is because the beam of excitation light 30 exiting the collimating lens 253 is composed of parallel rays, which means that the collimating lens 253 will continue to focus the excitation light 30 to the same virtual line source position within slab sensor 132a, despite that range of misalignment errors. This may provide the slab sensor 132a with substantial immunity to that range of misalignment errors since larger misalignment errors of the collimating lens 253 and the slab sensor 132a with respect to each other will be required before the collimated beam of excitation light 30 passing between the collimating lens 253 and the lens portion 134a does not impact on the face of the lens portion 134a.

In addition, the distance between the virtual line source and the reflector portion 142a can be closely held if the entire slab sensor 132a is made or molded as a single piece from a material such as optical-grade plastic, thereby minimizing sensitivity to misalignment at the point of manufacture. The optional tapered shape of the reflector portions 142 seen in FIG. 16 may not be an optical feature so much as a manufacturing feature, to help strengthen the intersection of the lens portion 134 with the reflector portions 142, so that the reflector portions 142 will not break off from the lens portion 134 so easily.

It has been discovered that the use of such a cylindrical lens portion 134a to inject collimated excitation light 30 into the reflector portion 142a of the slab sensor 132a may be a significant improvement over conventional devices, which may utilize a difficult to align prism that may molded into one of the slab sensing waveguide 140a's parallel waveguide surfaces to inject previously collimated excitation light 30 into the slab sensing waveguide 140a at an oblique angle. The slab sensing waveguide 140a does not possess the rotationally symmetric capture and signal integration provided by the cylindrical sensing waveguide 228 of FIG. 17. Since most light-producing reactions that may be used to measure a target analyte on the surface of slab sensing waveguide 140a produce signal recovery light 32 that is emitted uniformly in all directions, the signal recovery light 32 collection efficiency of a slab sensing waveguide 140a may be very low if an attempt is made to monitor the signal recovery light 32 with a lens 62 and photodetector 64 as seen in FIG. 6B.

Accordingly, it is instead preferred to monitor the signal recovery light 32 with a lens 262 and photodetector 264 placed as shown in FIGS. 26 and 26A. In this embodiment, each patch of target analyte sensitive coating 252 is located on one of the slab sensing waveguide 140a's parallel waveguide surfaces, where it may interact with the evanescent electric field produced around the slab sensing waveguide 140a by the excitation light 30. Each patch of target analyte sensitive coating 252 may have any suitable size and may have any suitable shape, such as circular or rectangular.

A fraction of signal recovery light 32 produced by each patch of target analyte sensitive coating 252 passes through the slab sensing waveguide 140a and into a respective signal recovery light detector 250 on the dry side of sensing waveguide 140a. There it is collimated by any suitable means, such as by a pair of collimating lenses 254, 255; then stripped of excitation light 30 by a bulk absorbing filter 266 and a laser line rejection filter film 268; and then focused by a lens 262 onto a photodetector 264. The collimating lenses 254, 255 may be one or more lenses of any design having a high capture efficiency for the signal recovery light 32.

Each patch of target analyte sensitive coating 252 on the slab sensing waveguide 140a, with its corresponding signal recovery light detector 250, may be used to detect a different target analyte. Alternatively, integrated optic technologies such as lens arrays and CCD array detectors may be used in lieu of having discrete optics and signal recovery light detectors 250 for each patch of target analyte sensitive coating 252.

A slab sensing waveguide 140a having at least two patches of target analyte sensitive coating 252 may be used to simultaneously detect different target analytes in the same sample fluid. Alternatively, it may be used to simultaneously detect target analytes in different sample fluids, in which case the different sample fluids may be isolated from each other by any suitable means, such as by providing dividing walls located within one container, or by providing several containers, each containing a different sample fluid.

As was the case with the sensor 222, the pair of reflective surfaces of the reflector 142a of the sensor 132a may comprise an internally reflecting shape; and may have a single shared optical plane of symmetry with the slab sensing waveguide 140a, if the waveguide 140a is straight. If the waveguide 140a is not straight (i.e., it is curved or bent with respect to the shared optical axis 45), then the shared optical plane of symmetry of the internally reflecting shape will extend to at least to the input end of the waveguide 140a, even though the plane of symmetry for the waveguide 140a may deviate thereafter from the shared plane of symmetry.

Turning now again to the sensor 222 of FIG. 17, even when there are lateral or axial misalignment percentage errors of the right angle reflector 58 and the sensor 222 with respect to each other that are up to about 40%, or more, of the radius of the cylindrical waveguide 228, it is possible that at least about a majority of the excitation light 30 that is reflected into the waveguide 228 by the reflective surface 227 may be within at least about 10%, or more, of the maximum numerical aperture of the waveguide 228. In addition, over such a range of misalignment percentage errors, the total evanescent electric field strength of the sensing waveguide 228 may decrease by a percentage that is less than about 1/10, or more, of the misalignment percentage error. Similar comments apply to the slab sensor 132a, wherein when there are lateral or axial misalignment percentage errors of the right angle reflector 58 and the slab sensor 132a with respect to each other that are up to about 20%, or more, of the distance between the opposed parallel reflecting faces of its slab sensing waveguide 140a, it is possible that at least about a majority of the excitation light 30 that is reflected into the waveguide 140a by the reflector portion 142a may be within at least about 10%, or more, of the maximum numerical aperture of the waveguide 140a. In addition, over such a range of misalignment percentage errors, the total evanescent electric field strength of the sensing waveguide 140a may decrease by a percentage that is less than about 1/10, or more, of the misalignment percentage error.

In the following description of the present invention, the sensor 222 will be addressed by way of non-limiting example. However, it is to be understood that all of the descriptions of the sensors 222 and 22 that are contained herein will apply equally well to the slab sensors 132, 132a of FIGS. 16, 26 and 26A, aside from any differences that will now be apparent to one skilled in the art in view of all of disclosures herein.

In FIG. 17, the reflected propagation angle $\theta_{01}$ corresponds to the largest cone angle for an input excitation light ray 30C that can directly enter the sensing waveguide 228 after being reflected from the reflective surface 227, and corresponds to the input propagation angle $\omega_1$. The reflected propagation angle $\theta_{02}$ corresponds to the smallest cone angle for an input excitation light ray 30D that can directly enter the sensing waveguide 228 after being reflected from the reflective surface 227, and corresponds to the input propagation angle $\omega_2$. The above rate of change parameter B may be conveniently calculated by taking the difference between the two reflected propagation angles ($\theta_{02}$ minus $\theta_{01}$), and then dividing the result by the difference between the two input propagation angles ($\omega_2$ minus $\omega_1$).

By way of nonlimiting example, if the range of input propagation angles $\omega$ of the excitation light 30 has a maximum numerical aperture of 0.24 and it is desired that all of the rays of the excitation light 30 having a numerical aperture in excess of 0.08 impinge on the reflective surface 227, then if the rays 30C at the largest cone angle (corresponding to an input propagation angle $\omega_1$) are reflected from the reflective surface 227 at a numerical aperture of 0.78, while the rays 30D at the smallest cone angle (corresponding to an input propagation angle $\omega_2$) are reflected from the reflective surface 227 at a numerical aperture of 0.83, then the value of A is 0.133°, the value of B is 0.36, and the value of the exponent P is 1.56.

It is apparent that the reflective surface 227 performs best on rays of the excitation light 30 that fall within the input propagation angles from $\omega_1$ to $\omega_2$. This is because those rays of excitation light 30 that propagate at larger cone angles, i.e., those rays having an input propagation angle less than $\omega_1$, may reflect off the reflective surface 227 more than once and may leak, i.e. may be refracted out of the sensing waveguide 228; while those rays of the excitation light 30 that propagate at smaller cone angles, i.e., those rays having an input propagation angle greater than $\omega_2$, will pass directly into the sensing waveguide 228.

Therefore the extent of reflective surface 227 is an important parameter. The angular length $\omega_L$ of the reflective surface 227 may be defined as $\omega_L = (\omega_b - \omega_a)$ where $\omega_a$ is the smallest angle that an input excitation light ray 30E can make with respect to the vertical axis Y and still be reflected from the reflective surface 227 towards the sensing waveguide 228, while $\omega_b$ is the largest angle an excitation ray 30D can make with respect to the vertical axis and still be reflected from the reflective surface 227 towards the sensing waveguide 228. From previous discussions it is clear that $\omega_b = \omega_2$, but some degree of ingenuity is needed to determine the best choice for $\omega_a$.

Although a shorter angular length $\omega_L$ may be used, the minimum preferred angular length $\omega_L$ is equal to $(\omega_2 - \omega_1)$, where $(\omega_a = \omega_1$. This ensures, under the condition of no lateral, axial, or angular misalignment errors of the sensor 222 and the right angle reflector 58 with respect to each other, that rays of excitation light 30 are reflected by the reflective surface 227 into the sensing waveguide 228 over a particular numerical aperture extent for a particular sensor 222. On the other hand, it is usually desirable to select the angular length $\omega_L$ to be greater than this minimum, in order to maximize the amount of excitation light 30 that enters the sensing waveguide 228 if there are any such misalignment errors.

Figure 25:
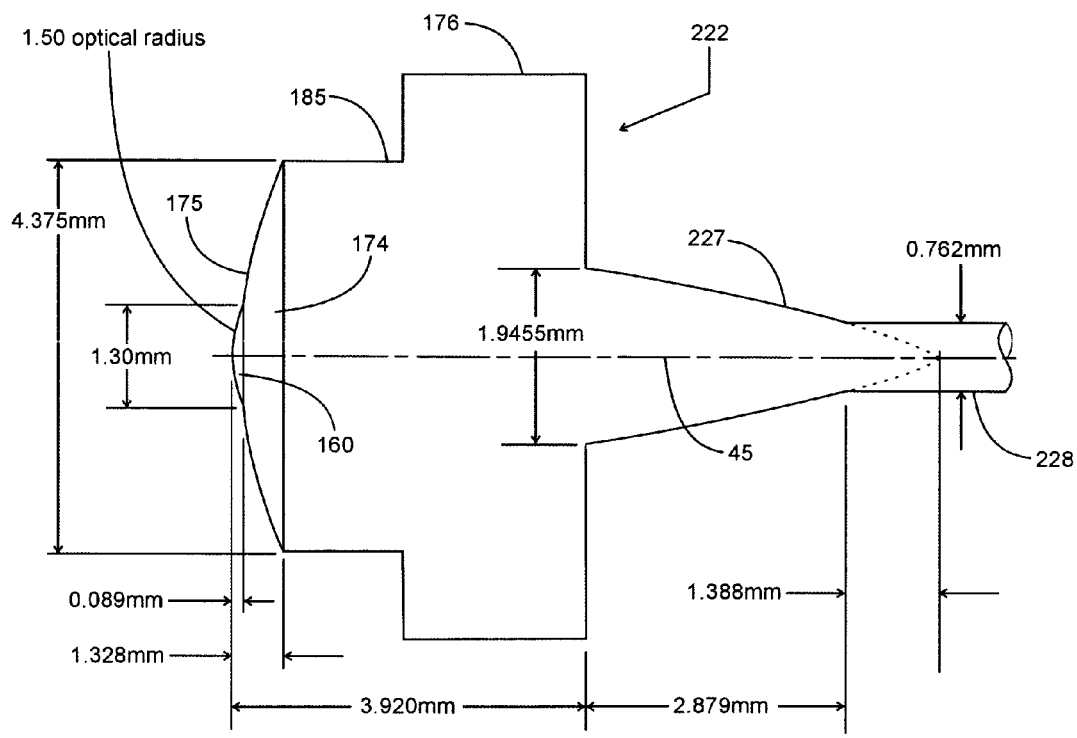
FIG. 25 depicts specific geometries and dimensions for one embodiment of the FIG. 17 sensor.

By way of non-limiting example, for the design example sensor 222 of FIG. 25, the nominal minimum angular length, $\omega_L = (\omega_2 - \omega_1)$, of its reflective surface 227 is about 5.8°. On the other hand, for a lateral misalignment error of 0.15 mm, which corresponds to an error of about 40% in lateral position with respect to the 0.381 mm radius of the FIG. 25 design example waveguide 228, the angular length $\omega_L$ of the reflective surface 227 should be increased by at least about 2°, so that the rays of excitation light 30 don't miss the reflective surface 227 because of this misalignment error.

With respect to the input excitation light 30, there are two principal measures of performance for the optical sensor 222. The first principal measure is its "transport efficiency" for the excitation light 30, i.e. the percentage of the launched rays of the excitation light 30 from the right angle reflector 58 that are successfully conveyed to, and transported by, the optical sensor 222's sensing waveguide 228. Such rays of the excitation light 30 may be referred to as "transported rays". In general, as the number of transported rays increases, the total evanescent electric field strength that they generate around the sensing waveguide 228 will also increase. In addition, as the number of the transported rays having a reflected propagation angle $\theta_{0i}$ that is at, or near, the sensing waveguide 228's critical angle increases, the total evanescent electric field strength that they generate around the sensing waveguide 228 will also increase.

The second principal measure of performance for the optical sensor 222 is its sensing waveguide 228's "total evanescent electric field strength" at a specific distance from the sensing waveguide 228's outer surface that is generated by the transported rays. Each of the transported rays of the excitation light 30 will produce a corresponding evanescent electric field. Accordingly, the total evanescent electric field for the sensing waveguide 228 may be calculated by taking the sum of the individual evanescent electric fields that are produced by all of the transported rays. This provides a measure of the strength with which fluorescent signal molecules, such as those on the fluorophore-labeled antigens 104 of FIG. 1A, will fluoresce at any particular given nominal distance from the waveguide 228's outer surface as the design variables for the optical sensor 222 are adjusted. Typically, such a nominal distance will range from 0 to 100 nm, with 50 nm being an appropriate value for comparative analysis. Models for the evanescent electric field contribution of each of the transported rays can be found in articles such as "Instrumentation for Cylindrical Waveguide Evanescent Fluorosensors" by Lackie et al., published in 1991 by Wise and Winegard, copyright The Humana Press, Inc.

The waveguide 228's average evanescent electric field strength may then be determined by dividing the total evanescent electric field by the number of the rays of the excitation light 30 that are launched into the sensor 222, rather than dividing by the number of the transported rays that the waveguide 228 carries. In the following discussions, the waveguide 228's total evanescent field strengths are similarly referenced to a light source 46 that emits excitation light 30 having a constant amount of power.

Key goals for the sensor 222 are to maximize its transport efficiency for the excitation light 30 that is launched into it, and to maximize the total evanescent electric field strength around its sensing waveguide 228. However, some variations in these performance levels for the sensor 222 must be accepted over the tolerance range of expected misalignment errors of the right angle reflector 58 and the sensor 222 with respect to each other.

By way of non-limiting example, for the FIG. 25 polystyrene-in-water optical sensor 222 design case that is described herein, let it be assumed that the worst-case lateral misalignment error of the right angle reflector 58 and the sensor 222 is about ±0.15 mm. In general, an axial misalignment error between the reflector 58 and sensor 222 is not as critical an issue since it is relatively easy to mechanically control the spacing in one dimension between two objects, but it may be more difficult to assure two-dimensional lateral alignment between the same two objects, particularly if both objects must accommodate multiple parallel optical channels, such as might be found in a sensor array comprising multiple sensors 222 or 132a.

Let it be further assumed that the optical radius of the spherical excitation light lens 160 is 1.32 mm; and that the two important input propagation angles $\omega_1$ and $\omega_2$ are 76.1° and 85.4° in air, respectively. It will be recalled that the input propagation angles $\omega_1$ and $\omega_2$ are important because they correspond, respectively, to the largest and smallest cone angles for the input excitation rays 30C and 30D that can directly enter the sensing waveguide 228 after being reflected from the reflective surface 227. It will be further recalled that $\omega_1$ is determined by the divergence of the input rays of excitation light 30. The second angle $\omega_2$ is determined by the shape of the profile $r(\omega)$, that is, by the adjustable parameters $R_{90°}$, A, and B. This second angle, associated with the intersection of the reflective surface 227 with waveguide 228, may be independently selected by the designer and is typically set equal to a numerical aperture that is about ⅓ to ½ of the numerical aperture of the light source. It has been found that reflective surface 227's effectiveness improves slightly as this numerical aperture value is reduced, but the shape of reflective surface 227 becomes increasingly elongated. Long tapered plastic injection mold profiles with an optical quality finish are more difficult to make and this may create a practical limit to reducing $\omega_2$ further.

Due to the large number of independent variables involved in designing the reflective surface 227, it may be useful to optimize any particular desired reflective surface 227 by using a nonsequential ray-tracing program such as Opticad, made by Focus Software of Tucson, Ariz.

Using such techniques, it has been discovered that the amount of signal recovery light 32 that returns from sensing waveguide 228 can be made to be relatively constant and robust over a range of misalignment errors of the right angle reflector 58 and the sensor 222 with respect to each other, if the reflective surface 227 is designed so that reflected propagation angles $\theta_{0i}$ near $\omega_1$ are made less than the average reflected propagation angle $\theta_{0i}$ for the reflective surface 227, while reflected propagation angles $\theta_{0i}$ near excitation angle $\omega_2$ are made larger than the average. Such a strategy may provide a total evanescent electric field strength surrounding sensing waveguide 228 that exceeds that provided for the waveguide 28 of the sensor 22 design, which uses a constant reflected propagation angle $\theta_0$ equal to the average reflected propagation angle $\theta_{0i}$.

Figure 19:
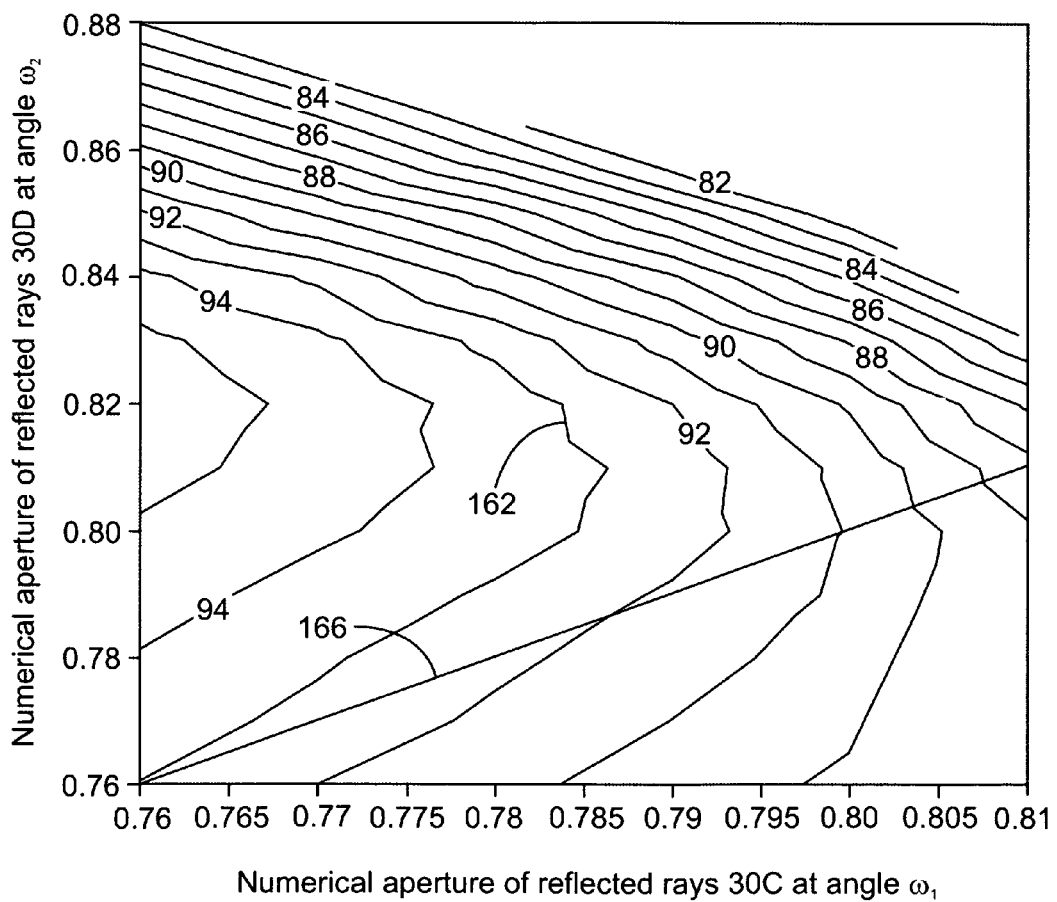
FIGS. 19 and 20 are graphs that depict iso-contour plots showing, respectively, the excitation light transport efficiency percentages for the FIG. 17 sensor, and the relative evanescent electric field strengths around the sensing waveguide of the FIG. 17 sensor, under a lateral misalignment condition.
Figure 20:
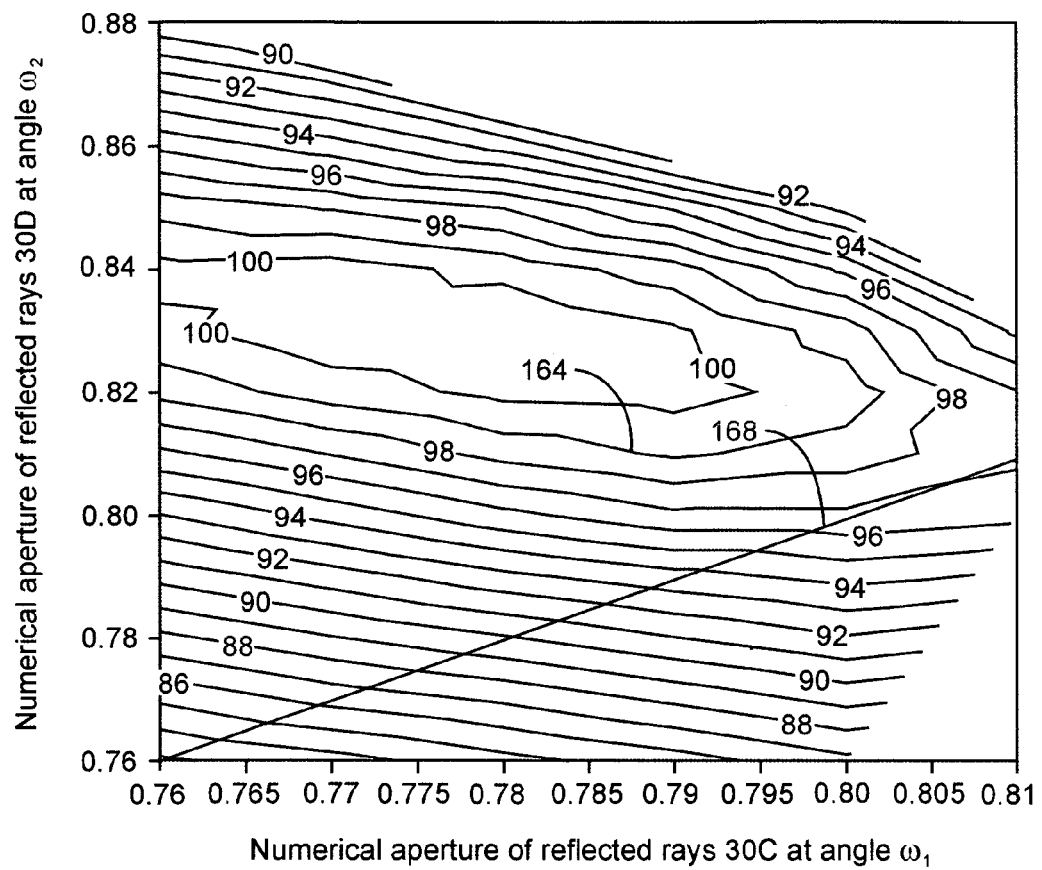

FIGS. 19 and 20 illustrate the effects of varying the shape of the reflective surface 227 when $\omega_1$ and $\omega_2$ have the particular assumed numerical values that were set forth above. Such changes in the shape of the reflective surface 227 change the reflected propagation angles $\theta_{0i}$ of the reflected rays of excitation light 30, and result in corresponding changes in the numerical aperture range for the reflected propagation angles $\theta_{0i}$ of excitation light 30 between $\omega_1$ and $\omega_2$, as well as for reflected propagation angles $\theta_{0i}$ outside of the $\omega_1$ to $\omega_2$ range.

Referring again to FIG. 19, it shows the optical sensor 222's transport efficiency for the excitation light 30 that is launched into it under the nominal worst-case lateral misalignment error of 0.15 mm, for a range of shapes for the reflective surface 227. The iso-contour plots 162 show the percentages of the input excitation light 30 from the right angle reflector 58 that are successfully transported by the sensor 222's sensing waveguide 228; and are plotted as functions of the numerical apertures of the rays of input excitation light 30C and 30D that have been reflected from the reflective surface 227 at the two important input propagation angles $\omega_1$ and $\omega_2$, respectively.

Referring now to FIG. 20, it shows the relative total evanescent electric field strength for the sensing waveguide 228 at a distance of 50 nm from its outer surface, under the nominal worst-case lateral misalignment error of 0.15 mm, for a range of shapes for the reflective surface 227. The iso-contour plots 164 are plotted as functions of the numerical apertures of the rays of input excitation light 30C and 30D that have been reflected from the reflective surface 227 at the two important input propagation angles $\omega_1$ and $\omega_2$, respectively.

It can be seen from FIGS. 19 and 20 that both the highest transport efficiency for the excitation light 30 and the highest relative total evanescent electric field strength at a nominal worse-case 0.15 mm lateral misalignment error are obtained: (a) when the numerical aperture of a reflected excitation light ray 30D having an input propagation angle $\omega_2$ is about 0.83; and (b) when the numerical aperture of a reflected excitation light ray 30C having an input propagation angle $\omega_1$ is about 0.78, thereby providing an average numerical aperture over this angular extent of the reflective surface 227 of about 0.805, as compared to the limiting numerical aperture of 0.856 for rays of excitation light 30 in a polystyrene waveguide 228 that is immersed in water at 20° C.

FIGS. 19 and 20 also allow a comparison to be made between the constant reflected propagation angle $\theta_0$ reflective surface 27 of the optical sensor 22, and the variable reflected propagation angle $\theta_{0i}$ reflective surface 227 of the optical sensor 222. The constant reflected propagation angle $\theta_0$ reflective surface 27 design is given by the subset of points in FIGS. 19 and 20 that have the same ordinate and abscissa values, that is, the same numerical aperture values at $\omega_1$ and $\omega_2$. Designs having a constant reflected propagation angle $\theta_0$ reflective surface 27 therefore fall along the straight lines 166 and 168 in the respective FIGURES.

When the constant reflected propagation angle $\theta_0$ reflective surface 27 having a numerical aperture of 0.805 is compared to the variable reflected propagation angle $\theta_{0i}$ reflective surface 227 having the previously mentioned average numerical aperture of 0.805, it can be seen that the variable reflected propagation angle $\theta_{0i}$ reflective surface 227 has a higher transport efficiency for the excitation light 30 that is launched into it by the right angle reflector 58, and also has a higher relative total evanescent electric field strength as well.

Accordingly, in most cases the variable reflected propagation angle $\theta_{0i}$ reflective surface 227 will be superior to the equivalent constant reflected propagation angle $\theta_0$ reflective surface 27, within a certain range of lateral, axial and/or angular misalignment errors of the sensor 222 and the right angle reflector 58 with respect to each other.

The design of the optical sensor 222's lens portion 224 will now be addressed. It has been discovered that if the lens portion 224 is made in a radially segmented bifocal form comprising a central, small, relatively short focal length excitation light lens 160, and a coaxial, concentric, large, annular, relatively long focal length, signal recovery light lens 174 that surrounds the lens 160, then at least three important benefits will be achieved. The lenses 160, 174 may each be spherical or aspherical. By way of non-limiting example, in the discussion that follows, the lens 160 is selected to be spherical, while the lens 174 is selected to be aspherical. The lenses 160, 174 may each comprise a single or a compound lens.

Similar benefits will be achieved for the slab sensor 132a whose lens portion 134a may also comprise an inner, small, relatively short focal length excitation light lens through which the sensor 132a's common optical plane of symmetry passes, and an outer, large, relatively long focal length, signal recovery light lens that overlies its excitation light lens. The lens portion 134a may comprise cylindrical or non-cylindrical excitation light and signal recovery light lenses, which may be single or compound lenses. The comments below regarding the lens portion 224 of the sensor 222 also apply to the lens portion 134a of the slab sensor 132a, with the understanding that the cylindrical lens refracting surface profiles for its inner excitation light lens and its outer signal recovery light lens are one-dimensional Cartesian refracting surfaces referenced to the common optical plane of symmetry for the slab sensor 132a, instead of the rotationally symmetric refracting surfaces profiles that are referenced to the common optical axis 45 for the sensor 222.

Such a radially segmented bifocal lens portion 224 of the optical sensor 222 may also allow the manipulation of excitation light 30 analogous to methods previously described for the slab sensors 132, 132a. In particular, if the refractive surface of the excitation light lens 160 is designed to focus excitation light 30 to a point between lens 160 and reflective surface 227, then an imaged source is produced that provides an internal origin O to use in the design of reflective surface 227, as was similarly done with the cylindrical lens portions 134, 134a for the slab sensors 132, 132a. This allows the use of light sources which include lenses that emit a collimated beam of excitation light 30. Methods for creating and manipulating a collimated beam of excitation light 30 are well known to those skilled in the art. One of the simplest designs involves placing a point light source, such as right angle reflector 58, at the focal point of a refracting or reflecting lens.

Potential advantages associated with the use of a collimated beam of input excitation light 30 include reducing the effect of lateral and axial misalignment errors of sensor 222 and the right angle reflector 58 with respect to each other, and less risk of excitation light 30 from small sources of excitation light 30 being substantially obscured by surface dust and debris. Potential disadvantages include increased effects of angular misalignment errors, added flare light produced by the excitation light 30 because of a larger light beam cross-section and a longer ray path for the excitation light 30 in sensor 222 material, and a larger overall size of the sensor 222 to accommodate a collimated beam of excitation light 30.

The benefits of using a bifocal lens portion 224 when the source of excitation light 30 is a small emitter with a diverging output beam profile for the excitation light 30, such as that produced by the right angle reflector 58, will now be discussed.

The first important benefit of the radially segmented bifocal lens portion 224 of the optical sensor 222 that will be achieved is that, over a certain range of lateral, axial and/or angular misalignment errors of the optical sensor 222 and the right angle reflector 58 with respect to each other, its excitation light lens 160 will provide an additional, beneficial, degree of control over the rays of the input excitation light 30 that enter the optical sensor 222. That is, the lens 160 will, in combination with the reflective surface 227, minimize degradations in the sensor 222's transport efficiency for the input excitation light 30 that is launched into it by the right angle reflector 58, and will also minimize degradations in the sensing waveguide 228's total evanescent electric field strength, despite that range of misalignment errors. Another beneficial effect of the excitation light lens 160 is to adjust the effective optical spacing of the right angle reflector 58 from the reflective surface 227. As discussed earlier, the reflective surface 227's performance improves as it is made more axially elongated, but long reflective surfaces 227 are more difficult to produce. The lens 160 can be designed to refract rays of excitation light 30 so that the effective focal length for excitation light 30 is increased without there being an actual physical increase in axial length of the reflective surface 227. The bifocal lens portion 224 therefore allows the excitation light 30 and signal recovery light 32 processes to be independently optimized.

The lens 160 may be operable to receive at least some of the excitation light 30 and to direct it to the reflective surface 227.

The lens 160 may have a shape and a size that are selected to enable the sensing waveguide 228 to receive an amount of the reflected excitation light 30 from the reflective surface 227 that is equal to at least about 75% of the excitation light 30 that is received by the lens 160, although the sensing waveguide 228 may receive less than this percentage. The lens 160 may have a physical radius with respect to the optical axis 45 that is selected to enable it to receive less than about 20% of the total amount of signal recovery light 32 from the sensing waveguide 228 and reflective surface 227, although the lens 160 may receive more than this percentage.

Figure 23:
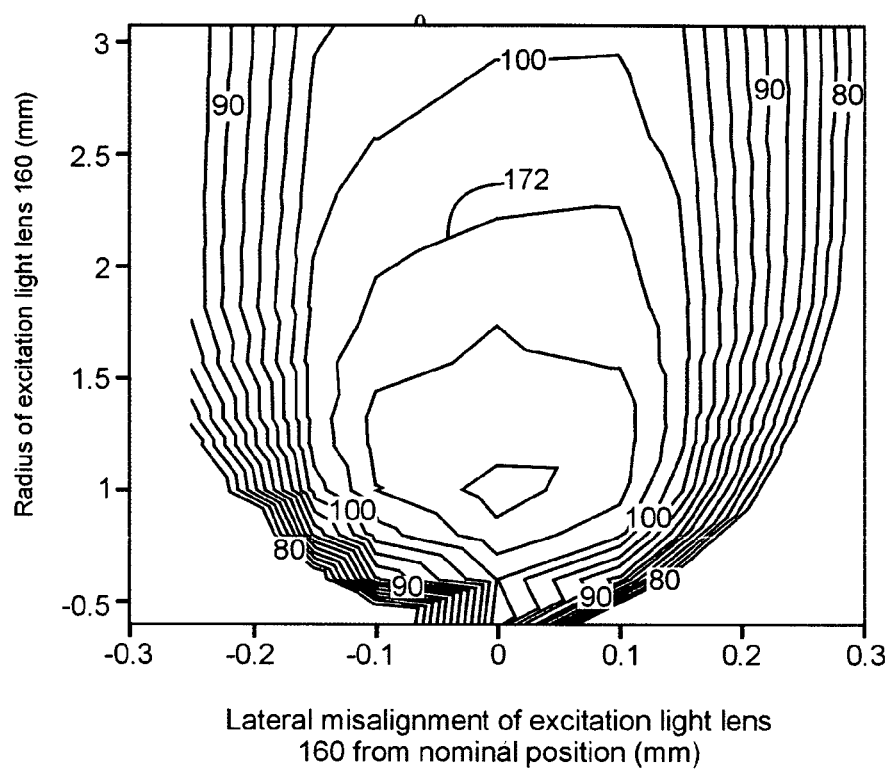

For example, as seen in FIG. 23, a 1.5 mm optical radius lens 160 that is centered on the optical axis 45 provides 104 units of relative total evanescent field strength; and provides 101 units while at a nominal lateral misalignment error of 0.15 mm. This represents a loss of only about 3% in the total evanescent electric field strength despite the 0.15 mm misalignment, which is quite an achievement.

By way of comparison, as seen in FIG. 20, for a 0.15 mm nominal lateral misalignment of the sensor 22 with a 1.32 mm lens radius there are only about 97 units of relative total evanescent electric field strength at the constant reflected propagation angle $\theta_0$ design point $(\omega_1, \omega_2)=(0.805, 0.805)$, which corresponds to the average numerical average of the example variable reflected propagation angle $\theta_{0i}$ design point $(\omega_1, \omega_2)=(0.78, 0.83)$. Thus, sensor 222 with a variable reflected propagation angle $\theta_{0i}$ offers about a 4% increase in total evanescent electric field strength over the sensor 22 with a constant reflected propagation angle $\theta_0$, at a 40% lateral misalignment error relative to the 0.381 mm radius of the waveguide 228.

Figure 27:
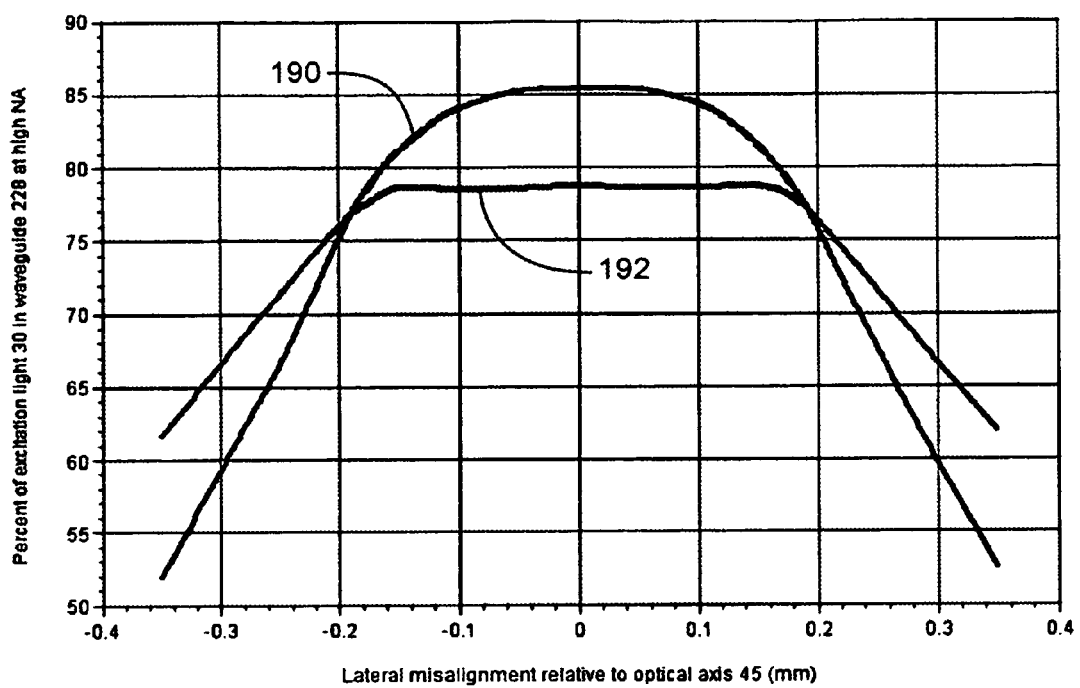
FIG. 27 depicts graphs that show for two different sensors the percentage of the excitation light in their respective sensing waveguides, as a function of lateral misalignment errors.
Figure 28:
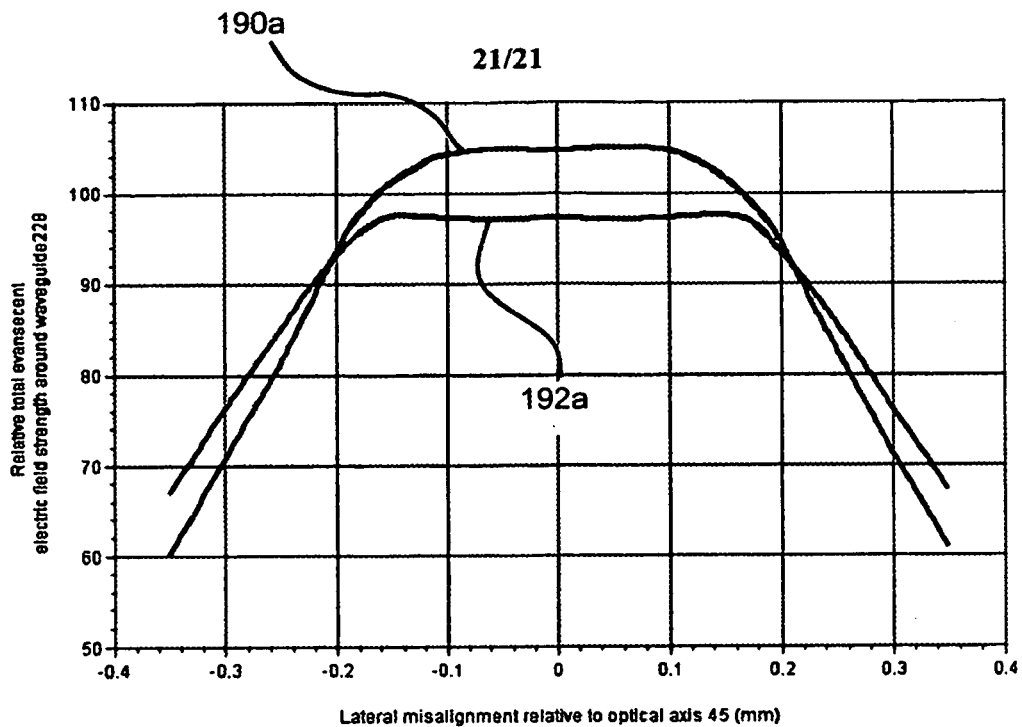
FIG. 28 depicts graphs that show for two different sensors the relative total evanescent field strength around their respective sensing waveguides as a function of lateral misalignment errors.
Figure 29:
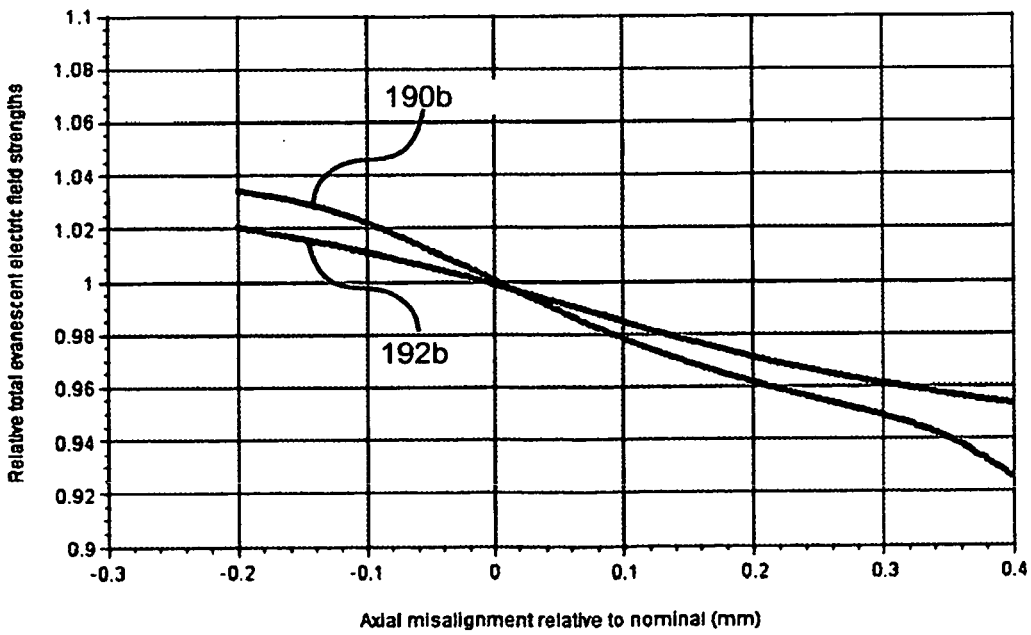
FIG. 29 depicts graphs that show for two different sensors the relative total evanescent field strength around their respective sensing waveguides as a function of axial misalignment errors.

If the effect of lateral misalignment errors between the right angle reflector 58 and the variable reflected propagation angle $\theta_{0i}$ sensor 222 or the constant reflected propagation angle $\theta_0$ sensor 22 is calculated for both of the sensors 222 and 22, the comparisons shown in FIGS. 27 and 28 are found. If the effect of axial misalignment errors between these components is calculated for the sensors 222 and 22, the comparison shown in FIG. 29 is found. The lateral misalignment errors are measured with respect to the common optical axis 45 in both FIGS. 27 and 28.

In FIGS. 27-29, the sensor 222's performance is depicted by the respective curves 190, 190a and 190b when it has an excitation light lens 160 with an optical radius of 1.5 mm, while the sensor 22's performance is depicted by the respective curves 192, 192a and 190b when it has a lens 24 with an optical radius of 2.4 mm.

FIG. 27 shows the effect of lateral misalignment errors on the capture efficiency of the sensors 222 and 22 regarding the excitation light 30. In particular, FIG. 27 shows the percentage of excitation light 30 that enters the sensing waveguide 228 (for sensor 222) or the sensing waveguide 28 (for sensor 22) at a high numerical average after being reflected from the reflective surface 227. This high numerical average reflected excitation light 30 is effective in producing an evanescent electric field around the waveguides 228 and 28. Excluded are low numerical average rays of excitation light 30 that enter the sensing waveguide 228 directly, without being reflected from the reflective surface 227. Of course, all of the excitation light 30 that enters the waveguides 228 and 28 will make some contribution to the evanescent electric field (except for excitation light 30 that enters parallel or nearly parallel to the optical axis 45), although excitation light 30 that enters at, or near, the critical angle of the waveguides 228 and 28 will make the most important contributions to the evanescent electric field.

FIG. 28 shows the relative total evanescent electric field strengths for the sensors 222, 22 at a 50 nm distance from the waveguides 228 and 28, as a function of a lateral misalignment error, expressed as the ratio of field strength with misalignment, to that with no misalignment. This is a measure of the excitation effectiveness of the transported input excitation light 30 carried by the sensing waveguides 228 and 28 on whatever fluorophore(s) may be near the outer surfaces of the sensing waveguides 228, 28 and involved in sensing the target analyte. Those field strengths correspond to the FIG. 27 capture efficiencies of sensors 222, 22 regarding the excitation light 30.

FIGS. 27 and 28 show that when there is no lateral misalignment error the variable reflected propagation angle $\theta_{0i}$ sensor 222 is about 8% more effective than the constant reflected propagation angle $\theta_O$ sensor 22 in capturing rays of excitation light 30 and creating an evanescent electric field surrounding their respective waveguides 228 and 28. In addition, the sensor 222 achieves superior performance over a range of ±0.15 mm of lateral misalignment, which is equal to about 40% of the radius of the waveguides 228 and 28. Beyond that point, both of the sensors 222 and 22 fall off in effectiveness at capturing the excitation light 30.

The effect of axial misalignment errors between the right angle reflector 58 and the variable reflected propagation angle $\theta_{Oi}$ sensor 222 or the constant reflected propagation angle $\theta_O$ sensor 22, with respect to the common optical axis 45 is seen in FIG. 29, where the relative total evanescent electric field strengths at a 50 nm distance from the waveguides 228 and 28 are shown, expressed as the ratio of field strength with misalignment, to that with no misalignment, as a function of an axial misalignment error from the nominal axial position. This nominal axial position corresponds to a situation wherein a 0.25 mm air gap exists between the interrogation module 40 and waveguide sensors 222 or 22.

As the amount of axial misalignment is varied, both of the sensors 222 and 22 show a monotonic change in their relative total evanescent electric field strengths. For a 1.5 mm axial misalignment error, the sensor 222 exhibits about a 3% variation in its relative total evanescent electric field strength as compared to its nominal position, while the sensor 22 exhibits about a 1.5% to 2% variation.

As discussed earlier, axial misalignment errors are more easily dealt with as a design issue, but the intentional use of an axial distance from the right angle reflector 58 to the sensor 222 that is different from the nominal axial distance may allow its waveguide 228 to be tuned in situ to emphasize small or large target analytes. This is because the total evanescent electric field around the waveguide 228 decreases exponentially from the waveguide 228's outer surface, and the penetration depth of the total evanescent electric field into the surrounding fluid increases as the average ray angle that the transported excitation light 30 in the waveguide 228 makes with the waveguide 228's outer surface approaches the waveguide 228's critical angle.

The axial distance between the right angle reflector 58 and the sensor 222 defines which portion of the sensor 222's reflective surface 227 is hit by the fan of rays of excitation light 30 from the right angle reflector 58. Since the number of rays of excitation light 30 per unit of fan angle (the angle that a ray of excitation light 30 from the right angle reflector 58 makes with respect to the optical axis 45), will typically be a maximum at some intermediate fan angle within the fan of rays of excitation light 30, and since the sensor 222's reflective surface 227 reflects the excitation light 30 impinging upon it at a variable reflected propagation angle $\theta_{Oi}$ that changes with axial location along the reflective surface 227's axial length, these factors allow the average ray angle that the transported rays of excitation light 30 within the waveguide 228 make with respect to the waveguide 228's outer surface to be varied by simply adjusting the axial distance between the right angle reflector 58 and the sensor 222. This axial tuning process also occurs with the constant reflected propagation angle $\theta_O$ sensor 22 to a lesser extent, but it is not as amenable to control or adjustment since its reflective surface 27 is designed to produce rays of excitation light 30 having only a single reflected propagation angle $\theta_O$, and the effect of the refractive surface of its lens 24 on rays of excitation light 30 is small.

Therefore, by adjusting the average ray angle the evanescent electric field's penetration depth into the surrounding fluid may be conveniently varied, thereby enabling the performance of the sensor 222 to be tuned or optimized for a particular size of target analyte in the surrounding fluid.

Thus, by way of nonlimiting example, if the target analyte is a large bacterium, and if a sandwich assay is being used, then an axial misalignment error may be intentionally selected that will provide the waveguide 228 with excitation light 30 having an average ray angle that is very near to the waveguide 228's critical angle. For example, as seen in FIG. 29, an intentional −0.2 mm axial misalignment error will desirably increase the relative total evanescent electric field strength around the waveguide 228 as compared to that which would occur with a zero misalignment error. If this is done, then the evanescent electric field's penetration into the surrounding fluid is increased and a maximum amount of signal recovery light 32 is obtained. But this will also increase background signal recovery light 32 from any fluorophores in the sample fluid, and increase the risk of damage from sand and other debris that may lodge between the interrogation module 40 and the sensor 222, so this option must be considered with care.

On the other hand, if the target analyte is small, such as a protein, and if a competition, displacement or sandwich assay is used, then a strong evanescent electric field is needed only close to the waveguide 228's outer surface, and it may not be necessary for the excitation light 30 to have an average ray angle that so closely approaches the waveguide 228's critical angle.

The second important benefit of the radially segmented bifocal lens portion 224 of the optical sensor 222 is that, over a certain range of lateral, axial and/or angular misalignment errors of the sensor 222 and the right angle reflector 58 with respect to each other, the excitation light lens 160 will provide an additional, beneficial, degree of control over the undesirable back-scattered excitation light 30 that returns from the sensing waveguide 228. Such back-scattered excitation light 30 is undesirable because it does not carry information about the target analyte, and could thus interfere with an accurate interpretation of the signal recovery light 32 by the interrogation module 40.

Back-scattered light excitation light 30 issues from the sensing waveguide 228 with an intensity distribution that is a decreasing function of the angle that the rays of the back-scattered excitation light 30 make with respect to the optical axis 45 of the sensing waveguide 228, up to its limiting numerical aperture of 0.856 for the example polystyrene-in-water sensing element 222 of FIG. 25. That is, the intensity of the back-scattered excitation light 30 at the interrogation module 40 will be the greatest along the common optical axis 45 between the interrogation module 40 and the sensing element 222.

Since the optical radius of the small excitation lens 160 is normally much smaller than its axial distance from the proximal end of the sensing waveguide 228, for all practical purposes the small excitation lens 160 sees the rays of the back-scattered excitation light 30 as being quasi-collimated, and will attempt to focus them to a diffuse point inside the interrogation module 40 at the focal point of the lens 160. That is, the lens 160 will collect and concentrate those rays towards a point in back of (on the left side of), the glass plate 67 in the window 60 of the interrogation module 40 that is seen in FIG. 7A.

However, since the window 60 includes an opaque circular obscuration 68, this focusing effect of the lens 160 serves to more effectively remove the core component of the back-scattered excitation light 30, as compared to the lens 24 of the sensor 22 that does not include a small excitation light lens 160. Similarly, the obscuration 68 may be rectangular, rather than circular, for the slab sensor 132a with its lens portion 134a, which may comprise bifocal cylindrical and non-cylindrical lenses.

For example, for the FIG. 25 design case of the sensor 222, rays of back-scattered excitation light 30 issuing from the sensing waveguide 228 and impinging on the interior surface of lens 160 are more or less parallel to the common optical axis 45 and would be focused by the lens 160 to a point in air that was about 2.6 mm outside the lens 160. Since the window 60 in the interrogation module 40 is much closer to the lens 160 than this, a major favorable effect of the lens 160 is to focus the back-scattered excitation light 30 towards the optical axis 45 where it will be desirably blocked by the obscuration 68. This focusing effect of the lens 160 may have the desirable effect of enabling the use of an obscuration 68 than is smaller than might otherwise be the case, resulting in more of the signal recovery light 32 reaching the photodetector 64.

The third important benefit of the radially segmented bifocal lens portion 224 of the sensor 222 is that, over a certain range of lateral, axial and/or angular misalignment errors of the optical sensor 222 and the optical interrogation module 40 with respect to each other, its coaxial, concentric, annular, signal recovery light lens 174 will, in combination with the reflective surface 227, form the signal recovery light 32 into an at least substantially collimated beam that is substantially parallel to the optical sensor 222's optical axis 45, to increase the transfer of signal recovery light 32 into interrogation module 40, and to increase the rejection of back-scattered excitation light 30 by the interrogation module 40, despite that range of misalignment errors. Rejection of such back-scattered excitation light 30 by the interrogation module 40 is increased because the effectiveness of the module 40's laser-line rejection filter 66 is highest when the rays of back-scattered excitation light 30 impinge on it at, or near, a right angle with respect to the filter 66's surface (i.e., when the back-scattered excitation light 30 is collimated or nearly collimated by the lens 174).

The size and shape of the lens 174 may be selected to enable it to receive more than about 80% of the signal recovery light 32 that is directed from the reflective surface 227 and waveguide 228.

For optimal recovery of the signal recovery light 32 by the interrogation module 40, the example polystyrene-in-water design of the optical sensor 222 of FIG. 25 that is described herein would require a conventional non-bifocal, spherical signal recovery light lens (such as the lens 24 of FIG. 9), having a focal length of about 7 mm. But a significant problem with such a lens 24 is that it would beneficially influence the input excitation light 30 to only a small degree, if at all, with respect to an optical sensor 222 having a variable reflected propagation angle $\theta_{0r}$ reflective surface 227. Similarly, if the lens 24 was optimized for its handling of the input excitation light 30 for the optical sensor 222, then its performance in collimating the signal recovery light 32 would be substantially degraded.

However, the remarkable bifocal lens portion 224 of the optical sensor 222 will beneficially influence, in relative independence, both the input excitation light 30 and the signal recovery light 32 by means of its small excitation light lens 160 and its large, concentric, signal recovery light lens 174, respectively.

This performance of the bifocal lens portion 224 is possible because most of the signal recovery light 32, such as that emitted by fluorophore-labeled antigens 104 located near the outer surface of the sensing waveguide 228, enters the waveguide 228 obliquely, creating a large proportion of skew rays of the signal recovery light 32 that impinge primarily on the large, concentric signal recovery light lens 174. As a result, the small central area of the lens 174 that is occupied by the excitation light lens 160 will be relatively devoid of signal recovery light 32.

In addition, the bifocal lens portion 224 may help to maximize the beneficial handling of both the input excitation light 30 and the signal recovery light 32 by the optical sensor 222, despite a certain range of lateral, axial and/or angular misalignment errors of the sensor 222 and the right angle reflector 58 with respect to each other.

The design of the size and shape of the excitation light lens 160 will now be addressed. Similar comments would apply to the design of the cylindrical or non-cylindrical excitation light lens of the slab sensor 132a.

The minimum physical diameter of the excitation light lens 160 may be determined by subjecting the right angle reflector 58 to the maximum tolerable lateral misalignment error and then seeing what physical diameter for the lens 160 is required so that all of the excitation light rays 30 from the right angle reflector 58 will impinge on it, rather than on the annular signal recovery light lens 174.

Figure 21:
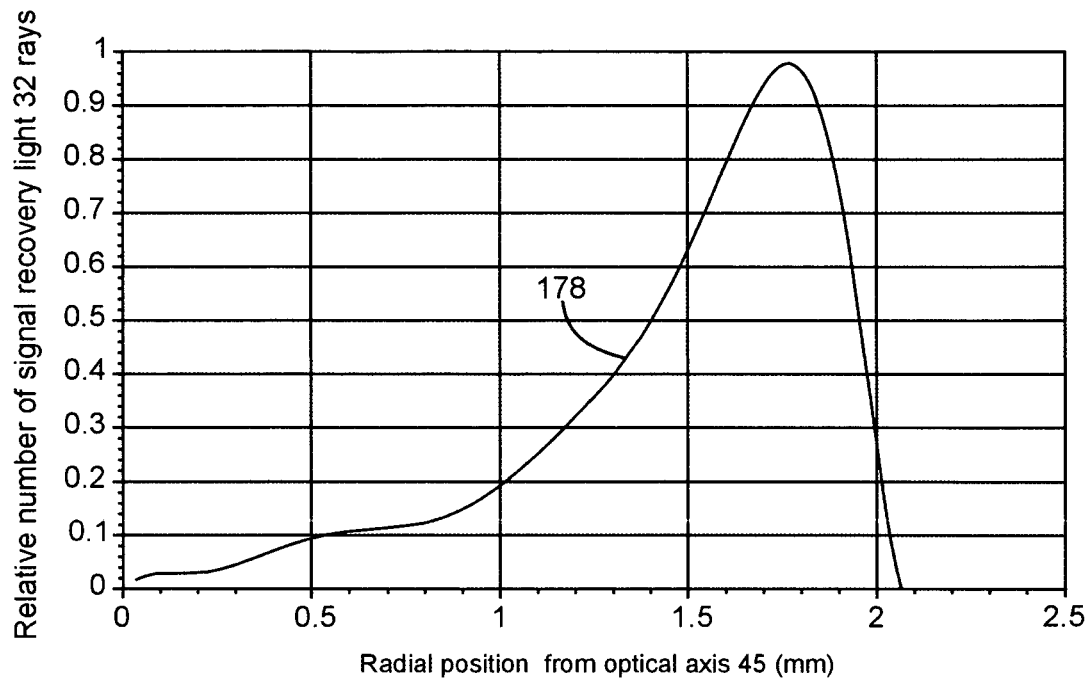
FIG. 21 is a graph that depicts the relative number of rays of the signal recovery light returning from the sensing waveguide of the FIG. 17 sensor as a function of radial position from the sensor's optical axis.

The lens 160's maximum physical diameter may be selected by referring to the distribution curve 178 that is shown in FIG. 21. The curve 178 provides the relative number of the rays of signal recovery light 32 as a function of radial position from the optical axis 45, at a position on the optical axis 45 corresponding to the tip of lens 160. In producing the distribution curve 178 the outer surface 175 of the lens 174 was assumed to be flat, rather than curved, so as to present the ray profile it would have before it had been modified by any refracting surface. By way of nonlimiting example, it can be seen from FIG. 21 that an excitation light lens 160 that was placed within a circle defined by a 0.75 mm radius perpendicular to the optical axis 45 would affect a only a small portion of the signal recovery light 32. Thus, 1.50 mm may be a suitable maximum physical diameter for the lens 160. However, a smaller or larger maximum physical diameter for the lens 160 may be selected, depending on the totality of the circumstances and the desired performance of the sensor 222. The minimum and maximum physical size of a cylindrical or non-cylindrical excitation lens of the slab sensor 132a is determined in a similar fashion.

Due to the large number of independent variables that are involved, it may be useful to optimize the aspherical shape or optical radius of any particular desired lens 160 by using a nonsequential ray-tracing program such as Opticad, made by Focus Software of Tucson, Ariz. A contour plot strategy, similar to that used above regarding the reflective surface 227, may also be used in designing the size and shape of the lens 160. For the polystyrene-in-water design case for the optical sensor 222 of FIG. 25 that is described herein, it has been assumed that its excitation light lens 160 was made of polystyrene and had a spherical profile.

Figure 22:
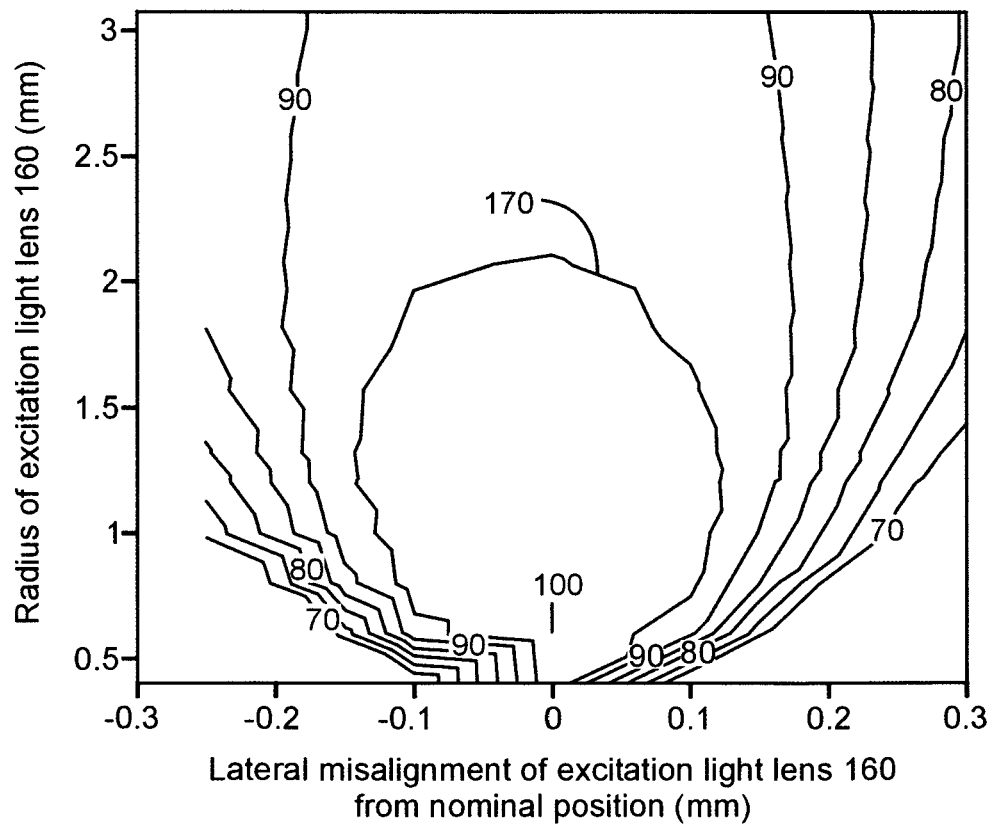
FIGS. 22 and 23 are graphs that depict iso-contour plots showing, respectively, the excitation light transport efficiency percentages for the FIG. 17 sensor, and the relative evanescent electric field strengths around the sensing waveguide of the FIG. 17 sensor, as a function the of radius of the sensor's excitation light lens and a range of lateral misalignment conditions.

Referring now to FIGS. 22 and 23, the effect of passing the launched rays of the excitation light 30 from the right angle reflector 58 through spherical excitation light lenses 160 having different optical radii is shown for the design example reflective surface 227 of FIG. 25 discussed herein that had an average numerical aperture of 0.805 for the transported rays of the excitation light 30 that are carried by the sensor 222's sensing waveguide 228.

FIG. 22 shows the optical sensor 222's transport efficiency for input excitation light 30 that is launched into it. The iso-contour plots 170 show the percentages of the input excitation light 30 that are successfully transported by the sensor 222's sensing waveguide 228. The iso-contour plots 172 of FIG. 23 show the sensing waveguide 228's relative total evanescent electric field strength at a distance of 50 nm from its outer surface. The iso-contour plots 170, 172 are plotted as functions of the optical radius of the excitation light lens 160 and the lateral misalignment of the sensor 222 relative to the right angle reflector 58.

FIGS. 22 and 23 show that as the optical radius of the excitation light lens 160 decreases, the sensor 222's transport efficiency and the sensing waveguide 228's relative total evanescent electric field strength are significantly influenced. By way of non-limiting example, from these FIGURES it can be seen that to maintain a relatively constant and comparatively high transport efficiency and total evanescent electric field strength over a ±0.15 mm lateral misalignment error range, it may be preferred that the excitation light lens 160 have an optical radius in about the 1.25 mm to 1.75 mm range for the design example of the sensor 222 of FIG. 25 that is discussed herein.

In general, an axial misalignment error between the right angle reflector 58 and the sensor 222 does not have as dramatic an effect on the behavior of the rays of the excitation light 30 as does a lateral misalignment error of the same size. When an analysis similar to that performed above is done for an axial misalignment error range of ±0.15 mm, the effects on the optical sensor 222's transport efficiency and on the sensing waveguide 228's relative total evanescent electric field strength are less than for a lateral misalignment error in that same range.

Regarding the sensor 222's flange 176 and spacing member 185 seen in FIGS. 17 and 25, they may have any diameter and any outer surface shape, as long as they are sized and shaped so that the signal recovery light 32 will not impinge on their outer surfaces; and they may be integrated into a single member. Regarding the total axial thickness of the flange 176 and spacing member 185, the primary optical concern is that the correct distance from the right angle reflector 58 to the reflective surface 227 is preserved so that the desired reflective properties of the reflective surface 227 as defined by r(ω) are not affected.

The design of the large, concentric, signal recovery light lens 174 will now be addressed. Similar comments would apply to the design of the cylindrical or non-cylindrical signal recovery light lens of the slab sensor 132a.

It has been discovered that the lens 174 should preferably be made with an aspherical outer surface 175 because such an outer surface 175 may be better at collimating the signal recovery light 32 returning from the sensing waveguide 228, while simultaneously also being better at discriminating and rejecting back-scattered excitation light 30 from the sensing waveguide 228, as compared to a spherical outer surface 175. However, as an alternative, the outer surface 175 may be selected to be spherical.

To obtain the most favorable aspherical shape for the outer surface 175 of the lens 174 for collimating signal recovery light 32 returning from the optical sensor 222's sensing waveguide 228, an iterative numerical method for generating that aspherical shape was invented. A similar iterative method may also be used to obtain the most favorable non-cylindrical shape for the outer surface 175.

Because the rays of signal recovery light 32 do not emanate from an ideal point source, it is impossible to construct an aspherical shape for the outer surface 175 of the lens 174 that provides perfect collimation of the signal recovery light 32. However, the iterative method herein described provides a smooth, continuous, aspherical collimating surface shape for the outer surface 175 of the lens 174 that is optimum for collimating the largest possible fraction of the rays of the signal recovery light 32 that return from the sensing waveguide 228.

Such a method is useful because the rays of both the signal recovery light 32 and the back-scattered excitation light 30 travel by many different and complex paths before encountering the lens 174. For example, when the sensor 222's reflective surface 227 is axially short, only a small percentage of such rays may graze the reflective surface 227 because most of such rays arrive at the lens 174 directly from the sensing waveguide 228. However, as the axial length of the reflective surface 227 increases, a higher percentage of such rays will reflect one or more times from the reflective surface 227 prior to encountering the lens 174. In either case, because such rays do not originate from a point source, a numerical, iterative lens design method is needed to design the best refracting outer surface 175, considering the diverse origins of such rays and the desire to produce an exit beam with the highest proportion of such rays that are parallel to optical axis 45.

It should be noted that the numerical iterative method that has been discovered is effective for a wide range of optical designs in situations where a symmetrical but diffuse distribution of light rays impinges on what would normally be a spherical or cylindrical refracting lens surface. The previously mentioned nonsequential ray-tracing program may be used in the iterative method of the present invention for designing the most favorable aspherical shape for the lens 174's outer surface 175, for designing an aspherical excitation light lens 160, for designing an aspherical lens for an optical sensor 22 with a constant reflected propagation angle $\theta_0$ reflective surface 27, for designing non-cylindrical excitation light and signal recovery light lenses for the slab sensor 132a, or for designing an aspherical or non-cylindrical lens for any other optical device requiring a collimated, or a maximally collimated, optical output.

The numerical iterative method of the present invention will work for designing a collimating outer surface for any lens for which the distribution of input light propagation angles is primarily a function of one orthogonal direction. In general, in this method the outer surface of the lens in this one orthogonal direction is divided into contiguous segments. If the outer surface can be described by polar coordinates and the input light propagation angles are a function of radial position on the lens' outer surface, as for example with a lens 174 having a spherical or aspherical outer surface 175, then the segments are annular in nature. On the other hand, if Cartesian coordinates can describe the outer surface, as for example with a cylindrical lens, and such propagation angles are primarily a function of only one dimension, then the segments will be parallel strips over the cylindrical lens's outer surface. The annular and strip like segments may, or may not, have a constant width; and are preferably contiguous with each other, although they might not be contiguous with each other.

Turning again to the design of an aspherical outer surface 175 for the lens 174, in the first iteration of the method of the present invention, the outer surface 175 is assumed to be planar and perpendicular to the common optical axis 45 of the sensor 222 and its lens 174. This initial assumed shape for the outer surface 175 is then divided into a number of coaxial, concentric, annular, radial ring segments with respect to the optical axis 45. By way of nonlimiting example, the number of annular segments may range from about 10 to 100. This number is determined by the desired accuracy of the outer surface 175, and the amount of statistical variation in ray direction among the input test light rays impinging on a given annular segment.

In the ray tracing program, a sufficient number of input test light rays having initially random propagation directions are launched into the sensing waveguide 228 at its distal end from one or more circumferential locations immediately under the sensing waveguide 228's cylindrical outer surface so as to mimic the injection of rays of signal recovery light 32 from fluorescent signal molecules near the waveguide 228's outer surface, such as from fluorophore-labeled antigens 104.

Alternatively, the input test light rays may be selected to mimic any other particular source of input light rays, such as a point light source or a line light source, for example.

The exact number of input test light rays that are sufficient will depend on variables such as the desired degree of accuracy, and may be easily determined by those of ordinary skill in the art. However, by way of non-limiting example, a sufficient number of input test light rays may be in the range of about 10,000 to about 50,000, more or less.

The impact points and direction cosines of those test light rays that reach the assumed planar outer surface 175 of the lens 174 are then stored for use in the iterative method of the present invention. They are stored because those impact points and direction cosines continue to define the input trajectories of those test light rays even when the outer surface 175 is no longer planar, as will be the case in the second and subsequent iterations of the method of the present invention that is described below.

At each annular segment the average ray angle is calculated for all test light rays impinging on that particular annular segment, by using the stored impact point and direction cosine data. This average ray angle is then used to calculate for that particular annular segment a local surface slope for its outer surface 175 that is selected to cause a respective average test light ray for that particular annular segment to emerge from that particular annular segment parallel to the optical axis 45. This local slope is derived using Snell's Law, well known to those skilled in the art.

The resulting computed local surface slopes versus radial positions for all annular segments are then integrated numerically using Simpson's rule to produce a first iteration surface shape for the outer surface 175 of the lens 174. Since this first iteration surface shape will typically be nonplanar, the original test light ray impact points on the initial, assumed planer, outer surface 175 will no longer be correct.

Accordingly, for the second iteration of the method of the present invention, new impact points of test light rays impinging on the first iteration surface shape are calculated for each annular segment of the first iteration surface shape, by using the previously stored data for impact points and direction cosines on the planar surface shape because those impact points and direction cosines will still define the trajectories of those test light rays impinging on the first iteration surface shape.

The average ray impact angles for the annular segments of the first iteration surface shape are then calculated by using the newly calculated impact points and the input ray direction cosines at each annual segment of the first iteration surface shape. These average ray impact angles are then used to calculate the local surface slopes of the annular segments of the outer surface 175 that will provide refracted exit rays parallel to the optical axis 45, by using Snell's Law. The resulting computed local surface slopes versus radial position for all annular segments are then integrated numerically using Simpson's rule to produce a second iteration surface shape for the outer surface 175 of the lens 174.

The above iterative method may be repeated as many times as needed, to produce third iteration and subsequent iteration surface shapes for the lens 174's outer surface 175, with each iteration using the calculated surface shape for the outer surface 175 from the previous iteration as a starting point. By way of non-limiting example, the number of iterations needed may fall in the range of from about 6, or less, to about 20, or more.

In all cases considered, it has been found that the above iterative method converges to a stable aspherical surface shape for the outer surface 175 of the lens 174. For example, for test cases where the input test light rays emanated from a point source located on the optical axis 45 within the sensing waveguide 228, this iterative method generated an aspherical outer surface 175 for the lens 174 that refracted the input test light into a perfectly collimated beam of light over its extent, for all practical purposes.

On the other hand, where the source of the input test light rays is not a perfect point light source, or is not on the optical axis 45, such as where the source is the fluorophore-labeled antigens 104 surrounding the sensing waveguide 228, the aspherical surface shape for the lens 174's outer surface 175 that is generated by the above iterative method will also not be perfect. However, the iterative method will generate the best possible aspherical surface shape for the outer surface 175 for any given set of non-perfect conditions for the input test light, and will collimate the test light rays to the maximum extent possible under that given set of non-perfect conditions.

This is a remarkable and important improvement because as the collimation of the beam of the signal recovery light 32 is increased, the desirable transfer of the signal recovery light 32 from the sensor 222 into the interrogation module 40 is increased, and the desirable rejection of back-scattered excitation light 30 by the interrogation module 40 is also increased due to improved rejection of the back-scattered excitation light 30 by the filter film 66. This is because the filter film 66 is most effective at blocking the back-scattered excitation light 30 when its rays are oriented at a right angle with respect to the filter film 66's surface, i.e., when the back-scattered excitation light 30 rays are oriented as parallel as possible to the common optical axis 45 by the signal recovery light lens 174.

From the forgoing, it will be appreciated that the above iterative method is clearly not affected by the number, type or location of the source(s) of the input light to the lens 174, and thus permits a study of the combined effect of the lens 174 and any particular reflective surface 227. In addition, this iterative method may also be used to determine the most favorable aspherical shape for the outer surface 175 of the lens 174 when the optical sensor 222 does not include a reflective surface 227 at all, or when the sensor 222 includes a reflective surface that is different, such as the reflective surface 27 of the optical sensor 22, or includes any other reflective surface.

By way of non-limiting example, the above iterative method may be used to study what impact there is on the quality of the collimated beam of signal recovery light 32 produced by the lens 174 when the angular length $\omega_L$ of the reflective surface 227 is extended beyond the minimum angular length $(\omega_2-\omega_1)$ that was discussed above. This may be done by examining the path of back-scattered excitation light 30 returned to the interrogation module 40 from sensor 222, since the lens 174's aspherical surface 175 will collimate both signal recovery light 32 back-scattered excitation light 30 equally well, or equally not as well, as the case may be. For analysis of the back-scattered excitation light 30, a worst-case assumption is made that back-scattered excitation light 30 follows the same ray trajectories that the signal recovery light 32 would follow, thereby minimizing the beneficial effect of any obscuration 68.

The impact that changing the angular length $\omega_L$ of the reflective surface 227 would have on the quality of the collimated beam of signal recovery light 32 may be quantified by passing the collimated beam of back-scattered excitation light 30 emanating from lens 174 through the interrogation module 40's long pass filter assembly, which may comprise the laser-line rejection filter film 66 of FIG. 7A. Since such a filter is not perfect at blocking back-scattered excitation light 30, and since its performance generally depends on the ray angle and wavelength of the back-scattered excitation light 30, some back-scattered excitation light 30 will always be detected by photodetector 64 of FIG. 6B.

Figure 24:
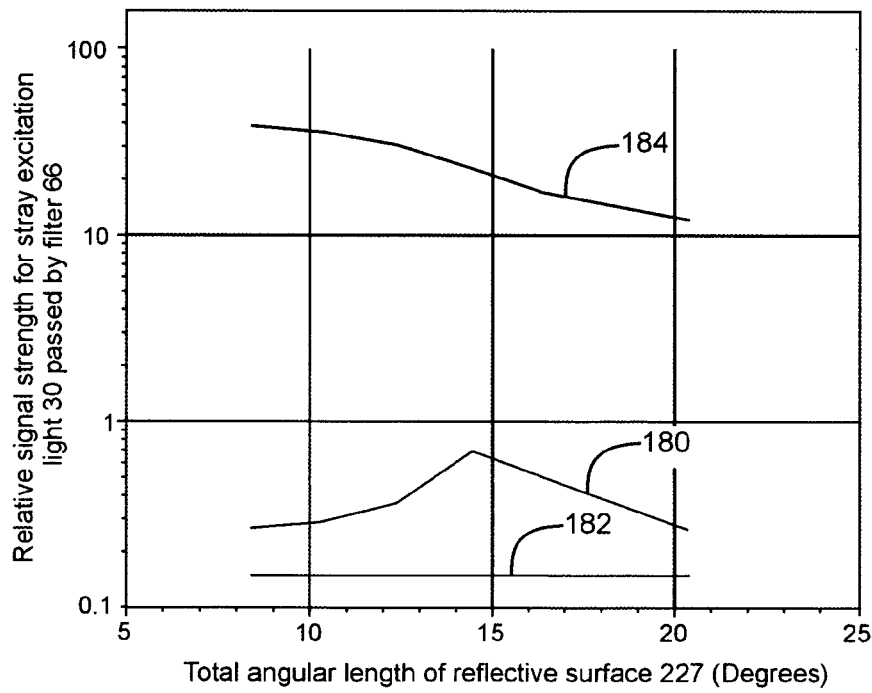
FIG. 24 depicts graphs that show the relative signal strength of back-scattered excitation light from the FIG. 17 sensor as a function of the angular length of the sensor's reflective surface, for several different configurations of the sensor.

When the above modeling process is used, the graph 180 in FIG. 24 is produced by varying the angular length $\omega_L$ of the reflective surface 227 and then calculating an optimum aspherical outer surface 175 for the lens 174 used at each angular length. The graph 180 plots the relative signal strength for back-scattered excitation light 30 passed by the filter film 66, as a function of the angular length of the reflective surface 227 in degrees.

Also plotted in FIG. 24, as graphs 182 and 184, respectively, are the results for a theoretical perfectly collimated beam of back-scattered excitation light 30, and the results for a reflective surface 227 without a lens 174 (i.e., the lens 174 has a planar outer surface 175).

In FIG. 24, it is seen from the graph 184 for the reflective surface 227 which is effectively without a lens 174, that as the angular length $\omega_L$ of reflective surface 227 is increased there is a corresponding beneficial reduction in relative signal strength of back-scattered excitation light 30 passed by the filter film 66.

However, when graph 184 is compared with graph 180, the latter describing back-scattered excitation light 30 for a reflective surface 227 in combination with a lens 174 having an optimum aspherical outer surface 175, it is seen that the aspherical outer surface 175 creates back-scattered excitation light 30 levels that are a factor of 10 to 30 times less at all angular lengths $\omega_L$ of the reflective surface 227.

The high point in the graph 180 that appears at an angular length $\omega_L$ of about 14° is interpreted as being due to a changing balance between back-scattered rays of excitation light 30 coming directly from the sensing waveguide 228, and back-scattered rays of excitation light 30 that have been acted on by the reflective surface 227.

It has been found for reflective surfaces 227 having a relatively short angular length $\omega_L$ in the range of from about 9° to 14°, that a larger proportion of the rays of the signal recovery light 32 and the back-scattered excitation light 30 come directly from the sensing waveguide 228, and that the aspherical outer surface 175 of lens 174 dominates the collimation of such rays; while for reflective surfaces 227 having longer angular lengths, both the reflective surface 227 and the aspherical outer surface 175 significantly affect the collimation of such rays.

This is because when the angular length $\omega_L$ of the reflective surface 227 is relatively short, only a small percentage of such rays graze it, so its influence on such rays is much less important. However, as its angular length increases it is hit by a higher percentage of such rays, and the effective "spot size" for the "source point" of such rays increases in diameter and moves closer to the outer surface 175 of lens 174. Both of these effects tend to make it more difficult for the combined reflective surface 227 and outer lens surface 175 to produce a collimated beam of such rays, until the overall angular length increases to the point that reflective surface 227's natural collimating properties dominate.

From a practical standpoint, reflective surfaces 227 having shorter angular lengths $\omega_L$ may be desirable because polishing an injection mold to an optical finish for the reflective surface 227 is less difficult for shorter angular lengths than for longer angular lengths.

Turning now to FIG. 25, it depicts by way of non-limiting example the specific geometries of the optical sensor 222 for a polystyrene-in-water design case. Alternatively, the sensor 222 may be made from any other suitable optical plastic besides polystyrene, or it may be made from any other optical material such as quartz or glass. As further alternatives, the sensor 222 may be designed for immersion in any fluid other than water, with the term fluid being used herein in its broadest sense to cover any liquid or gas, or mixtures thereof, including fluids carrying or mixed with soluble or non-soluble materials. The design of such alternative sensors 222 may now be done by those skilled in the art in view of all of the disclosures herein.

The optical sensor 222 may be made by injection molding, or by any other suitable conventional means.

By way of non-limiting example, in FIG. 25 the reflective surface 227 has an angular length $\omega_L$ that is 2.5° longer than the minimum angular length ($\omega_2 - \omega_1$) that is needed to reflect rays of excitation light 30 into the sensing waveguide 228 from a light source 34 emitting over a 0.24 numerical aperture extent. This extra 2.5° of angular length aids in the capture and transport of excitation light 30 by the sensor 222 when there is a 0.15 mm misalignment error between the sensing element 222 and the right angle reflector 58, without creating excessive de-collimation of the signal recovery light 32.

From all of the disclosures herein, it will now be appreciated that for any given sensor 222 the angular length $\omega_L$ that is selected for its reflective surface 227 will depend on the amount and kind of misalignment error the sensor 222 is designed to accommodate, as well as on the particular optical materials from which the sensor 222 is made. In general, the greater the amount of misalignment being accommodated, the greater will be the angular length $\omega_L$ of the reflective surface 227. In general, the sensor 222, and each of its various portions, may be scaled up and down in size while retaining the beneficial results provided by the present invention.

As seen in FIG. 25, the excitation light lens 160 has an optical radius of 1.50 mm, and a physical diameter of 1.30 mm as measured perpendicularly from the optical axis 45. Outside of that physical diameter, the aspherical outer surface 175 of the signal recovery light lens 174 may be described with reference to the following lensmakers equation, which will be understood by those skilled in the art:

$$Z(h) = 0.09671905h^2 + 0.122496h^4 -$$
$$0.05673484h^6 + 0.01429319h^8 - 0.001317767h^{10}$$

If the optical sensor 222 is to be molded from glass or plastic, then all or part of its mold or the pattern for the mold, including that part for its bifocal lenses 160, 174, may be made by any suitable conventional technique. By way of non-limiting example, diamond turning techniques as provided by Polymer Optics, LLC of Santa Rosa, Calif. may be used for creating optical surfaces. Alternatively, all or part of the sensor 222 may be diamond turned directly from stock material. An advantage of diamond turning is that an adequate optical finish for all, or part, of the optical sensor 222 may be generated without any secondary polishing step, resulting in minimal errors in the shape of the outer surface of the sensor 222.

As alternatives in the structure of the invention, the reflective surface 227 may be used in lieu of the reflective surface 27 in the optical sensor 22, and vice versa; and the reflective surfaces 27 and 227 may be used with any conventional form of sensing waveguide for sensing any physical parameter or target substance, as alternatives to being used with the sensing waveguides 28, 140, 140*a* and 228 described herein. As further alternatives, the reflective surface 227 may be used alone; or may be used with either the excitation light lens 160 or the signal recovery light lens 174 alone, rather than being used with both lenses 160, 174. As another alternative, the excitation light lens 160 and/or the signal recovery light lens 174 may be used without the reflective surfaces 27 or 227. In addition, the design of all, or part, of the optical sensors 22 and 222 may be directly scaled up and down to other absolute dimensions with little change in performance.

Further, all aspects of the optical sensors 22 and 222 that were described herein, such as their size, shape, design, materials, construction, manufacture, physical properties, dimensions, angular specifications, variations and use, were provided strictly by way of non-limiting example, and merely demonstrate the manner in which a design for the optical sensors 22 and 222 may be optimized for one particular sensor material (polystyrene), and for one particular immersion fluid (water).

Substantial changes in the optical properties of all or part of the optical sensors 22 or 222, or the fluid in which they are immersed, will require use of the techniques described herein to develop a new set of design parameters for the optical sensors 22 or 222, in order to maximize the total evanescent electric field strength around their sensing waveguides 28 and 228, respectively, and to minimize the effects of any lateral, axial or angular misalignment errors of the optical sensors 22 or 222 and the right angle reflector 58 with respect to each other.

It will be appreciated that all of the embodiments of the invention have been described herein for purposes of illustration. Thus, various modifications to the invention may be made without deviating from its spirit and scope.

For example, a linear or two-dimensional multi-element sensor, similar to the multi-element sensor 130 of FIG. 16, having a plurality of sensors 22 or 222 may be formed as a single component in a single step by the use of an injection mold that incorporates multiple cavities for multiple sensors 22 or 222, with the sensors integrally joined through a continuous flange that is similar to the flange 176.

Alternatively, as in FIG. 16, a multi-element sensor 130 having a plurality of approximately parallel slab sensors 132 may be formed as a single unit in combination with a single lens portion 134. Each slab sensor 132 may be functionally substituted for the sensors 22 and 222 that were described above; and its portion of the lens portion 134 may be functionally substituted for the lens portions 24 or 224. A cylindrical lens 136 may be functionally substituted for the sapphire ball lens 62 (or an array of aspherical or spherical lenses that are individually functionally equivalent to sapphire ball lens 62); and an array of photodiodes or a linear charge-coupled device 138 may be functionally substituted for the photodetector 64. The sensors 132 each include a slab sensing waveguide 140 comprising a solid slab of optical material having a pair of parallel opposing reflecting faces and a plane of symmetry located within the solid slab. The waveguide 140 further comprises a reflector portion 142 having upper and lower reflective surfaces defined mathematically like the reflective surfaces 27 and 227 described above. The slab sensing waveguide 140 may be functionally substituted for the sensing waveguides 28 and 228, and the reflector portion 142 may be functionally substituted for the reflector portions 26 and 226.

Advantages of the multi-element sensor 130 may include improved manufacturability, multiple target assays, more flexible design parameters, improved waveguide power densities, and greater sensing surface area for the slab sensing waveguides 140 to test sample volume, thereby improving signal to noise characteristics.

As another example, any of a variety of lens configurations can be functionally substituted for the GRIN lens 52 described in connection with FIG. 4. Blocking low propagation angle light can be readily accomplished by a compound lens configuration, including paired planoconcave lenses forming highly collimated light, in which an obscuration is selectively positioned.

Particular optical structures, such as optical fibers, refractive surfaces and reflective surfaces have been described in connection with certain embodiments of the present invention. However, those skilled in the art will appreciate any number of light-directing media and devices that can be suitably adapted and combined to achieve the above-described effects and functions. For example, any of a wide variety of waveguides may be adapted for use as sensors. Also, metalized mirror reflecting surfaces may be substituted for the described dielectric surfaces. Reflective surfaces may be substituted for refractive surfaces, and vice versa.

The above-described embodiments of the reflective surfaces 27 and 227, whether alone or in combination with the lens portions 24 and 224, may have one or more functions. That is, they may act as light redirection devices, which adjust or otherwise modify the propagation angle of input excitation light 30; they may reflect the signal recovery light 32 in particular ways towards the lens portions 24 and 224; and/or they may help to compensate for lateral, axial and/or angular misalignment errors between the optical sensor 22, 222 and the right angle reflector 58.

The above-described embodiment of the light source module 34 includes, by virtue of features associated with the described lens 52 and obscuration 56, a light selection functionality in which certain ranges of light propagation angles may be blocked, passed, or otherwise selected for provision to subsequent light processing components. The above-described embodiments of the source fiber 38 and, in part, the sensing waveguides 28 and 228 function as light transfer devices. Those skilled in the art will appreciate that a wide variety of alternative media, elements, and devices can be functionally substituted for these particular described embodiments.

Those skilled in the art will appreciate that various embodiments of the invention may be applied in fields other than assay methods and apparatus. Additionally, distinguishing between components such as a light source module and sensor is somewhat arbitrary, since certain of the features described in connection with the sensor could be suitably adapted to form a part of a light source module. Further, although the description above identifies "optical" features and effects, the invention encompasses any of a wide variety of equivalent features and effects associated with other parts of the electromagnetic spectrum, including light other than visible light.

These and other variations can be made to the invention in light of the detailed description above. In general, in the following claims, the terms used should not be construed to limit the invention to the specific embodiments disclosed in the specification, but should be construed to include all energy-directing media and devices that operate under the claims to provide associated signal transfer, retention, and detection characteristics. Accordingly, the invention is not limited by the disclosure, but instead its scope is to be determined entirely by the following claims.

While the preferred embodiments of the invention have been illustrated and described, it will be appreciated that various changes can be made therein without departing from the spirit and scope of the invention. The embodiments of the invention in which an exclusive property or privilege is claimed are defined as follows:

The invention claimed is:

1. An optical sensor operable to receive an excitation light from a light source, wherein said sensor comprises an internally reflecting shape and a sensing waveguide; wherein said sensing waveguide comprises an input end;

wherein said internally reflecting shape and at least said input end of said sensing waveguide are arranged with respect to each other to have a common optical axis; wherein said internally reflecting shape is operable to receive an input of excitation light rays having a range of input propagation angles ω with respect to a Y-axis that is at right angles with respect to said common optical axis;

wherein said internally reflecting shape comprises a variable reflected propagation angle $\theta_{0i}$ reflective surface that is operable to receive at least some of said input of excitation light rays and to produce an output of reflected excitation light rays from said variable reflected propagation angle $\theta_{0i}$ reflective surface that are reflected into said input end of said sensing waveguide over a corresponding range of reflected propagation angles $\theta_{0i}$ relative to said common optical axis; wherein said reflected propagation angle $\theta_{0i}$ changes as a function of said input propagation angle ω;

wherein at least a portion of said variable reflected propagation angle $\theta_{0i}$ reflective surface has a shape, relative to a position of said light source and relative to said common optical axis, that is described in a polar coordinate system as:

$$r(\omega) = R_{90°}\left[\frac{1-\cos(\theta_{90°})}{1-\sin(\omega-\theta_{0i})}\right]^P;$$

and wherein said sensing waveguide is operable to produce an output of signal recovery light in response to said output of reflected excitation light rays from said variable reflected propagation angle $\theta_{0i}$ reflective surface, when said sensing waveguide is exposed to a sensed target analyte.

2. The sensor of claim 1, wherein said light source is operable to provide an output comprising a collimated beam of excitation light rays; and wherein said sensor further comprises an excitation light lens having a refractive surface profile that is operable to receive at least some of said collimated beam of excitation light rays, to direct at least some of said collimated beam of excitation light rays to form a point light source on said common optical axis between said refractive surface profile and said variable reflected propagation angle $\theta_{0i}$ reflective surface, and to produce said input of excitation light rays having a range of input propagation angles ω.

3. The sensor of claim 1, wherein said sensing waveguide comprises a cylindrical sensing waveguide that comprises an at least substantially cylindrical shape, and an optical axis; and wherein, at least at said input end of said cylindrical sensing waveguide, said optical axis of said cylindrical sensing waveguide coincides with said common optical axis.

4. The sensor of claim 1, wherein said variable reflected propagation angle $\theta_{0i}$ reflective surface is selected to be operable to maximize said output of reflected excitation light rays from said variable reflected propagation angle $\theta_{0i}$ reflective surface that are reflected into said input end of said sensing waveguide, over a predetermined range of misalignment errors of said light source and said sensor with respect to each other.

5. The sensor of claim 1, wherein said sensing waveguide comprises an outer surface; wherein, during operation of said sensor, said sensing waveguide has a total evanescent electric field strength adjacent to said outer surface of said sensing waveguide; and wherein said variable reflected propagation angle $\theta_{0i}$ reflective surface is selected to be operable to maximize said total evanescent electric field strength for a predetermined range of misalignment errors of said light source and said sensor with respect to each other.

6. The sensor of claim 1, wherein said sensor further comprises a bifocal refracting lens; wherein said bifocal refracting lens comprises an inner excitation light lens portion having a respective refractive surface profile that is operable to receive and direct at least some of said input of excitation light rays to said variable reflected propagation angle $\theta_{0i}$ reflective surface, and an outer signal recovery light lens portion having a respective refractive surface profile that is operable to receive and at least partially collimate at least some of said output of signal recovery light.

7. The sensor of claim 6, wherein said bifocal refracting lens has an optical axis that comprises said common optical axis; and wherein said excitation light lens portion and said signal recovery light lens portion are at least substantially rotationally symmetrical with respect to said common optical axis.

8. The sensor of claim 1, wherein said sensor further comprises an excitation light lens having a respective refractive surface profile that is operable to receive and direct at least some of said input of excitation light rays to said variable reflected propagation angle $\theta_{0i}$ reflective surface.

9. The sensor of claim 8, wherein said excitation light lens has an optical axis that comprises said common optical axis; and wherein said excitation light lens is at least substantially rotationally symmetrical with respect to said common optical axis.

10. The sensor of claim 1, wherein said sensor further comprises a signal recovery light lens having a respective refractive surface profile that is operable to receive and at least partially collimate at least some of said output of signal recovery light.

11. The sensor of claim 10, wherein said signal recovery light lens has an optical axis that comprises said common optical axis; and wherein said signal recovery light lens is at least substantially rotationally symmetrical with respect to said common optical axis.

12. An optical sensor operable to receive an excitation light from a light source, wherein said sensor comprises an internally reflecting shape and a sensing waveguide; wherein said sensing waveguide comprises an input end;

wherein said internally reflecting shape and at least said input end of said sensing waveguide are arranged with respect to each other to have a common optical plane of symmetry; wherein said internally reflecting shape is operable to receive an input of excitation light rays having a range of input propagation angles ω with respect to a Y-axis that is at right angles with respect to said common optical plane;

wherein said internally reflecting shape comprises a variable reflected propagation angle $\theta_{Oi}$ reflective surface that is operable to receive at least some of said input of excitation light rays and to produce an output of reflected excitation light rays from said variable reflected propagation angle $\theta_{Oi}$ reflective surface that are reflected into said input end of said sensing waveguide over a corresponding range of reflected propagation angles $\theta_{Oi}$ relative to said common optical plane of symmetry; wherein said reflected propagation angle $\theta_{Oi}$ changes as a function of said input propagation angle ω;

wherein at least a portion of said variable reflected propagation angle $\theta_{Oi}$ reflective surface has a shape, relative to a position of said light source and relative to said common optical plane of symmetry, that is described in a polar coordinate system as:

$$r(\omega) = R_{90°}\left[\frac{1-\cos(\theta_{90°})}{1-\sin(\omega-\theta_{0i})}\right]^P;$$

and wherein said sensing waveguide is operable to produce an output of signal recovery light in response to said output of reflected excitation light rays from said variable reflected propagation angle $\theta_{Oi}$ reflective surface, when said sensing waveguide is exposed to a sensed target analyte.

13. The sensor of claim 12, wherein said light source is operable to provide an output comprising a collimated beam of excitation light rays; and wherein said sensor further comprises an excitation light lens having a refractive surface profile that is operable to receive at least some of said collimated beam of excitation light rays, to direct at least some of said collimated beam of excitation light rays to form a line light source on said common optical plane of symmetry between said refractive surface profile and said variable reflected propagation angle $\theta_{Oi}$ reflective surface, and to produce said input of excitation light rays having a range of input propagation angles ω.

14. The sensor of claim 12, wherein said sensing waveguide comprises a slab sensing waveguide that comprises an input end, a pair of at least substantially parallel, opposed reflecting faces, and an optical plane of symmetry that is located between said opposed reflecting faces; and wherein, at least at said input end of said slab sensing waveguide, said optical plane of symmetry of said slab sensing waveguide coincides with said common optical plane of symmetry.

15. The sensor of claim 14, wherein said slab sensing waveguide further comprises a patch of target analyte sensitive coating; wherein said sensor further comprises a signal recovery light detector;

wherein said patch of target analyte sensitive coating is located on a first one of said opposed reflecting faces of said slab sensing waveguide; and wherein said signal recovery light detector is located near a second one of said opposed reflecting faces of said slab sensing waveguide, and is located opposite to said patch of target analyte sensitive coating.

16. The sensor of claim 12, wherein said variable reflected propagation angle $\theta_{Oi}$ reflective surface is selected to be operable to maximize said output of reflected excitation light rays from said variable reflected propagation angle $\theta_{Oi}$ reflective surface that are reflected into said input end of said sensing waveguide, over a predetermined range of misalignment errors of said light source and said sensor with respect to each other.

17. The sensor of claim 12, wherein said sensing waveguide comprises an outer surface; wherein, during operation of said sensor, said sensing waveguide has a total evanescent electric field strength adjacent to said outer surface of said sensing waveguide; and wherein said variable reflected propagation angle $\theta_{Oi}$ reflective surface is selected to be operable to maximize said total evanescent electric field strength for a predetermined range of misalignment errors of said light source and said sensor with respect to each other.

18. The sensor of claim 12, wherein said sensor further comprises a bifocal refracting lens; wherein said bifocal refracting lens further comprises an inner excitation light lens portion having a respective refractive surface profile that is operable to receive and direct at least some of said input of excitation light rays to said variable reflected propagation angle $\theta_{Oi}$ reflective surface, and an outer signal recovery light lens portion having a respective refractive surface profile that is operable to receive and at least partially collimate at least some of said output of signal recovery light.

19. The sensor of claim 18, wherein said bifocal refracting lens has an optical plane of symmetry that comprises said common optical plane of symmetry; and wherein said respective refractive surface profiles of said excitation light lens portion and said signal recovery light lens portion each comprise a respective at least substantially one-dimensional Cartesian refracting surface profile that is at least substantially symmetrical with respect to said common optical plane of symmetry.

20. The sensor of claim 12, wherein said sensor further comprises an excitation light lens having a respective refractive surface profile that is operable to receive and direct at least some of said input of excitation light rays to said variable reflected propagation angle $\theta_{Oi}$ reflective surface.

21. The sensor of claim 20, wherein said excitation light lens has an optical plane of symmetry that comprises said common optical plane of symmetry; and wherein said respective refractive surface profile of said excitation light lens comprises an at least substantially one-dimensional Cartesian refracting surface profile that is at least substantially symmetrical with respect to said common optical plane of symmetry.

22. The sensor of claim 12, wherein said sensor further comprises a signal recovery light lens having a respective refractive surface profile that is operable to receive and at least partially collimate at least some of said output of signal recovery light.

23. The sensor of claim 22, wherein said signal recovery light lens has an optical plane of symmetry that comprises said common optical plane of symmetry; and wherein said respective refractive surface profile of said signal recovery light lens comprises an at least substantially one-dimensional Cartesian refracting surface profile that is at least substantially symmetrical with respect to said common optical plane of symmetry.

24. An optical device operable to receive an excitation light from a light source, wherein said optical device comprises an internally reflecting shape having an optical axis;

wherein said internally reflecting shape comprises a variable reflected propagation angle $\theta_{Oi}$ reflective surface that is operable to receive an input of excitation light rays having a range of input propagation angles ω with respect to a Y-axis that is at right angles with respect to said optical axis; and to produce an output of reflected excitation light rays from said variable reflected propagation angle $\theta_{0i}$ reflective surface that have a corresponding range of reflected propagation angles $\theta_{0i}$ relative to said optical axis; wherein said reflected propagation angle $\theta_{0i}$ changes as a function of said input propagation angle $\omega$; and wherein at least a portion of said variable reflected propagation angle $\theta_{0i}$ reflective surface has a shape, relative to a position of said light source and relative to said optical axis, that is described in a polar coordinate system as:

$$r(\omega) = R_{90°}\left[\frac{1-\cos(\theta_{90°})}{1-\sin(\omega-\theta_{0i})}\right]^P.$$

25. An optical device operable to receive an excitation light from a light source, wherein said optical device comprises an internally reflecting shape having an optical plane of symmetry;

wherein said internally reflecting shape comprises a variable reflected propagation angle $\theta_{0i}$ reflective surface that is operable to receive an input of excitation light rays having a range of input propagation angles $\omega$ with respect to a Y-axis that is at right angles with respect to said optical plane of symmetry; and to produce an output of reflected excitation light rays from said variable reflected propagation angle $\theta_{0i}$ reflective surface that have a corresponding range of reflected propagation angles $\theta_{0i}$ relative to said optical plane of symmetry; wherein said reflected propagation angle $\theta_{0i}$ changes as a function of said input propagation angle $\omega$; and wherein at least a portion of said variable reflected propagation angle $\theta_{0i}$ reflective surface has a shape, relative to a position of said light source and relative to said optical plane of symmetry, that is described in a polar coordinate system as:

$$r(\omega) = R_{90°}\left[\frac{1-\cos(\theta_{90°})}{1-\sin(\omega-\theta_{0i})}\right]^P.$$

* * * * *